US007765375B2

(12) United States Patent
Yamada et al.

(10) Patent No.: US 7,765,375 B2
(45) Date of Patent: Jul. 27, 2010

(54) MEMORY MANAGEMENT METHOD, INFORMATION PROCESSING APPARATUS, AND MEMORY MANAGEMENT PROGRAM

(75) Inventors: Masanobu Yamada, Yamoto (JP); Takashi Maruyama, Yokohama (JP); Koichi Okada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 448 days.

(21) Appl. No.: 11/931,139

(22) Filed: Oct. 31, 2007

(65) Prior Publication Data

US 2009/0024818 A1   Jan. 22, 2009

(30) Foreign Application Priority Data

Jul. 19, 2007  (JP) ............................ 2007-188697

(51) Int. Cl.
*G06F 12/00* (2006.01)
(52) U.S. Cl. ........................................ 711/165; 707/813
(58) Field of Classification Search ........................ None
See application file for complete search history.

(56) References Cited

U.S. PATENT DOCUMENTS 5,689,707 A    11/1997  Donnelly
6,125,434 A *  9/2000  Willard et al. .............. 711/170
7,155,467 B1 * 12/2006  Rohrs ........................ 707/206
2006/0129508 A1 *  6/2006  Cannon et al. ................. 707/1
2006/0253498 A1 * 11/2006  Barrs et al. .................. 707/200

FOREIGN PATENT DOCUMENTS

JP    2002-108698    4/2002

OTHER PUBLICATIONS

Richard Jones et al., "Garbage Collection Algorithms for Automatic Dynamic Memory Management", John Wiley & Sons, pp. 25-28.

* cited by examiner

*Primary Examiner*—Jack A Lane
(74) *Attorney, Agent, or Firm*—Brundidge & Stanger, P.C.

(57) ABSTRACT

In a computer including a processor for executing a program and a storage that includes a first storage area and a second storage area for storing objects generated by the executed program, the processor stores objects generated by executing the program in the first storage area. If an object stored in the first storage area is accessed, the processor records access information of the accessed object. The processor extracts a leak object having a high possibility of memory leak on the basis of the recorded access information, and moves the extracted leak object to the second storage area.

12 Claims, 40 Drawing Sheets

NON-ACCESS OBJECT
ADDRESS TABLE 205

| NON-ACCESS OBJECT ADDRESS (3301) | THE NUMBER OF NON-ACCESS TIMES (3302) |
|---|---|
| 0x43ff3328 | 13 |
| 0x43ff3398 | 11 |
| 0x43ff5740 | 5 |
| ⋮ | ⋮ |
| 0x4401348 | 2 |
| 0x4401390 | 1 |
| 0x4401478 | 1 |
| ⋮ | ⋮ |

3401 — OBJECT HEADER
3402 — OBJECT DATA

FIG. 8

OBJECT CLASSIFICATION

3501

| OBJECT CLASSIFICATION | OBJECT CLASSIFICATION BIT |
|---|---|
| DEAD | 00 |
| SURVIVAL | 01 |
| ACCESS | 10 |
| LEAK | 11 |

FIG. 9

FILE OFFSET MAP 217

| OBJECT ADDRESS (3701) | FILE OFFSET (3702) |
|---|---|
| ⋮ | ⋮ |
| 0x642a4a80 | 3252 |
| 0x642a4aa8 | 3296 |
| 0x642a4ae0 | 3364 |
| ⋮ | ⋮ |

3703 — second data row
3704 — third data row
3705 — right side marker

MEMORY MANAGEMENT METHOD, INFORMATION PROCESSING APPARATUS, AND MEMORY MANAGEMENT PROGRAM

INCORPORATION BY REFERENCE

The present application claims priority from Japanese application JP2007-188697 filed on Jul. 19, 2007, the content of which is hereby incorporated by reference into this application.

BACKGROUND OF THE INVENTION

The present invention relates to a memory management technique. In particular, the present invention relates to management of objects stored in a memory in a language processing system.

As one of causes of the problem that an application program does not exhibit anticipated execution performance, a memory leak can be mentioned. The memory leak is a phenomenon that a memory area allocated during execution of the application program is not released by some reason even after it has become unnecessary and consequently the amount of memory used by the application program continues to increase.

If the memory leak advances, available empty memory areas gradually decrease and a memory area having an amount required for program execution cannot be allocated in some cases. If it becomes impossible to allocate a memory area having an amount required for program execution, execution of the application program or the whole of the system including the application program terminates abnormally. In this way, the memory leak is one of causes of lowering in the solidity of the application program.

From the viewpoint of language specifications, causes of the problem that a memory area that has become unnecessary is not released can be broadly classified into two categories. One of them is caused by that a memory area is not released suitably in a program language a programmer needs to explicitly specify release handling of a memory area (for example, the C language). The other of them is caused by that a memory area is not released in a program language (for example, the Java language ("Java" is a trade mark, the same holds true in the ensuing description) in which a language processing system implicitly releases a used memory area.

In an application program generated using the former cited language, the memory leak occurs when release handling of a memory area is neglected. Also when a pointer to a memory area in use is rewritten during execution of the application program, the memory leak occurs in some cases.

As a technique for detecting occurrence of such a memory leak, for example, a technique disclosed in U.S. Pat. No. 5,689,707 is known. According to the technique disclosed in U.S. Pat. No. 5,689,707, when allocating a memory area, allocation information including an expiration event which indicates an event for which the memory area should be released and a dependent pointer is recorded in a memory allocation table, besides a file name and a line number. When checking a memory leak, a memory area that is not released even after the expiration event has been terminated is detected.

In the latter cited language such as, for example, the Java language, a memory area (object) that has become unnecessary is collected by garbage collection (hereafter referred to as "GC" mechanism) (see Richard Jones and another, "Garbage Collection," John Wiley & Sons, pp. 25-28). The expression "collecting an object" means releasing a memory area in which the object is stored.

In the mark•sweep scheme which is a typical scheme of the GC mechanism, objects that are in the reference relation are marked to indicate that the objects are necessary objects, and thereafter objects that are not marked are collected as unnecessary objects. In the Java language, therefore, explicit release of a memory area in a program is not needed. Even if a programmer neglects the release handling of the memory area, therefore, the memory leak does not occur.

In the mark•sweep scheme, however, objects that are in the reference relation are not collected even if the objects become unnecessary to a user. If there is a reference relation, therefore, the object is not collected even if the object is unnecessary and a memory leak occurs in some cases. In the case of a language in which explicit release of a memory area is not needed, it is extremely difficult to discriminate unnecessary objects from among objects that are in the reference relation.

As a technique for detecting a place where such a memory leak has occurred, a technique of totalizing and investigating memory use quantities of objects every class and detecting objects in a class in which the memory amount used tends to increase as objects suspected of being involved in a memory leak (hereafter referred to as leak objects) is disclosed (see JP-A-2002-108698).

According to the technique disclosed in JP-A-2002-108698, alarm time and maximum survival time for a allocated memory are managed and the user is urged to release a memory area that is not released although the alarm time is expired. And a memory area that is not released although the maximum survival time is expired is released by a memory management mechanism.

In an application program developed by using a program language in which a memory area is released by the GC mechanism, the technique disclosed in U.S. Pat. No. 5,689,707 cannot be applied and it is difficult to detect unnecessary objects from among objects that are in the reference relation by taking an object as the unit.

Furthermore, although it is possible to detect objects having a high possibility of being an unnecessary object from among objects that are in the reference relation, there is a fear that the execution performance of the application program will be degraded because of a heavy execution load of detection processing.

On the other hand, in the conventional technique disclosed in JP-A-2002-108698, coping with a memory leak is delayed if the maximum survival time is set to be long. If the maximum survival time is set to be short, there is a fear that an application program will not operate normally because a necessary object is collected sometimes.

In addition, in a situation where a memory leak occurs, a large amount of unnecessary objects are stored. If the user is caused to make a decision on collection of leak objects, therefore, the burden on the user becomes heavy and it is not realistic.

SUMMARY OF THE INVENTION

The present invention provides a leak object detection technique that has high solidity against execution of an application program and that can hold down lowering of processing speed caused by GC processing, in a language processing system having a memory management mechanism.

In a typical embodiment of the present invention, a memory management method in an information processing system executed in a computer is provided. The computer includes a processor for executing a program and a storage accessed by the processor. The storage stores a memory management part for managing a storage area used by a program which is executed by the processor, and stores access information for objects generated by executing the program. And the storage includes a first storage area and a second storage area for storing the generated objects. The processor stores the generated objects in the first storage area. If an object stored in the first storage area is accessed, the processor records information of the accessed object in the access information, the processor extracts a leak object having a high possibility of memory leak on the basis of the access information and moves the extracted leak object to the second storage area.

Other objects, features and advantages of the invention will become apparent from the following description of the embodiments of the invention taken in conjunction with the accompanying drawings.

BRIEF DESCRIPTION OF THE DRAWINGS

FIG. 8 is a diagram showing an example of an object classification bit in an embodiment of the present invention;

FIG. 9 is a diagram showing an example of a file offset map in an embodiment of the present invention;

FIG. 38B is a diagram showing a state in which an object reference value has been updated;

FIG. 38C is a diagram showing a state in which objects are relocated;

DESCRIPTION OF THE EMBODIMENTS

Figure 1:
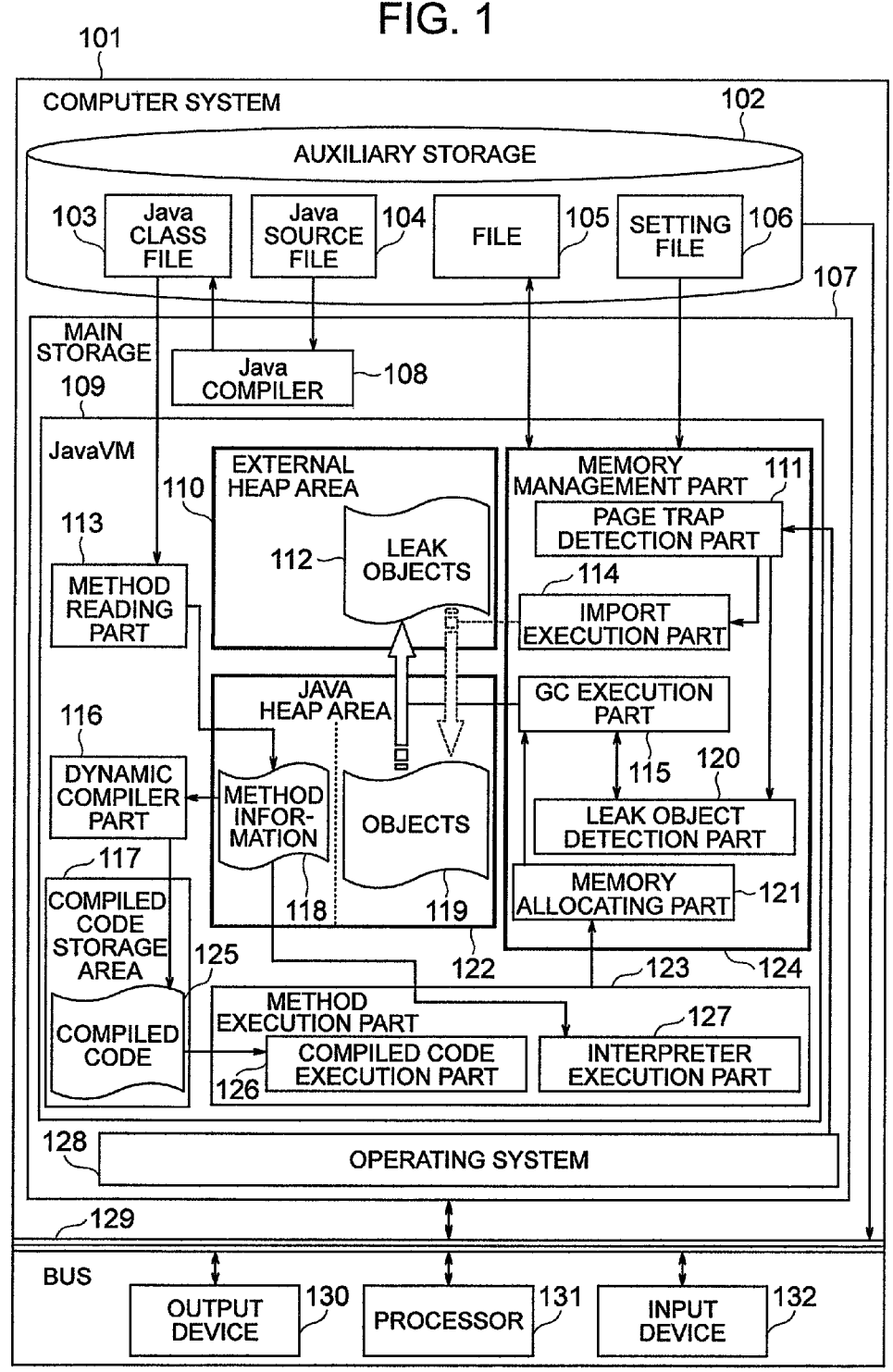
FIG. 1 is a diagram showing a configuration and input and output data of a computer system in which a Java VM operates, in an embodiment of the present invention.

FIG. 1 is a diagram showing a configuration and input and output data of a computer system 101 in which a Java VM operates, in an embodiment of the present invention.

In the computer system 101 in the embodiment of the present invention, a Java class file is generated by compiling a program described using the Java language. In addition, predetermined business processing is executed by executing the Java class file.

The computer system 101 includes a processor 131, a main storage 107, an auxiliary storage 102, an output device 130, and an input device 132. The processor 131, the main storage 107, the auxiliary storage 102, the output device 130, and the input device 132 are connected to each other via a bus 129.

The processor 131 executes various kinds of processing by executing various programs stored in the main storage 107. The main storage 107 stores programs, information required to execute the programs, and processing results of the programs. The main storage 107 may be either of a volatile memory and a non-volatile memory. The main storage 107 stores a Java compiler 108, a Java VM 109, and an operating system 128.

The auxiliary storage 102 includes a Java class file 103 to be used to execute business processing, a Java source file 104 for generating the Java class file, a file 105 to be used for processing, and a setting file 106 for the Java VM 109.

The input device 132 is an interface for inputting information required for the computer system 101. The input device 132 is, for example, a keyboard or a mouse. The output device 130 is a device for outputting information such as a processing result to the outside. The output device 130 is, for example, a display.

The Java VM 109 stored in the main storage 107 will now be described. The Java VM 109 is a language processing system having a memory management mechanism for automatically collecting memory areas that have become unnecessary.

The Java VM 109 includes a method reading part 113, a dynamic compiler part 116, a memory management part 124, and a method execution part 123. The method reading part 113, the dynamic compiler part 116, the memory management part 124, and the method execution part 123 are programs executed by the processor 131. The Java VM 109 further includes a compiled code storage area 117, a Java heap area 122 and an external heap area 110.

Upon being executed by the processor 131, the method reading part 113 reads a method from the Java class file 103, and generates method information 118. Upon being executed by the processor 131, the dynamic compiler part 116 dynamically compiles the method on the basis of the method information.

Upon being executed by the processor 131, the memory management part 124 manages a memory area used in the Java VM 109. The memory management part 124 includes a page trap detection part 111, an import execution part 114, a GC execution part 115, a leak object detection part 120 and a memory allocating part 121. Details of the respective parts will be described with reference to FIG. 2 later.

Upon being executed by the processor 131, the method execution part 123 executes the method. The method execution part 123 includes a compiled code execution part 126 and an interpreter execution part 127.

The compiled code storage area 117 stores a compiled code 125 obtained as a result of the dynamic compile conducted by the dynamic compiler part 116. The Java heap area 122 stores the method information 118 and objects 119. The external heap area 110 stores leak objects 112. A tree structure is formed by connecting objects with pointers and stored in the Java heap area 122 and the external heap area 110.

The Java compiler 108 compiles the Java source file 104 into a byte code having a format that can be interpreted and executed by the interpreter execution part 127, and generates the Java class file 103. Upon being input to the Java VM 109, the Java class file 103 is analyzed by the method reading part 113 and the method information 118 is generated in the Java heap area 122.

When the processor 131 executes a program, the interpreter execution part 127 first reads the method information 118 and conducts interpreter execution of the method. On the other hand, as to a method that is high in execution frequency in the interpreter execution, the dynamic compiler part 116 reads the method information 118, compiles the method information dynamically, and generates the compiled code 125 in the compiled code storage area 117. And the compiled code execution part 126 reads the compiled code 125 and conducts compiled code execution of the method. By the way, the Java VM 109 may conduct interpreter execution of the method from the beginning to the end, or may conduct compiled code execution of the method from the beginning.

Figure 2:
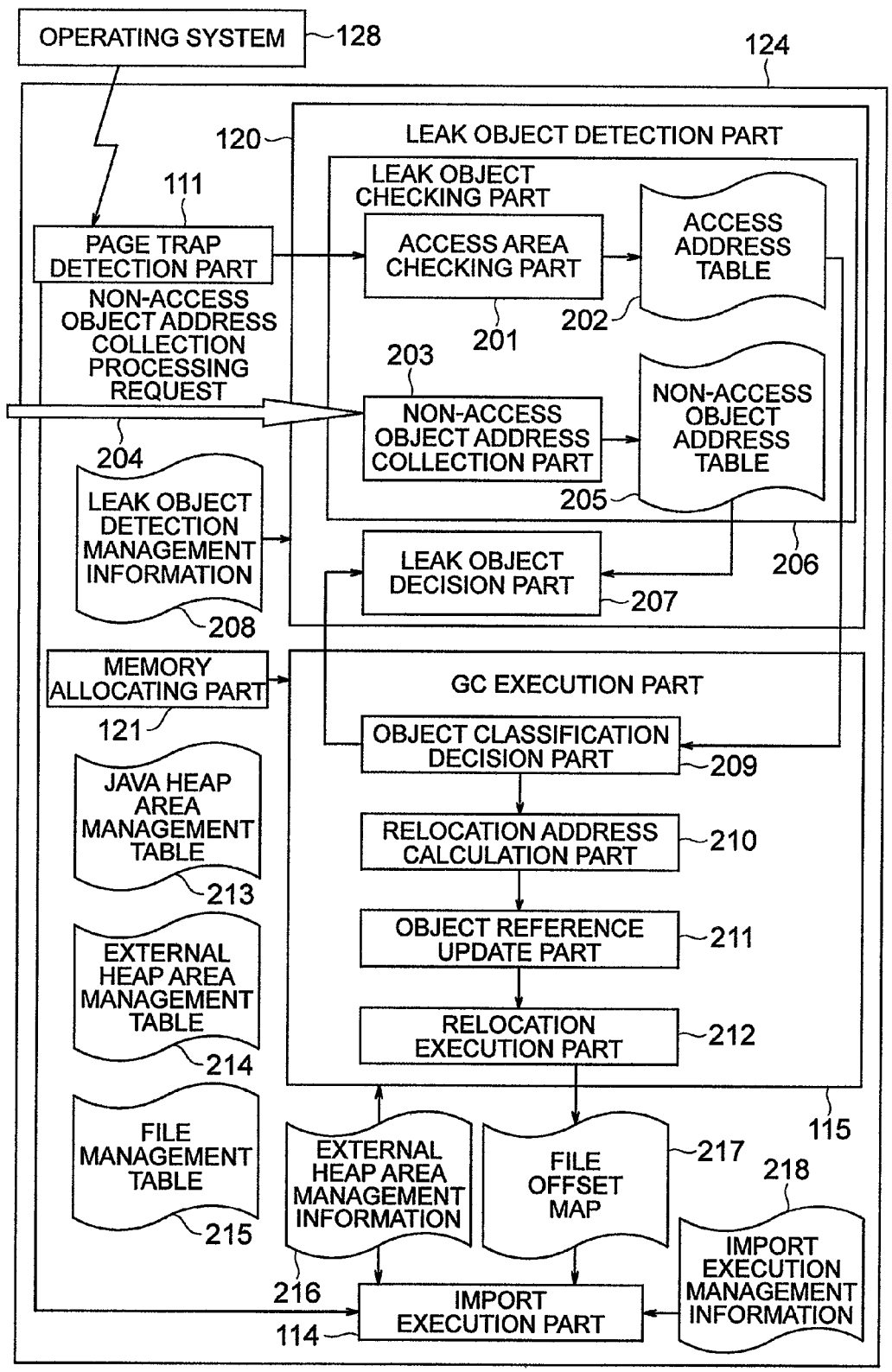
FIG. 2 is a diagram showing a configuration and input and output data of a memory management part in a Java VM in an embodiment of the present invention.

FIG. 2 is a diagram showing a configuration and input and output data of the memory management part 124 in the Java VM 109 in the embodiment of the present invention.

First, an outline of the method execution processing conducted by the method execution part 123 will be described briefly. If an instruction to be executed is a memory allocating instruction, the processor 131 requests the memory allocating part 121 to conduct memory allocating processing on the Java heap area 122.

Upon accepting a memory allocating processing request from the method execution part, the memory allocating part 121 attempts to conduct memory allocating on the Java heap area 122. If the memory allocating has succeeded, the memory allocating part 121 returns a allocated memory area to the calling source. If the memory allocating has failed, the memory allocating part 121 calls the GC execution part 115, executes GC processing, and releases memory areas that have become unnecessary in the Java heap area 122. The memory allocating part 121 attempts the memory allocating again. If the memory allocating has failed again, the memory allocating part 121 generates a memory shortage error.

Hereafter, outlines of configurations of parts in the memory management part 124 will be described.

The memory management part 124 includes the page trap detection part 111, the import execution part 114, the GC execution part 115, the leak object detection part 120 and the memory allocating part 121 as described above. The memory management part 124 further includes leak object detection management information 208, a Java heap area management table 213, an external heap area management table 214, a file management table 215, external heap area management information 216, a file offset map 217, and import execution management information 218.

The leak object detection management information 208 stores information needed to conduct processing for detecting a leak object. Details of the leak object detection management information 208 will be described with reference to FIG. 3 later.

The Java heap area management table 213 stores information for specifying the Java heap area 122. Details of the Java heap area management table 213 will be described with reference to FIG. 4A later. The external heap area management table 214 stores information for specifying the external heap area 110. Details of the external heap area management table 214 will be described with reference to FIG. 4B later.

The file management table 215 stores a file pointer for specifying the file 105 used as the external heap area 110. Details of the file management table 215 will be described with reference to FIG. 4C later.

The external heap area management information 216 stores information concerning a medium used as the external heap area 110. Details of the external heap area management information 216 will be described with reference to FIG. 3 later.

The file offset map 217 is used to associate the file 105 used as the external heap area 110 with a logical storage area. Details of the file offset map 217 will be described with reference to FIG. 9 later.

The import execution management information 218 stores information required when shifting an object stored in the Java heap area 122 to the external heap area 110. Details of the import execution management information 218 will be described with reference to FIG. 3 later.

In the embodiment of the present invention, a memory and the file 105 other than the main storage 107 can be used as the external heap area 110 which becomes the destination of relocation of the leak object 112. The file 105 may be used in the same way as a memory by using a memory map, or may be managed separately from the memory by using the file offset map 217 for associating a logical address space with a file offset.

In the embodiment of the present invention, the file 105 is used as the external heap area 110 and the file 105 is managed separately from the memory by using the file offset map 217. Information concerning the medium used as the external heap area 110 is contained in the external heap area management information 216.

Subsequently, a configuration of the leak object detection part 120 will now be described.

The leak object detection part 120 includes a leak object checking part 206 and a leak object decision part 207. The leak object checking part 206 checks the access situation of an object stored in the Java heap area 122. The leak object decision part 207 makes a decision whether an object that is not accessed (non-access object) is a leak object.

The leak object checking part 206 includes an access area checking part 201, an access address table 202, a non-access object address collection part 203, and a non-access object address table 205.

Upon being executed by the processor 131, the access area checking part 201 checks every area whether information stored in the Java heap area 122 has been accessed. Details of processing conducted by the access area checking part 201 will be described with reference to FIG. 11 later.

The access address table 202 stores an address of an area accessed by execution of a method. Details of the access address table 202 will be described with reference to FIG. 5 later.

Upon being executed by the processor 131, the non-access object address collection part 203 collects addresses of objects that are not accessed. Details of processing conducted by the non-access object address collection part 203 will be described with reference to FIG. 12 later.

The non-access object address table 205 stores addresses of objects that are not accessed. Details of the non-access object address table 205 will be described with reference to FIG. 6 later.

An outline of processing conducted by the leak object detection part 120 will now be described.

Upon detecting that page trap has occurred, the operating system 128 notifies the page trap detection part 111 to that effect.

Upon being notified by the operating system 128 that page trap has occurred, the page trap detection part 111 transmits a processing request to the access area checking part 201 or the import execution part 114 on the basis of contents of the notice.

Upon accepting a processing request from the page trap detection part 111, the access area checking part 201 executes access area checking processing and updates the access address table 202.

Upon accepting a non-access object address collection processing request 204, the non-access object address collection part 203 executes non-access object address collection processing on the basis of the leak object detection management information 208 and updates the non-access object address table 205.

On the basis of the leak object detection management information 208, the leak object decision part 207 makes a decision whether an object registered in the non-access object address table 205 is a leak object.

Upon accepting a processing request from the page trap detection part 111, the import execution part 114 executes import processing on the basis of the import execution management information 218. In the import processing, the accessed leak object 112 located in the external heap area 110 is relocated in the Java heap area 122. If the file 105 is used as the external heap area 110 and managed separately from the main storage on the basis of the file offset map 217, the import execution part 114 solves mapping the logical address space with the file offset on the basis of the file offset map 217.

The GC execution part 115 specifies objects that have become unnecessary and releases the objects from memory areas. The GC execution part 115 includes an object classification decision part 209, a relocation address calculation part 210, an object reference update part 211 and a relocation execution part 212.

The object classification decision part 209 provides an object stored in the Java heap area 122 with an object classification and executes the leak object decision part 207 to make a decision whether the object is a leak object. Details of processing conducted by the object classification decision part 209 will be described with reference to FIG. 21 later. Object classifications are shown in FIG. 8.

The relocation address calculation part 210 calculates an address of the relocation destination of an object to be relocated, on the basis of the object classification. Details of processing conducted by the relocation address calculation part 210 will be described with reference to FIG. 30 later.

The object reference update part 211 updates reference information of an object to be relocated, with the relocation destination address calculated by the relocation address calculation part 210. The object reference update part 211 is executed in the GC processing.

The relocation execution part 212 relocates a subject object on the basis of the relocation destination address of the object calculated by the relocation address calculation part 210. Details of processing conducted by the relocation execution part 212 will be described with reference to FIG. 31 later.

Figure 3:
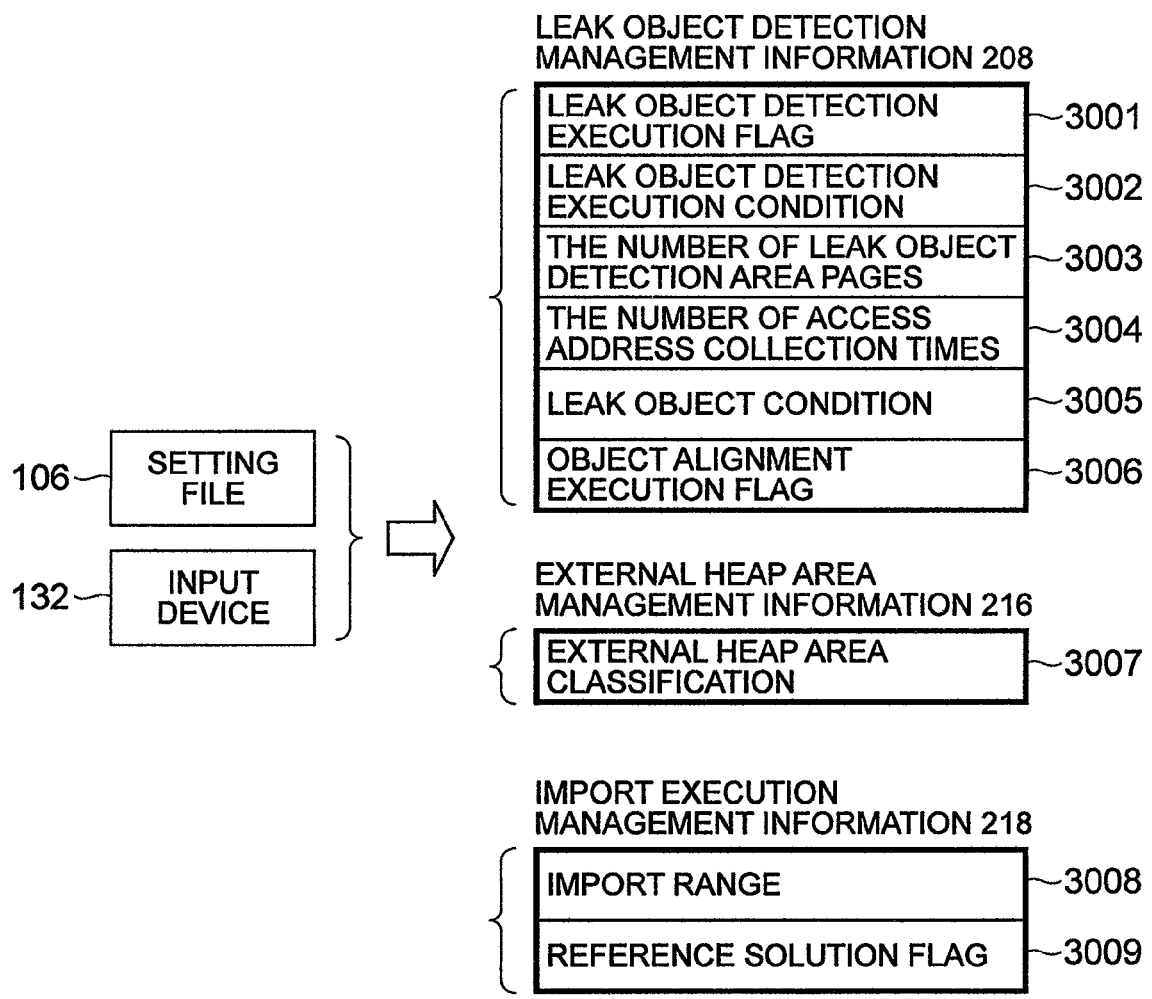
FIG. 3 is a diagram showing an example of leak object detection management information, external heap area management information and import execution management information in an embodiment of the present invention.

FIG. 3 is a diagram showing an example of the leak object detection management information 208, the external heap area management information 216 and the import execution management information 218 in the embodiment of the present invention.

The leak object detection management information 208 stores items required to conduct processing for detecting a leak object. The leak object detection management information 208 includes a leak object detection execution flag 3001, a leak object detection execution condition 3002, the number of leak object detection area pages 3003, the number of access address collection times 3004, a leak object condition 3005 and an object alignment execution flag 3006.

The leak object detection execution flag 3001 indicates whether the leak object detection is being executed. If the leak object detection execution flag 3001 has a value of "1," it is indicated that the leak object detection is being executed. If the leak object detection execution flag 3001 has a value of "0," it is indicated that the leak object detection is not being executed. By the way, an initial value of the leak object detection execution flag 3001 at the time of start of the Java VM is determined by a value of the leak object detection execution condition 3002.

The leak object detection execution condition 3002 stores the memory amount used in the Java heap area 122 which is a condition for executing leak object detection processing. For example, if the value of the leak object detection execution condition 3002 is "256M," the leak object detection processing is executed when the memory amount used in the Java heap area 122 is at least 256 MB whereas the leak object detection processing is not executed when the memory amount used is less than 256 MB. It is possible to set so as to always execute the leak object detection processing when the value of the leak object detection execution condition 3002 is "0 or less." It is possible to set so as to always prevent the leak object detection processing from being executed when the value of the leak object detection execution condition 3002 is greater than the size of the Java heap area 122.

The number of leak object detection area pages 3003 stores a range of a leak object detection area 3201 (see FIG. 5) by taking a page as the unit. The leak object detection area 3201 is an area where leak object detection processing is executed. Details of the leak object detection area 3201 will be described with reference to FIG. 5 later. For example, if the number of leak object detection area pages 3003 has a value of "16K," pages in a size of 16 KB from the head of the Java heap area 122 become the leak object detection area 3201. If the number of pages exceeding the memory amount used in the Java heap area 122 is specified in the number of leak object detection area pages 3003, the number of pages based on the memory amount used in the Java heap area 122 is stored in the number of leak object detection area pages 3003.

The number of access address collection times 3004 retains an upper limit for the number of execution times of access address collection processing for each page of the leak object detection area 3201 in access address collection processing conducted by the access area checking part 201. For example, if the number of access address collection times 3004 has a value of "3," page trap of a page for which the access address collection processing has been executed three times is released.

The leak object condition 3005 indicates a threshold for the number of non-access times 3302 in the non-access object address table 205 which is the decision criterion of the leak object. For example, if the leak object condition 3005 has a value of "5," objects for which the value of the number of non-access times 3302 in the non-access object address table 205 is at least 5 are judged to be leak objects by the leak object decision part 207.

The object alignment execution flag 3006 indicates whether to align objects on the basis of the access trend of the objects in the case of the relocation execution processing. If the object alignment execution flag 3006 has a value of "1," the objects are aligned. If the object alignment execution flag 3006 has a value of "0," the objects are not aligned.

The external heap area management information 216 includes an external heap area classification 3007. The external heap area classification 3007 indicates the classification of the external heap area 110. For example, if the external heap area classification 3007 has a value of "0," it is indicated that the external heap area 110 is an area allocated in a memory. If the external heap area classification 3007 has a value of "1," it is indicated that the external heap area 110 is an area allocated in the file 105 and the area is managed separately from the memory by the file offset map 217. In the embodiment of the present invention, the external heap area 110 is an area allocated in the file 105 and the area is managed separately from memories by the file offset map 217.

The import execution management information 218 includes an import range 3008 and a reference solution flag 3009. The import execution part 114 is processed by the processor 131 to execute the import processing. The import processing is processing for moving an object stored in the external heap area 110 to the Java heap area 122. Details of the import processing will be described with reference to FIG. 33 later.

The import range 3008 stores a range of other leak objects that are relocated from the external heap area 110 to the Java heap area 122 and that can be reached by following object references of an accessed object. For example, if the import range 3008 has a value of "2," leak objects that can be reached by following a two-stage object reference of an accessed object are relocated from the external heap area 110 to the Java heap area 122. If the import range 3008 has a value of "0," only directly accessed objects can be made the subjects of the import processing.

In addition, if the value of the import range 3008 is a negative number, it is possible to exclude an object from the subjects of the import processing even if the object is directly accessed. For example, if the frequency of access to the subject object is very low, the possibility of the object being relocated to the external heap area 110 by the GC processing is high even if the object is relocated to the Java heap area 122. The overhead caused by the import processing and the GC processing can be reduced by thus excluding directly accessed objects from subjects of the import processing.

The reference solution flag 3009 indicates whether to solve an object reference of the leak object 112 located in the external heap area 110, at the time of GC processing. If the reference solution flag 3009 has a value of "1," it is indicated that the above-described object reference should be solved in the GC processing. If the reference solution flag 3009 has a value of "0," it is indicated that the object reference should be solved in the import processing.

If the object reference should be solved in the GC processing, the leak object 112 relocated in the external heap area 110 becomes the subject of object reference update processing in the GC processing and processing necessary to execute object reference update processing. On the other hand, if the object reference should be solved in the import processing, the leak object relocated in the external heap area 110 is excluded from the subject of the GC processing.

As for fields in the leak object detection management information 208 other than the object detection execution flag 3001, the user can specify by using input from the setting file 106 or the input device 132 at the time of start of the Java VM.

Figure 4A:
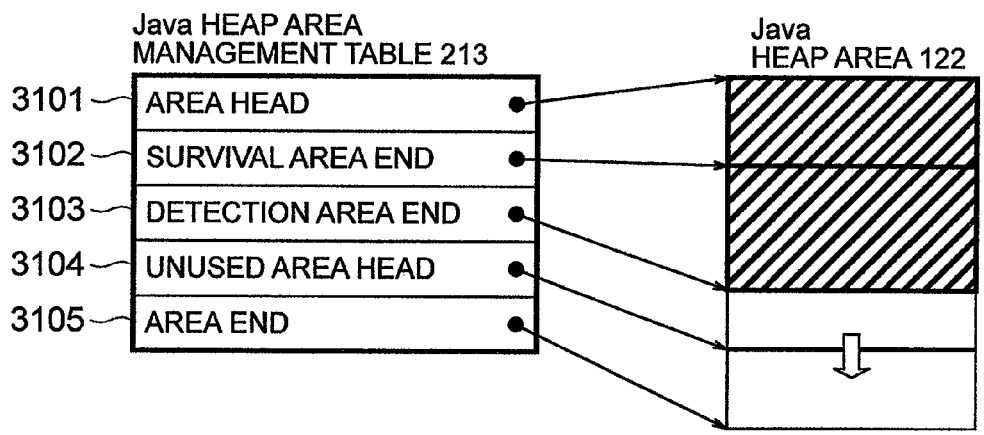
FIG. 4A is a diagram showing an example of a Java heap area management table for managing a Java heap area in an embodiment of the present invention.

FIG. 4A is a diagram showing an example of the Java heap area management table 213 for managing the Java heap area in the embodiment of the present invention.

The Java heap area management table 213 includes an area head 3101, a survival area end 3102, a detection area end 3103, an unused area head 3104 and an area end 3105.

The area head 3101 stores a head address of the Java heap area 122. The area end 3105 stores an end address of the Java heap area 122.

Figure 20:
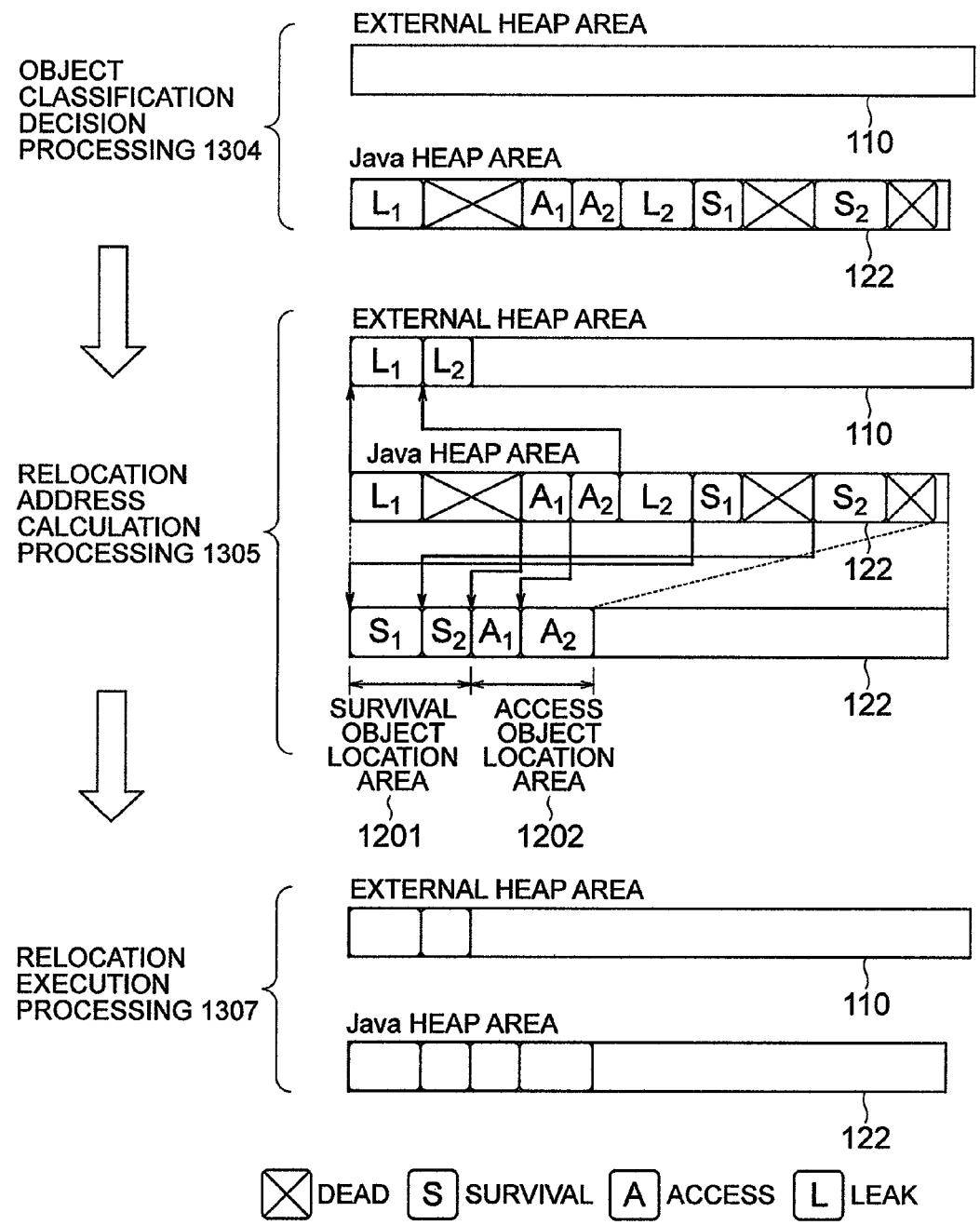
FIG. 20 is a diagram showing states of a Java heap area and an external heap area in a processing process of GC processing in an embodiment of the present invention.

The survival area end 3102 stores an end address of a survival object location area 1201 (see FIG. 20). By the way, the address stored in the survival area end 3102 is the same as a head address of an access object location area 1202.

The detection area end 3103 stores an end address of a leak object detection area which is set on the basis of the number of leak object detection area pages 3003 in the leak object detection management information 208.

The unused area head 3104 stores a head address of an unused area in the Java heap area 122. By the way, the address retained in the unused area head 3104 is the same as an end address of the access object location area 1202.

Figure 4B:
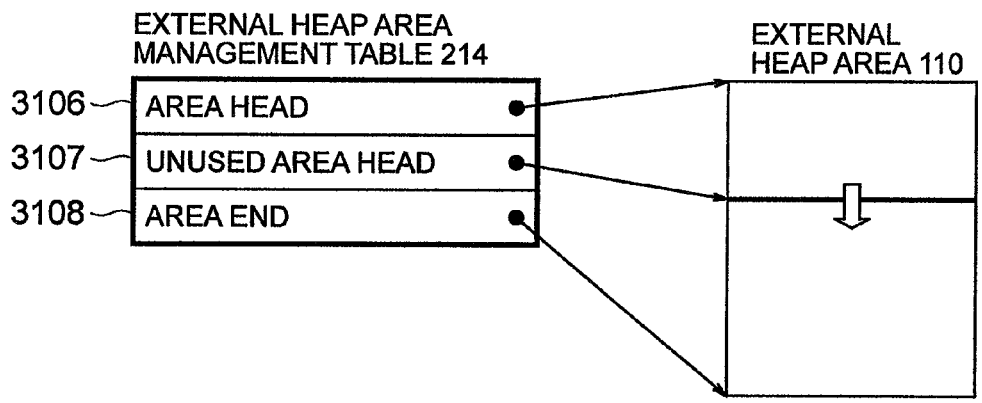
FIG. 4B is a diagram showing an example of an external heap area management table for managing an external heap area in an embodiment of the present invention.

FIG. 4B is a diagram showing an example of the external heap area management table 214 for managing the external heap area 110 in the embodiment of the present invention. The external heap area management table 214 is used when the external heap area 110 is allocated in the main storage 107.

An area head 3106 stores a head address of the external heap area 110. An area end 3108 stores an end address of the external heap area 110. An unused area head 3107 stores a head address of an unused area in the external heap area 110.

Figure 4C:
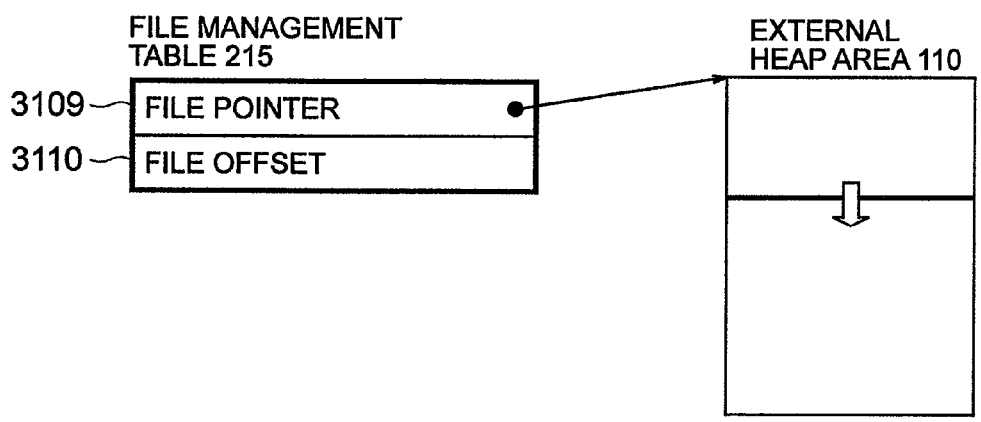
FIG. 4C is a diagram showing an example of a file management table to be used when an external heap area is allocated in a file stored in an auxiliary storage in an embodiment of the present invention.

FIG. 4C is a diagram showing an example of the file management table 215 to be used when the external heap area 110 is allocated in the file 105 stored in the auxiliary storage 102 in the embodiment of the present invention.

A file pointer 3109 stores a file pointer of the file 105. A file offset 3110 stores a file offset of the file 105.

Considering the execution performance of the Java VM 109, the performance is improved by locating objects in the physical address space. In the external heap area 110 for storing objects judged to have high possibility that a memory leak has occurred therein because the access frequency is low, however, the execution performance is not lowered remarkably even if the logical address space is applied. In the embodiment of the present invention, it is made possible to allocate the external heap area 110 in both the physical address space and the logical address space and it is also possible to allocate both the physical address space and the logical address space in operation.

In the embodiment of the present invention, the Java heap area 122 is allocated in the physical address space and the external heap area 110 is allocated in the logical address space, and the entity of the leak object 112 located in the external heap area 110 is recorded in an offset position of the file 105 corresponding to the logical address of the leak object 112. The file offset map 217 which retains mapping between logical addresses and file offsets will be described with reference to FIG. 9 later.

Figure 5:
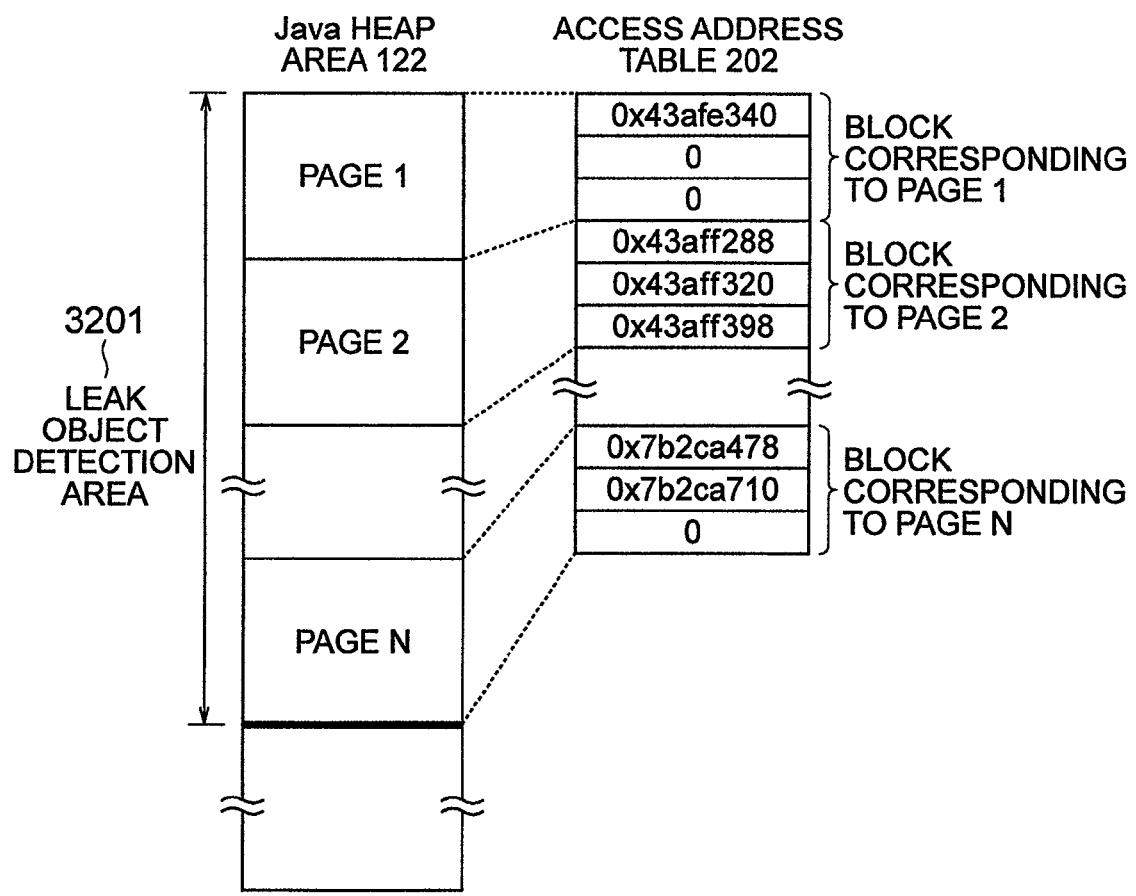
FIG. 5 is a table showing a leak object detection area and an access address table in an embodiment of the present invention.

FIG. 5 is a diagram showing the leak object detection area 3201 and the access address table 202 in the embodiment of the present invention.

The leak object detection area 3201 is an area where the leak object detection processing is executed, as described above. Pages are set in the Java heap area 122 on the basis of the number of leak object detection area pages 3003 in the leak object detection management information 208.

The access address table 202 contains blocks respectively corresponding to pages in the leak object detection area 3201. Each of the blocks includes as many fields as a number based on the number of access address collection times 3004 in the leak object detection management information 208. Each of the fields stores an access address 402 (see FIG. 11). In the initial state, a null value representing an unregistered state is stored in each of the fields.

Figures 6, 7:
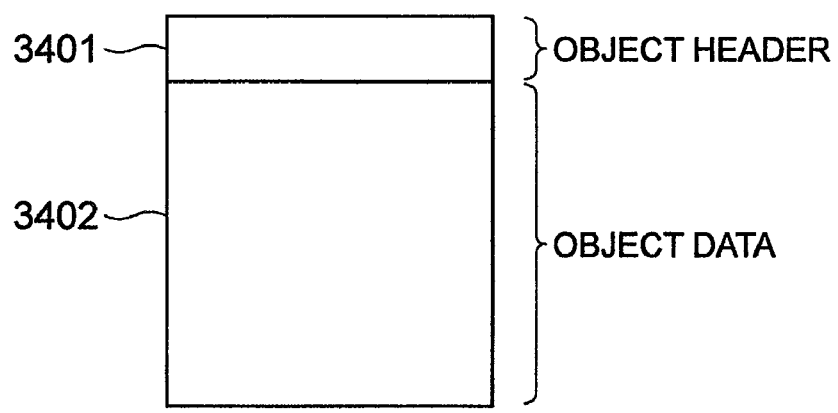
FIG. 6 is a diagram showing an example of a non-access object address table in an embodiment of the present invention.
FIG. 7 is a diagram showing an object structure in an embodiment of the present invention.

FIG. 6 is a diagram showing an example of a non-access object address table 205 in the embodiment of the present invention.

The non-access object address table 205 includes a non-access object address 3301 and the number of non-access times 3302.

The non-access object address 3301 stores an address of a non-access object 502. The number of non-access times 3302 stores the number of times the non-access object 502 specified by the non-access object address 3301 is collected consecutively by non-access object address collection processing executed by the non-access object address collection part 203. As the value of the number of non-access times 3302 becomes great, the non-access object 502 has a tendency to be not accessed at the present time.

Each field in the non-access object address 3301 is a subject of the object reference update processing conducted by the object reference update part 211. If an object specified by the non-access object address 3301 is relocated by the GC processing, therefore, the address stored in the non-access object address 3301 is also updated.

FIG. 7 is a diagram showing an object structure in the embodiment of the present invention. An object includes an object header 3401 and object data 3402.

The object header 3401 is management information of the object. The object data 3402 is a data main body of the object.

Since several low-order bits of a pointer to an object can be made 0 according to the size of the object header 3401, they can be used as a bit flag. For example, if the size of the object header 3401 is 8 bytes, three low-order bits of the pointer to the object become 0. In the embodiment of the present invention, several low-order bits of the pointer to the object are used as a bit flag in some cases.

FIG. 8 is a diagram showing an example of an object classification bit in the embodiment of the present invention. The value of the object classification bit corresponds to a classification of the object. In the embodiment of the present invention, two bits included in the object header 3401 are used as the object classification bit.

Specifically, if the object classification bit 3501 is "00," it is indicated that the object is a "dead" object which is an unnecessary object. If the object classification bit 3501 is "11," it is indicated that the object is a "leak" object which is an object having a high possibility of occurrence of a memory leak.

If the object classification bit 3501 is "10," it is indicated that the object is an "access" object which is an object that is recorded in the access address table 202 to have been accessed in immediately preceding method execution. If the object classification bit 3501 is "01," it is indicated that the object is a "survival" object which is not accessed in immediately preceding method execution, but accessed comparatively recently.

FIG. 9 is a diagram showing an example of the file offset map 217 in the embodiment of the present invention. The file offset map 217 includes an object address 3701 and a file offset 3702.

The object address 3701 stores a logical address of an object virtually located in the external heap area 110. The file offset 3702 retains a file offset of the file 105 in which the entity of an object pointed by the object address 3701 is recorded. The file offset indicates a relative position in the file.

When relocating an object from the Java heap area 122 to the external heap area 110 by conducting the GC processing, a virtual logical address is specified as the relocation destination and recorded in the object address 3701. And the virtual logical address specified as the relocation destination is set in a reference source object of the object as an object reference.

When relocating an object from the external heap area 110 to the Java heap area 122 by conducting the import processing, retrieval is conducted in the object address 3701 in order on the basis of an accessed logical address. When the pertinent address has been retrieved from the object address 3701, a file offset of the file 105 having the entity of the accessed object recorded therein is acquired and real data of the object recorded in the file 105 is accessed.

For example, if the accessed logical address is "0x642a4ab0", the address is greater than a logical address retained in a field 3703 of the object address and less than a logical address retained in a field 3704 of the object address. Therefore, the entity of the object is acquired from a field 3705 of the file offset corresponding to a field 3703 of the object address. When accessing real data of the object in the GC processing intended for the external heap area 110, the real data can also be accessed in accordance with a similar procedure. At the time of import processing, the object address 3701 in the file offset map 217 specifying an object relocated from the external heap area 110 to the Java heap area 122 is updated with a null value.

If the object address 3701 has a null value stored therein, it is indicated that a virtual object specified by the object address 3701 and an entity of the object corresponding thereto are not necessary. If a negative number is retained in the file offset 3702, it is indicated that relocation of the entity of the corresponding object is under way and access to the entity of the object in the import processing can be kept waiting until relocation of the entity of the object is completed.

Hereafter, an outline of a method for detecting a leak object in the embodiment of the present invention will be described.

Figure 10:
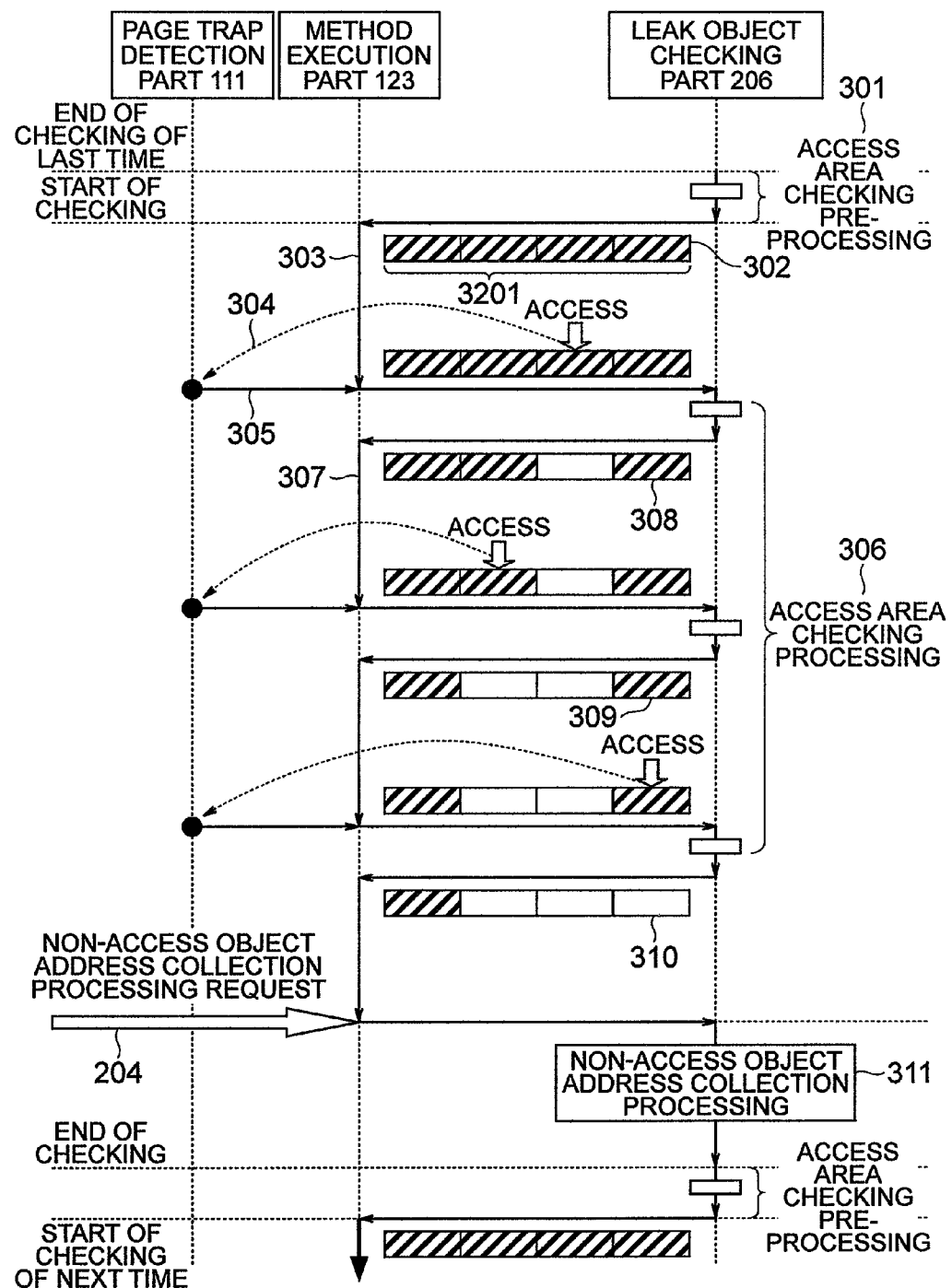
FIG. 10 is a diagram showing execution transitions in processing conducted by a page trap detection part, a method execution part and a leak object checking part in an embodiment of the present invention.

FIG. 10 is a diagram showing execution transitions in processing conducted by the page trap detection part 111, the method execution part 123 and the leak object checking part 206 in the embodiment of the present invention.

In the leak object detection method in the embodiment of the present invention, access area checking preprocessing is first executed before method execution (step 301). Access area checking processing is executed during method execution (step 306). Non-access object address collection processing is executed before terminating the leak object checking processing (step 311).

In the access area checking preprocessing, page trap is set to detect access to an object stored in the leak object detection area 3201 in the Java heap area 122 during method execution. A state 302 is a state of the leak object detection area 3201 after the page trap setting. In FIG. 10, the Java heap area 122 is divided into four pages and pages that are not accessed are shaded. The state 302 represents a state in which any page is not accessed.

Upon termination of the access area checking preprocessing 301, the processor 131 executes the method (step 303). Details of the access area checking preprocessing will be described with reference to FIG. 16 later.

If an object included in the leak object detection area 3201 is accessed, the processor 131 gives a notice to the page trap detection part 111 via the operating system 128 (step 304).

On the basis of contents of the notice, the page trap detection part 111 requests the access area checking part 201 to conduct access area checking processing (step 305). In addition, a transition is made from processing conducted by the method execution part 123 to processing conducted by the access area checking part 201 (step 306).

After execution of the access area checking processing, a transition to the processing conducted by the method execution part 123 is made and method execution is continued (step 307). The state of the leak object detection area 3201 after the execution of the access area checking becomes a state 308. In the state 308, an accessed page is represented as a blank. An outline of the access area checking processing will be described with reference to FIG. 11 later, and details thereof will be described with reference to FIG. 17 later.

If the method execution is continued, the processor 131 releases the page trap in the leak object detection area 3201 according to access situation. For example, the state of the leak object detection area 3201 becomes a state 309, then a state 310.

Upon accepting a non-access object address collection processing request 204, the processor 131 makes a transition from processing conducted by the method execution part 123 to processing conducted by the non-access object address collection part 203 (step 311) and terminates the leak object checking processing. An outline of the non-access object address collection processing will be described with reference to FIG. 12 later, and details thereof will be described with reference to FIG. 18 later.

In the embodiment of the present invention, the non-access object address collection processing is requested by the GC execution part 115. Execution of the non-access object address collection processing may be requested by the access area checking part 201 on the basis of the number of times of execution of access area checking processing or execution time of access area checking.

A page trap is set in the external heap area 110 to detect access to the leak object 112 stored in the external heap area 110 during method execution. If the leak object 112 stored in the external heap area 110 is accessed during method execution, the page trap detection part 111 is given a notice to that effect. The page trap detection part 111 requests the import execution part 114 to conduct import processing, on the basis of contents of the notice.

Upon being requested to conduct the import processing, the processor 131 causes a transition from the processing conducted by the method execution part 123 to the processing conducted by the import execution part 114 and executes import processing. The import processing is processing for restoring the leak object 112 excluded from the subject of the GC processing by relocating it in the external heap area 110 to the subject of the GC processing by relocating it in the Java heap area 122. After execution of the import processing, a transition of execution to the processing conducted by the method execution part 123 is made and the method execution is continued. Details of the import processing will be described with reference to FIG. 33 later.

Figure 11:
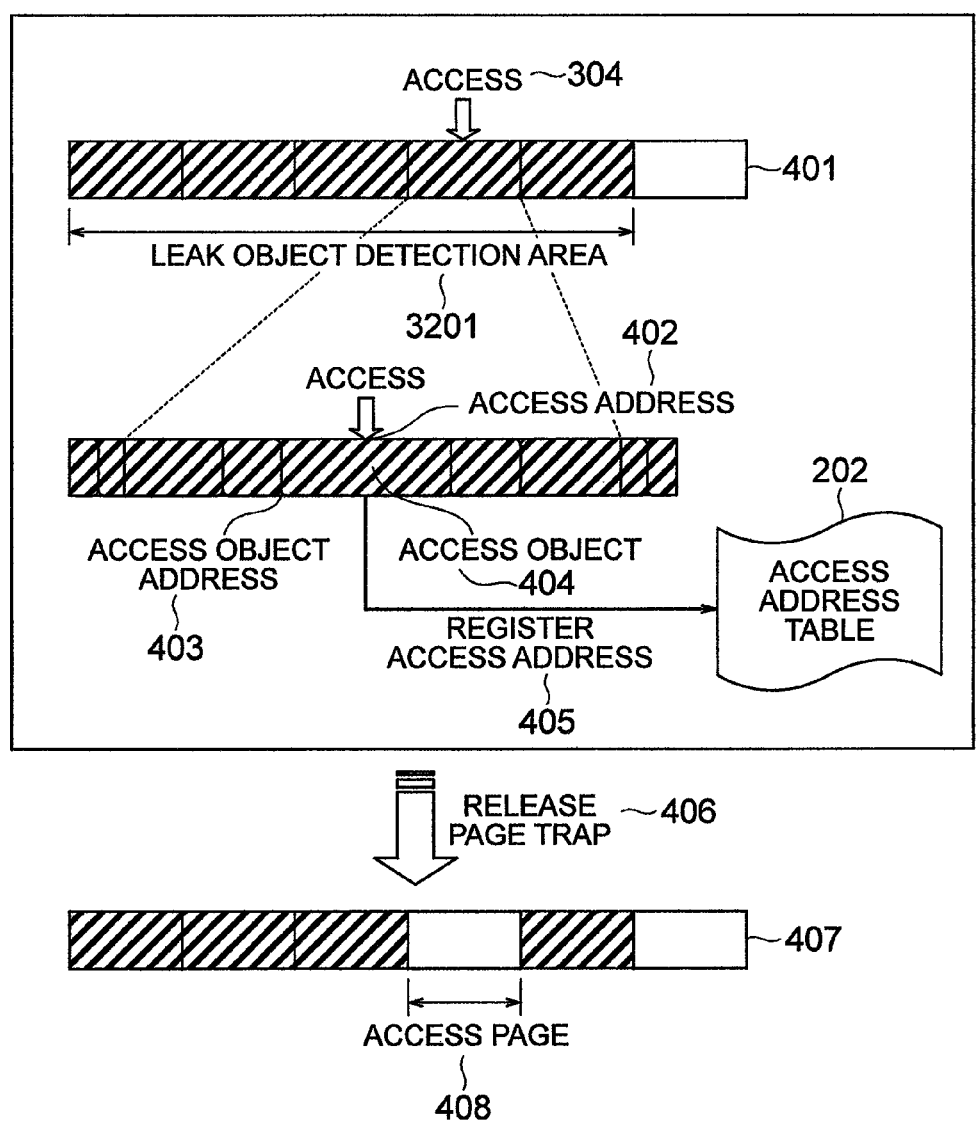
FIG. 11 is a diagram showing an outline of access area checking processing conducted by an access area checking part in an embodiment of the present invention.

FIG. 11 is a diagram showing an outline of access area checking processing conducted by the access area checking part 201 in the embodiment of the present invention.

In the access area checking processing, page trap of an access page 408 is released (step 406). The access page 408 is a page included in the leak object detection area 3201 in which an access object 404 accessed by method execution is located. The leak object detection area 3201 changes from a state 401 to a state 407 in consequence of the page trap release.

When releasing the page trap of the access page 408, an access address 402 which is an actually accessed address is registered in the access address table 202 according to detection precision of the required leak object (step 405).

An access object address 403 which is a head address of the access object 404 may be registered. In this case, the overhead of the access area checking processing 307 becomes great, but the processing for acquiring the access object address 403 can be omitted thereafter. In the embodiment of the present invention, the access address 402 is registered in the access address table 202 in the access area checking processing 307 and the access object address 403 is acquired from the access address 402 as occasion demands in the GC processing.

Figure 12:
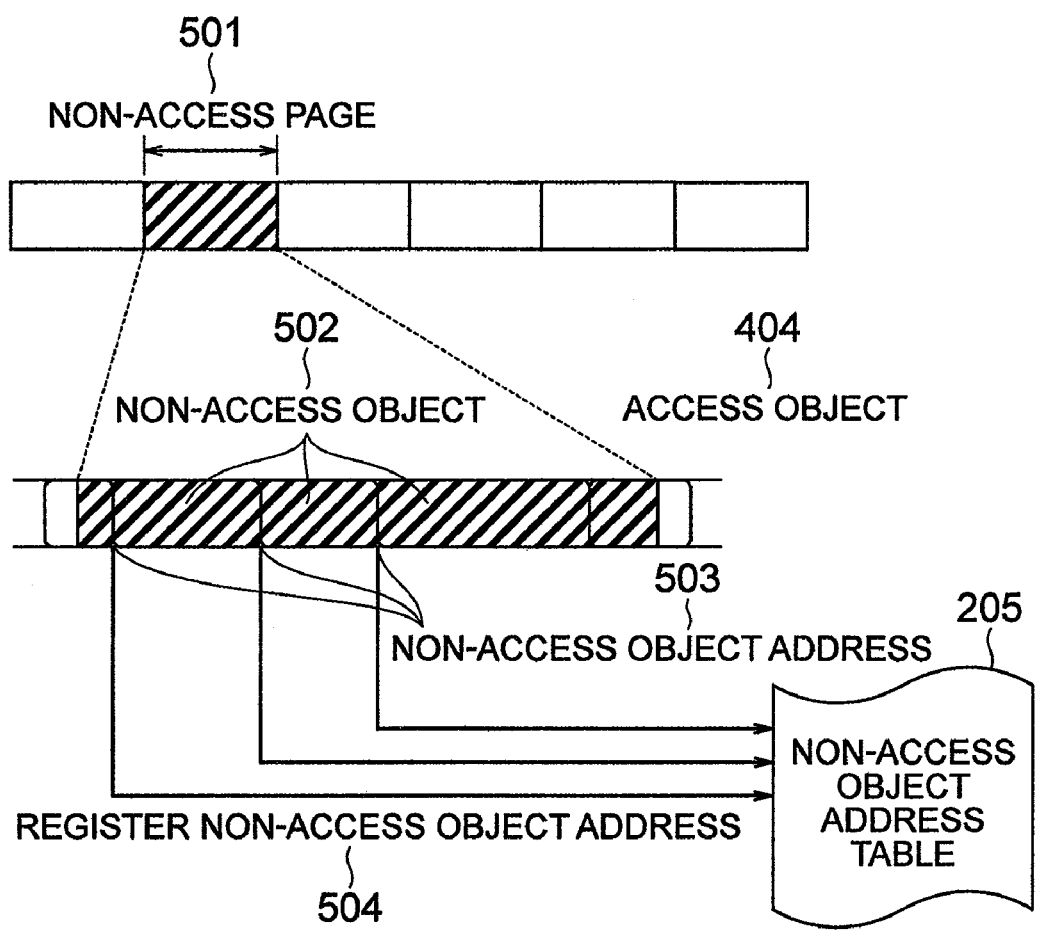
FIG. 12 is a diagram showing an outline of non-access object address collection processing conducted by a non-access object address collection part in an embodiment of the present invention.

FIG. 12 is a diagram showing an outline of non-access object address collection processing conducted by the non-access object address collection part 203 in the embodiment of the present invention.

In the non-access object address collection processing, a non-access object 502 which is an object located in a non-access page 501 is acquired. And a non-access object address 503 which is a head address of the non-access object 502 is registered in the non-access object address table 205 (step 504).

By the way, the non-access page 501 is a page which is included in the leak object detection area 3201 and which is not released from the page trap by the access area checking processing 307. If the whole object is not included in the non-access page 501, the object is handled as the access object 404 in the embodiment of the present invention.

Hereafter, processing conducted by respective parts in the leak object detection method in the embodiment of the present invention will be described.

Figure 13:
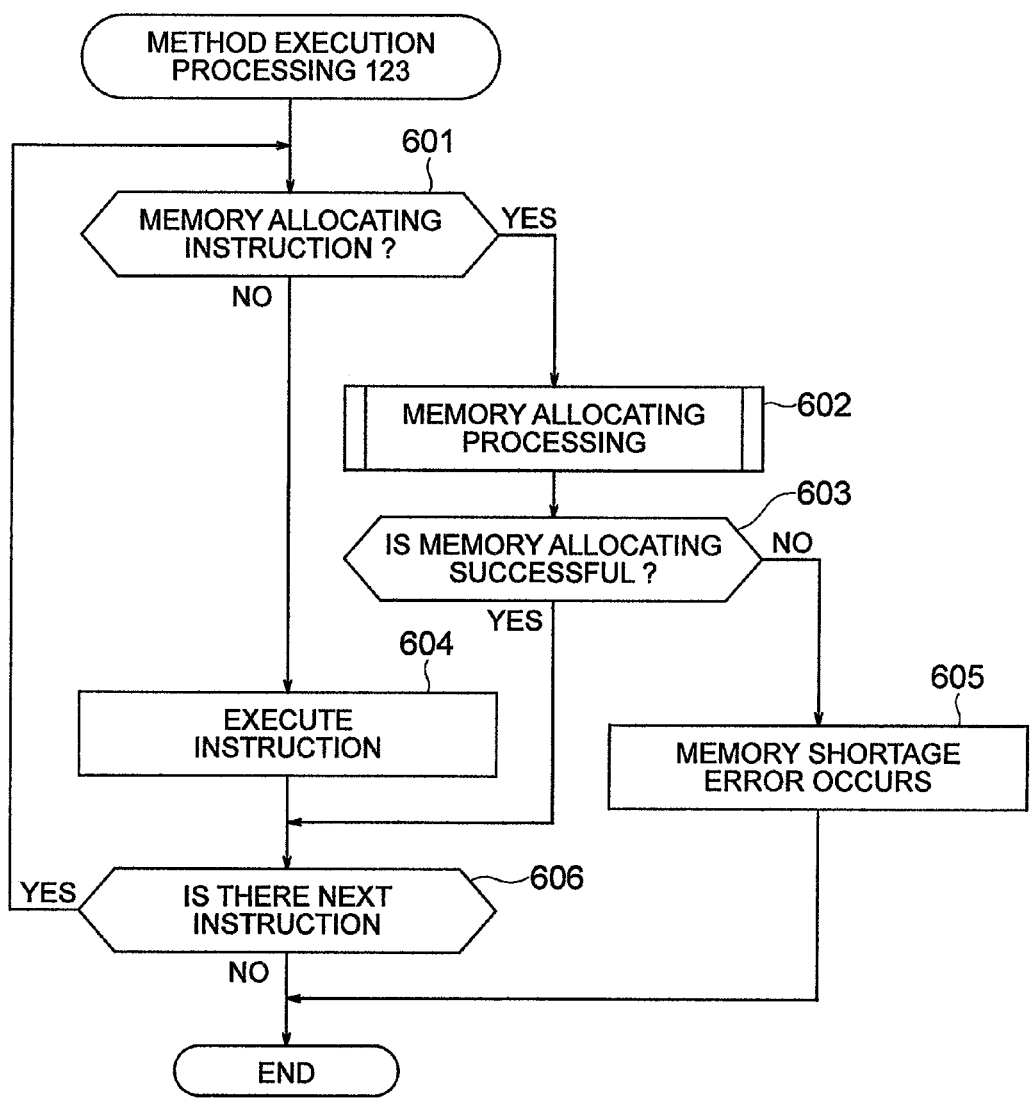
FIG. 13 is a flow chart showing a procedure of method execution processing.

FIG. 13 is a flow chart showing a procedure of the method execution processing in the embodiment of the present invention. The present processing is executed by processing conducted on the method execution part 123 by the processor 131.

Before executing the method execution part 123, the processor 131 first analyzes the Java class file 103 accepted by the Java VM 109. Subsequently, the processor 131 extracts a method from the Java class file 103 by using the method reading part 113 and generates the compiled codes 125 by using the dynamic compiler part 116. The processor 131 executes the generated compiled codes 125 one after another. The compiled code 125 includes at least one instruction, and each instruction is provided with an instruction classification.

In the method execution part 123, processing is executed on the basis of an instruction classification of a method to be executed.

The processor 131 first makes a decision whether the instruction classification of the method to be executed is the memory allocating instruction (step 601). If the instruction classification is not the memory allocating instruction (a result at the step 601 is "NO"), the subject instruction is executed (step 604).

If the instruction classification is the memory allocating instruction (the result at the step 601 is "YES"), the processor 131 executes the memory allocating part 121 and executes the memory allocating processing (step 602). After the memory allocating processing is finished, the processor 131 makes a decision whether memory allocating has succeeded (step 603).

If the memory allocating has failed (a result at the step 603 is "NO"), the processor 131 interrupts the method execution and a memory shortage error is generated (step 605).

If the memory allocating has succeeded (the result at the step 603 is "YES") or the processing at the step 604 has finished, the processor 131 makes a decision whether there is the next instruction to be executed (step 606).

If there is the next instruction to be executed (a result at the step 606 is "YES"), the processor 131 executes the processing at the step 601 and continues the method execution processing. If processing of all instructions has been finished (the result at the step 606 is "NO"), the processor 131 terminates the method execution processing.

Figure 14:
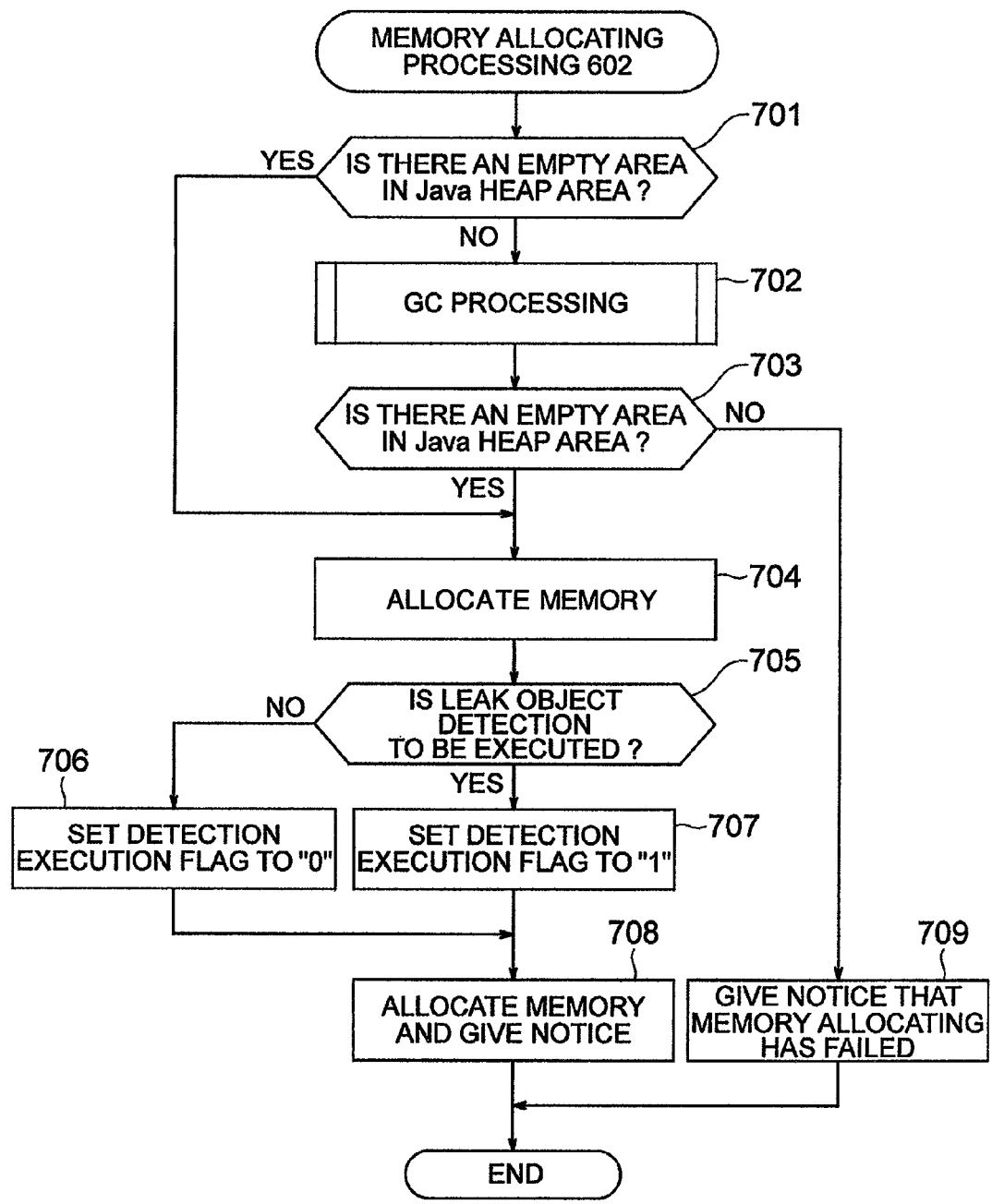
FIG. 14 is a flow chart showing a procedure of memory allocating processing in an embodiment of the present invention.

FIG. 14 is a flow chart showing a procedure of the memory allocating processing 602 in the embodiment of the present invention. The present processing is executed by processing conducted on the memory allocating part 121 by the processor 131.

The processor 131 makes a decision whether a memory having a requested amount can be allocated in the Java heap area 122 (step 701). Specifically, the processor 131 first refers to the Java heap area management table 213, and acquires values of the unused area head 3104 and the area end 3105. Subsequently, the processor 131 calculates an unused memory amount in the Java heap area 122 and compares it with the requested memory amount used.

If the memory of the requested amount cannot be allocated in the Java heap area 122 (a result at the step 701 is "NO"), the processor 131 executes the GC processing to release unnecessary memory areas (step 702). Details of the GC processing will be described with reference to FIG. 19 later.

After the execution of the GC processing, the processor 131 makes a decision again whether the memory of the requested amount can be allocated in the Java heap area 122 (step 703). If the memory of the requested amount cannot be allocated in the Java heap area 122 (a result at the step 703 is "NO"), the processor 131 notifies the execution source of the memory allocating processing that the memory allocating has failed (step 709).

If the memory of the requested amount can be allocated in the Java heap area 122 (the result at the step 701 or the step 703 is "YES"), the processor 131 allocates the memory of the requested amount in the Java heap area 122 and updates the address of the unused area head 3104 on the basis of the allocated memory size (step 704).

Subsequently, the processor 131 makes a decision whether to execute the leak object detection processing (step 705). Specifically, the processor 131 acquires the area head 3101 and the unused area head 3104 from the Java heap area management table 213, and calculates a memory amount used in the Java heap area 122. On the basis of the acquired memory amount used in the Java heap area 122, the processor 131 conducts comparison with the leak object detection execution condition 3002 in the leak object detection management information 208.

When executing the leak object detection processing (a result at the step 705 is "YES"), the processor 131 sets the object detection execution flag 3001 in the leak object detection management information 208 to "1" (step 707). When not executing the leak object detection processing (the result at the step 705 is "NO"), the processor 131 sets the object detection execution flag 3001 in the leak object detection management information 208 to "0" (step 706).

If the processing at the step 706 or the processing at the step 707 finishes, the processor 131 gives a notice of a allocated memory to the execution source of the memory allocating processing (step 708). If the processing at the step 708 or the processing at the step 709 finishes, the present processing is terminated.

Figure 15:
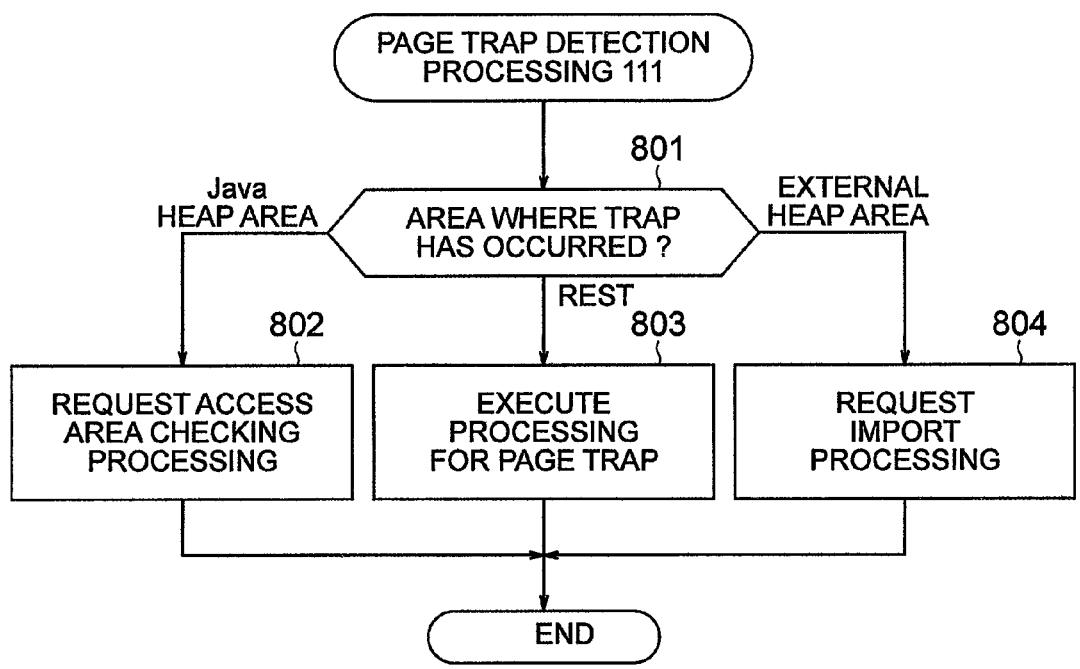
FIG. 15 is a flow chart showing a procedure of page trap detection processing in an embodiment of the present invention.

FIG. 15 is a flow chart showing a procedure of page trap detection processing in the embodiment of the present invention. The present processing is executed by processing conducted on the page trap detection part 111 by the processor 131. The page trap detection part 111 may be resident in the main storage during execution of the Java VM.

Upon receiving a notice that a page trap has occurred from the operating system 128, the processor 131 makes a decision as to an area where the page trap has occurred (step 801). Specifically, the processor 131 refers to the area head 3101 and the area end 3105 in the Java heap area management table 213 and the area head 3106 and the area end 3108 in the external heap area management table 214, and makes a decision on the basis of contents of the accepted notice.

If a page trap has occurred in the Java heap area 122 (a result at the step 801 is "Java heap area"), the processor 131 starts the access area checking processing by executing the access area checking part 201 (step 802).

If a page trap has occurred in the external heap area 110 (the result at the step 801 is "external heap area"), the processor 131 starts the import processing by executing the import part 114 (step 804).

If a page trap has occurred in an area other than Java heap area 122 and the external heap area 110 (the result at the step 801 is "the rest"), the processor 131 executes processing requested for the page trap (step 803).

If the processing at the step 802, the processing at the step 803, or the processing at the step 804 is finished, the present processing is terminated.

Figure 16:
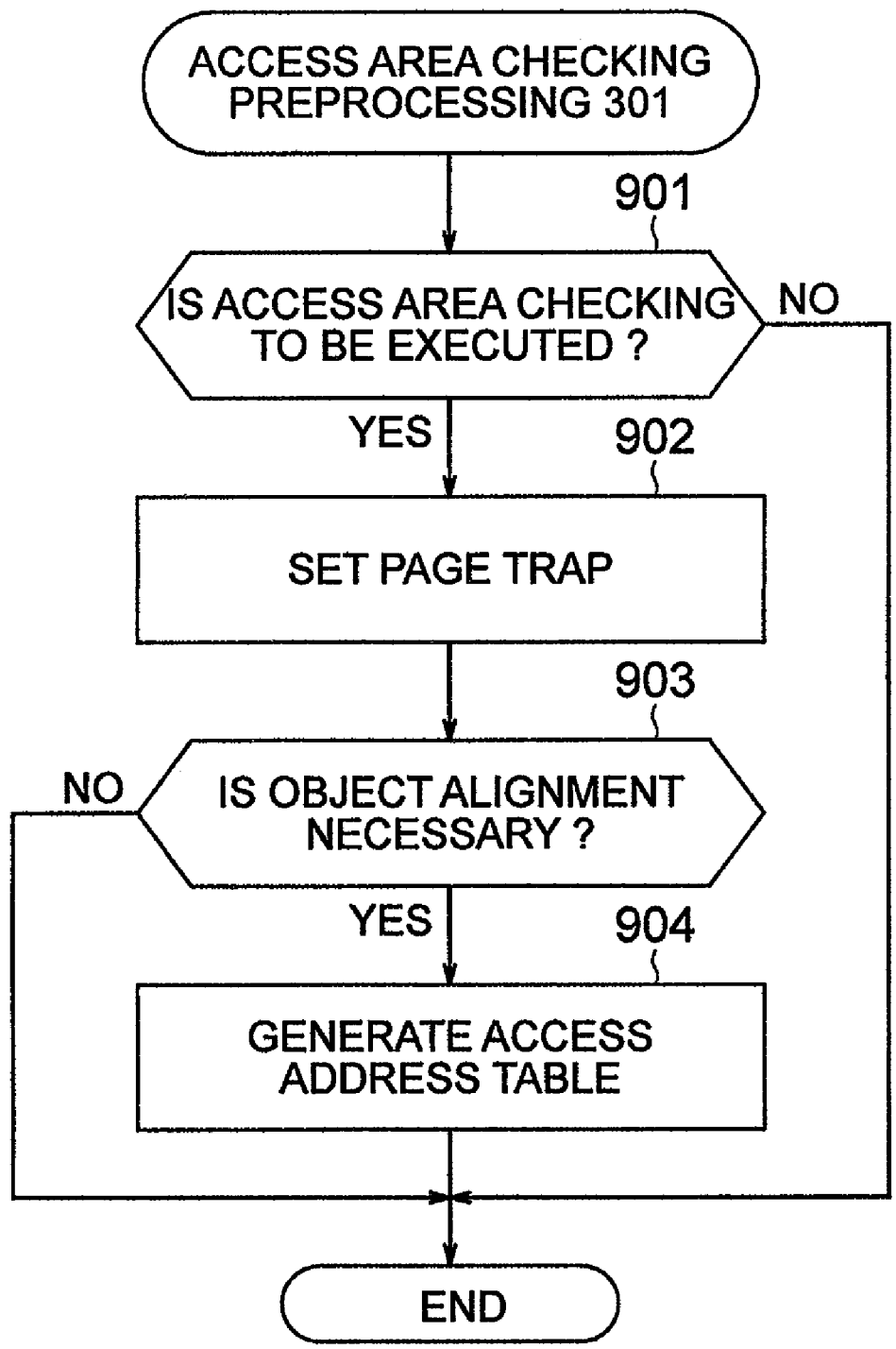
FIG. 16 is a flow chart showing a procedure of access area checking preprocessing in an embodiment of the present invention.

FIG. 16 is a flow chart showing a procedure of access area checking preprocessing in the embodiment of the present invention. The present processing is executed by the processor 131 before the method execution in the processing of the leak object checking part 206.

The processor 131 first refers to the leak object detection execution flag 3001 in the leak object detection management information 208, and makes a decision whether to execute access area checking (step 901).

When executing the access area checking (a result at the step 901 is "YES"), the processor 131 sets the page trap in an area corresponding to the leak object detection area 3201 in the Java heap area 122 on the basis of the number of leak object detection area pages 3003 in the leak object detection management information 208 (step 902).

Subsequently, the processor 131 refers to the object alignment execution flag 3006 in the leak object detection management information 208, and makes a decision whether to execute object alignment at the time of object relocation using the GC processing (step 903).

When executing the object alignment at the time of object relocation using the GC processing (a result at the step 903 is "YES"), the processor 131 generates the access address table 202 to be used in the access area checking processing (step 904).

When the access area checking is not executed (the result at the step 901 is "NO"), when the object alignment is not executed at the time of object relocation using the GC processing (the result at the step 903 is "NO"), or when the processing at the step 904 is finished, the present processing is finished.

Figure 17:
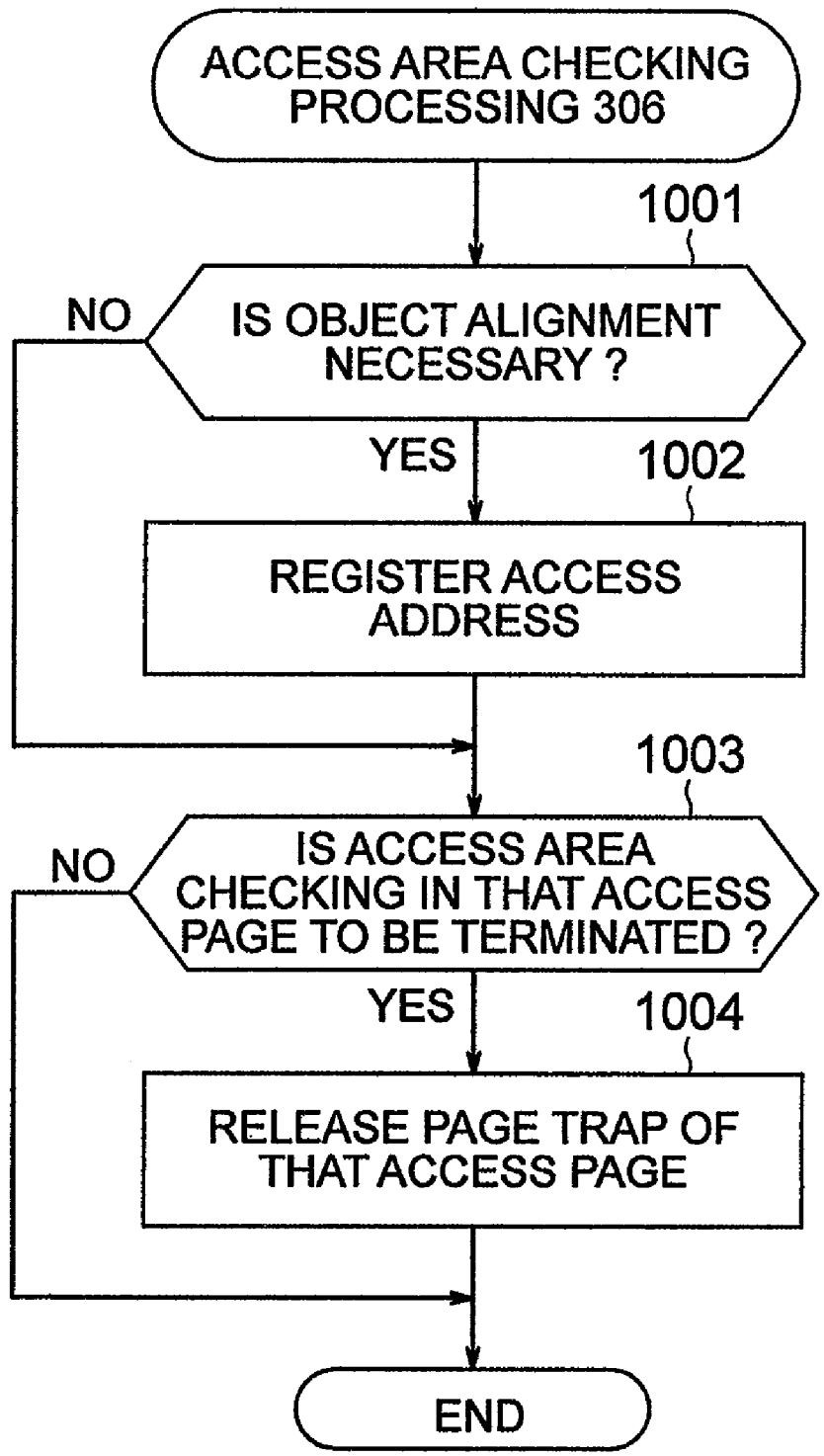
FIG. 17 is a flow chart showing a procedure of access area checking processing in an embodiment of the present invention.

FIG. 17 is a flow chart showing a procedure of access area checking processing in the embodiment of the present invention. The present processing is executed by processing conducted on the access area checking part 201 by the processor 131.

The processor 131 first refers to the object alignment execution flag 3006 in the leak object detection management information 208, and makes a decision whether to execute object alignment at the time of object relocation using the GC processing (step 1001).

When executing the object alignment at the time of object relocation using the GC processing (a result at the step 1001 is "YES"), the processor 131 registers the access address 402 in the access address table 202 (step 1002).

When the object alignment is not executed at the time of object relocation using the GC processing (the result at the step 1001 is "NO"), or when the processing at the step 1002 is finished, the processor 131 makes a decision whether to terminate the access area checking in the access page (step 1003). Specifically, the processor 131 makes a decision whether to terminate the access area checking in the access page by comparing the number of registrations to a block for the access page in the access address table 202 with the number of access address collection times 3004 in the leak object detection management information 208.

When terminating the access area checking processing (a result at the step 1003 is "YES"), the processor 131 releases the page trap of the access page (step 1004). If the page trap of the access page is released, the processor 131 does not execute the access area checking in the access page until leak object checking of the next time. By doing so, the overhead caused during the method execution by the leak object detection processing can be held down.

When the access area checking processing is not to be finished (the result at the step 1003 is "NO") or the processing at the step 1004 is finished, the present processing is terminated.

Figure 18:
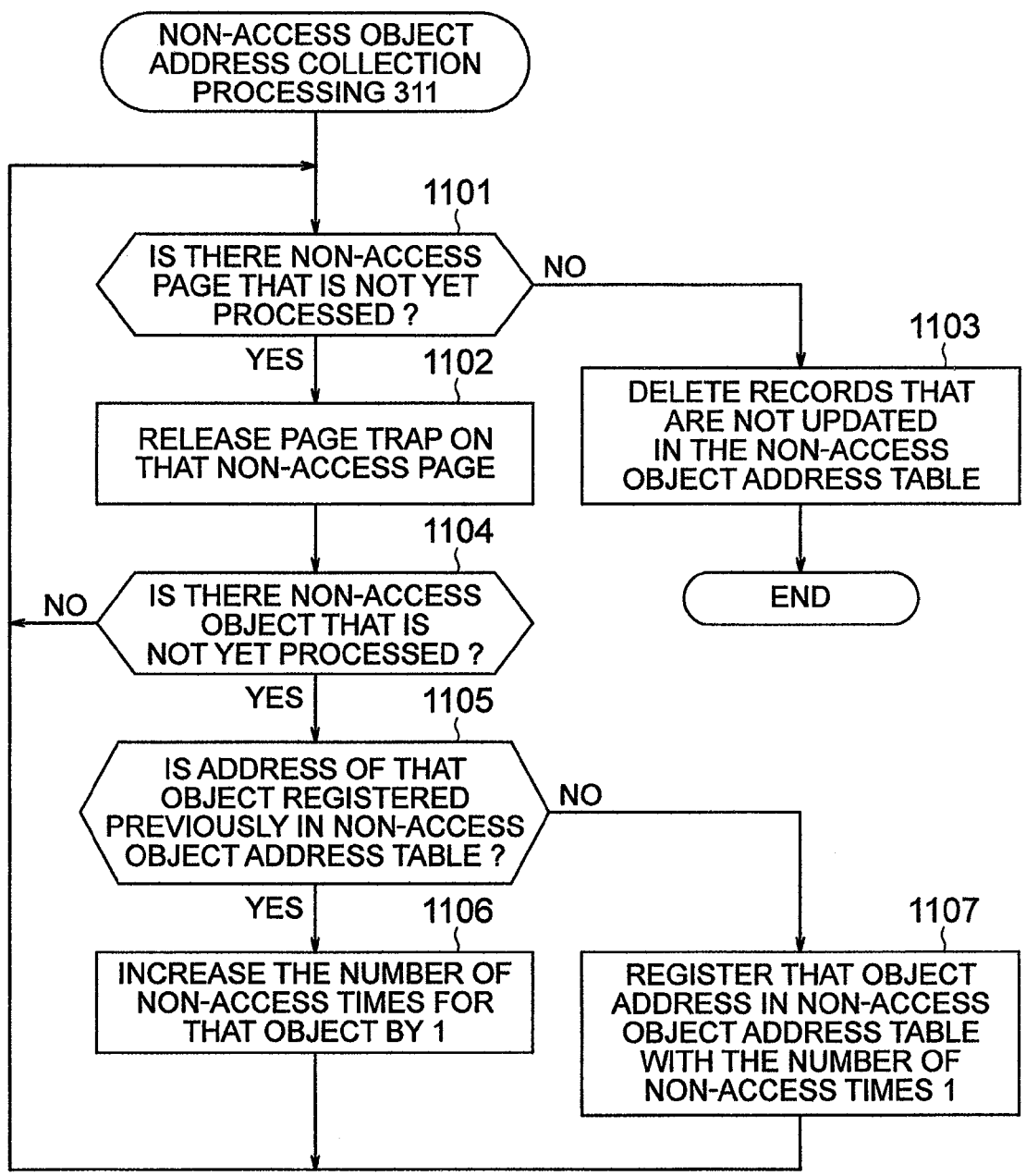
FIG. 18 is a flow chart showing a procedure of non-access object address collection processing in an embodiment of the present invention.

FIG. 18 is a flow chart showing a procedure of non-access object address collection processing in the embodiment of the present invention. The present processing is executed by processing conducted on the non-access object address collection part 203 by the processor 131. The present processing is executed when the non-access object address collection processing request 204 is accepted at the time of execution of the leak object detection processing.

The processor 131 first makes a decision whether the non-access page 501 that is not yet processed is present in the leak object detection area 3201 (step 1101). If the non-access page 501 that is not yet processed is present in the leak object detection area 3201 (a result at the step 1101 is "YES"), the processor 131 releases the page trap on the non-access page (step 1102).

Subsequently, the processor 131 makes a decision whether the non-access object 502 that is not yet processed is present in the page released from the page trap (step 1104). If the non-access object 502 that is not yet processed is present in the leak object detection area 3201 (a result at the step 1104 is "YES"), the processor 131 refers to the non-access object address 3301 in the non-access object address table 205 and makes a decision whether the address of the object has been registered previously (step 1105).

If the address of the object has been registered previously (a result at the step 1105 is "YES"), the value of the number of non-access times 3302 in the non-access object address table 205 corresponding to the object address is increased by "1" (step 1106).

If the address of the object has not been registered previously (a result at the step 1105 is "NO"), the processor 131 registers "the address of the object" in the non-access object address 3301 in the non-access object address table 205 and registers "1" in the number of non-access times 3302 (step 1107).

If the non-access object 502 that is not yet processed is not present in the leak object detection area 3201 (a result at the step 1104 is "NO"), the processor 131 executes the processing at the step 1101 after the processing at the step 1106 has finished or the processing at the step 1107 has finished, and continues the non-access object address collection processing.

If the non-access page 501 that is not yet processed is not present in the leak object detection area 3201 (the result at the step 1101 is "NO"), the processor 131 deletes records in the non-access object address 3301 that are not updated in the non-access object address table 205 (step 1103). If the processing at the step 1103 is finished, the processor 131 terminates the present processing.

Figure 19:
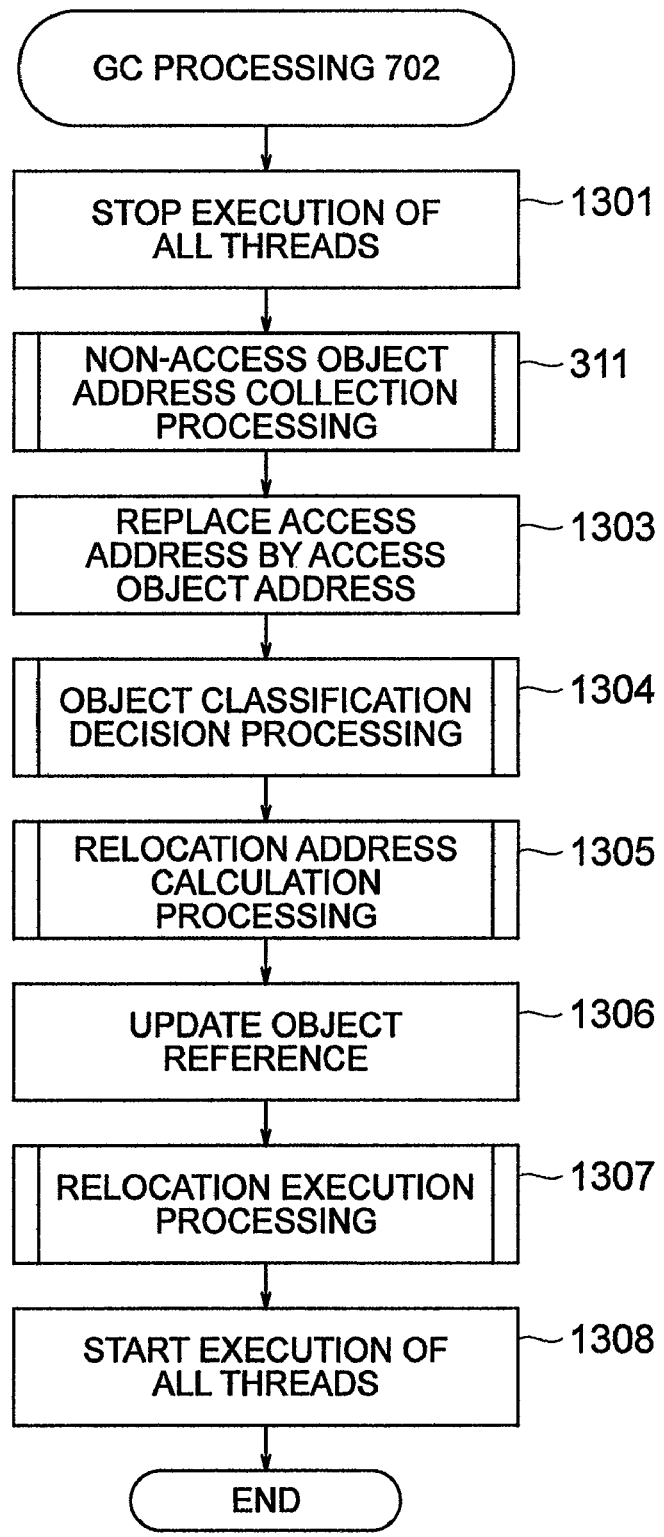
FIG. 19 is a flow chart showing a procedure of GC processing in an embodiment of the present invention.

FIG. 19 is a flow chart showing a procedure of the GC processing 702 in the embodiment of the present invention. The present processing is executed by processing conducted on the GC execution part 115 by the processor 131.

The processor 131 first stops all threads other than the thread for executing the GC processing (step 1301). Subsequently, the processor 131 processes the non-access object address collection part 203 and thereby executes the non-access object address collection processing (step 311). The non-access object address collection processing is the processing described with reference to FIG. 18 earlier.

While scanning the Java heap area 122, the processor 131 acquires the access object address 403 on the basis of the access address 402 registered in the access address table 202, and replaces the access address 402 by the access object address 403 (step 1303). By the way, if the access address 402 is not registered in the access address table 202 on the basis of the object alignment execution flag 3006 in the leak object detection management information 208, nothing is conducted in the processing at the step 1303.

The processor 131 executes the object classification decision processing by processing the object classification decision part 209, and makes a decision as to object classifications of all objects stored in the Java heap area 122 (step 1304). Details of the object decision processing will be described with reference to FIG. 21 later.

The processor 131 executes relocation address calculation processing by processing the relocation address calculation part 210, and calculates an address to which the object should be relocated, on the basis of the object classification judged in the processing at the step 1304 (step 1305). Details of the relocation address calculation processing will be described with reference to FIG. 30 later.

The processor 131 executes the object reference update part 211, and thereby updates the object reference so as to cause the reference destination of the object reference to become the relocation address of the reference destination object calculated in the processing at the step 1305 (step 1306).

The processor 131 executes relocation execution processing by processing the relocation execution part 212 and actually relocates the object in the relocation address of the object calculated in the processing at the step 1305 (step 1307). Details of the relocation execution processing will be described with reference to FIG. 31 later.

Finally, the processor 131 resumes the execution of the threads that have been stopped (step 1308) and terminates the present processing.

FIG. 20 is a diagram showing states of the Java heap area 122 and the external heap area 110 in a processing process of the GC processing 702 in the embodiment of the present invention. In FIG. 20, a state after the execution of the object classification decision processing 1304 is shown in a top part. A state after the execution of the relocation address calculation processing 1305 is shown in a middle part. A state after the execution of the relocation execution processing 1307 is shown in a bottom part. Outlines of the respective states will now be described. Details of the states will be described together with processing procedures.

In the state after the execution of the object classification decision processing 1304 shown in the top part of FIG. 20, objects stored in the Java heap area 122 are provided with object classifications. "L" stands for a leak object, "A" stands for an access object, and "S" stands for a survival object. A numeral accompanying an object classification is added for convenience to identify an individual object having the same object classification. The access object is an object judged to have been accessed by the leak object detection processing. The survival object is an object that is not accessed in the leak object detection processing in which the GC processing 702 is executed this time, but that is accessed recently.

In the state after the execution of the relocation address calculation processing 1305 shown in the middle part of FIG. 20, relocation addresses have been calculated on the basis of object classifications provided to objects by the object classification decision processing 1304.

The state obtained after the execution of the relocation execution processing 1307 shown in the bottom part of FIG. 20 is a state after the objects are relocated on the basis of calculation results of the relocation address calculation processing 1305.

Figure 21:
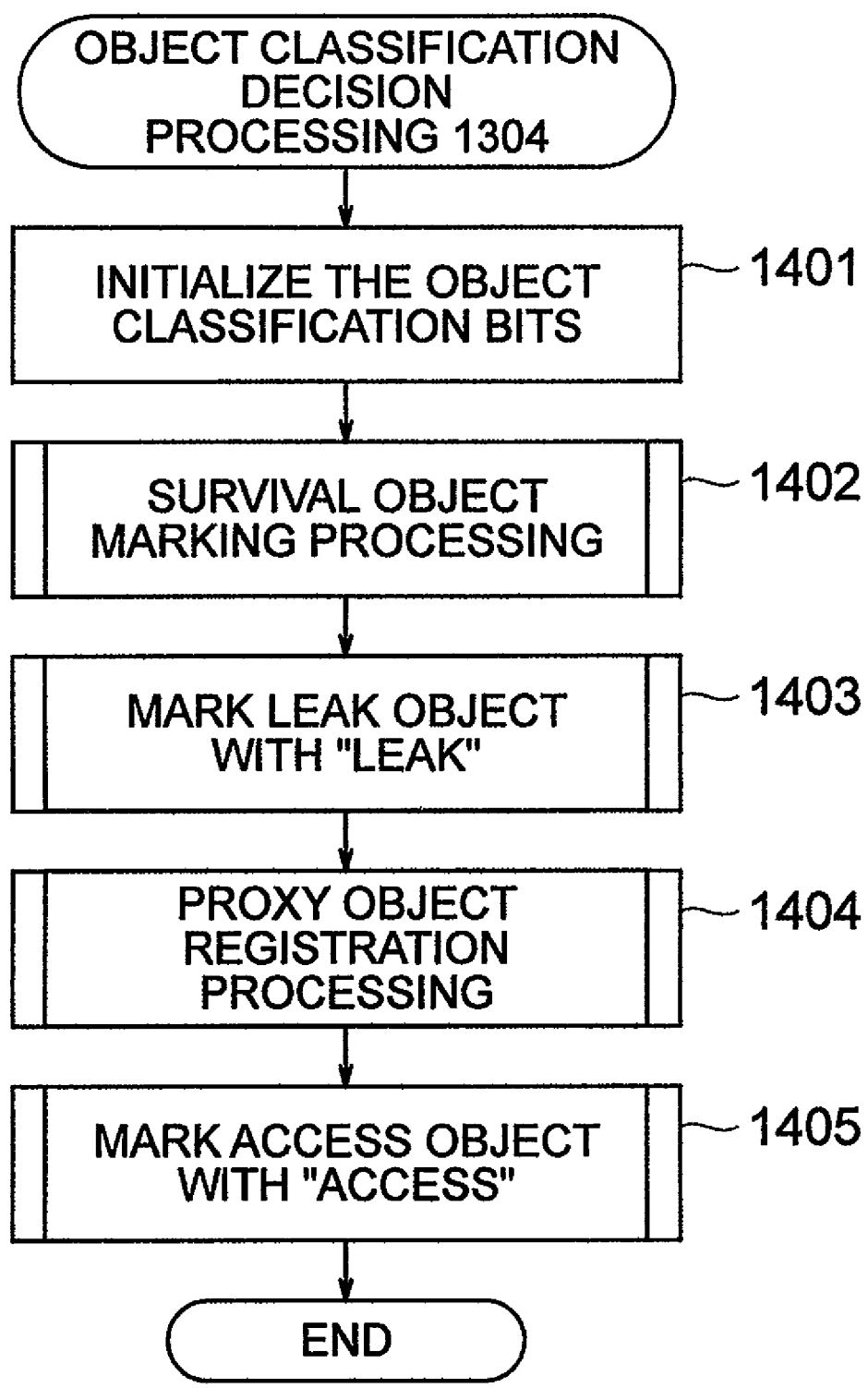
FIG. 21 is a flow chart showing a procedure of object classification decision processing in an embodiment of the present invention.

FIG. 21 is a flow chart showing a procedure of object classification decision processing in the embodiment of the present invention. The present processing is executed by processing conducted on the object classification decision part 209 by the processor 131.

The processor 131 first initializes the object classification of the object header 3401 to the "dead" state (step 1401).

Subsequently, the processor 131 executes survival object marking processing (step 1402). In the survival object marking processing, the object header 3401 of the survival object is set to the state of the object classification "survival." FIG. 22 is a diagram showing states of the Java heap area 122 and the external heap area 110, observed at an end time point of the survival object marking processing 1402.

Figure 22:
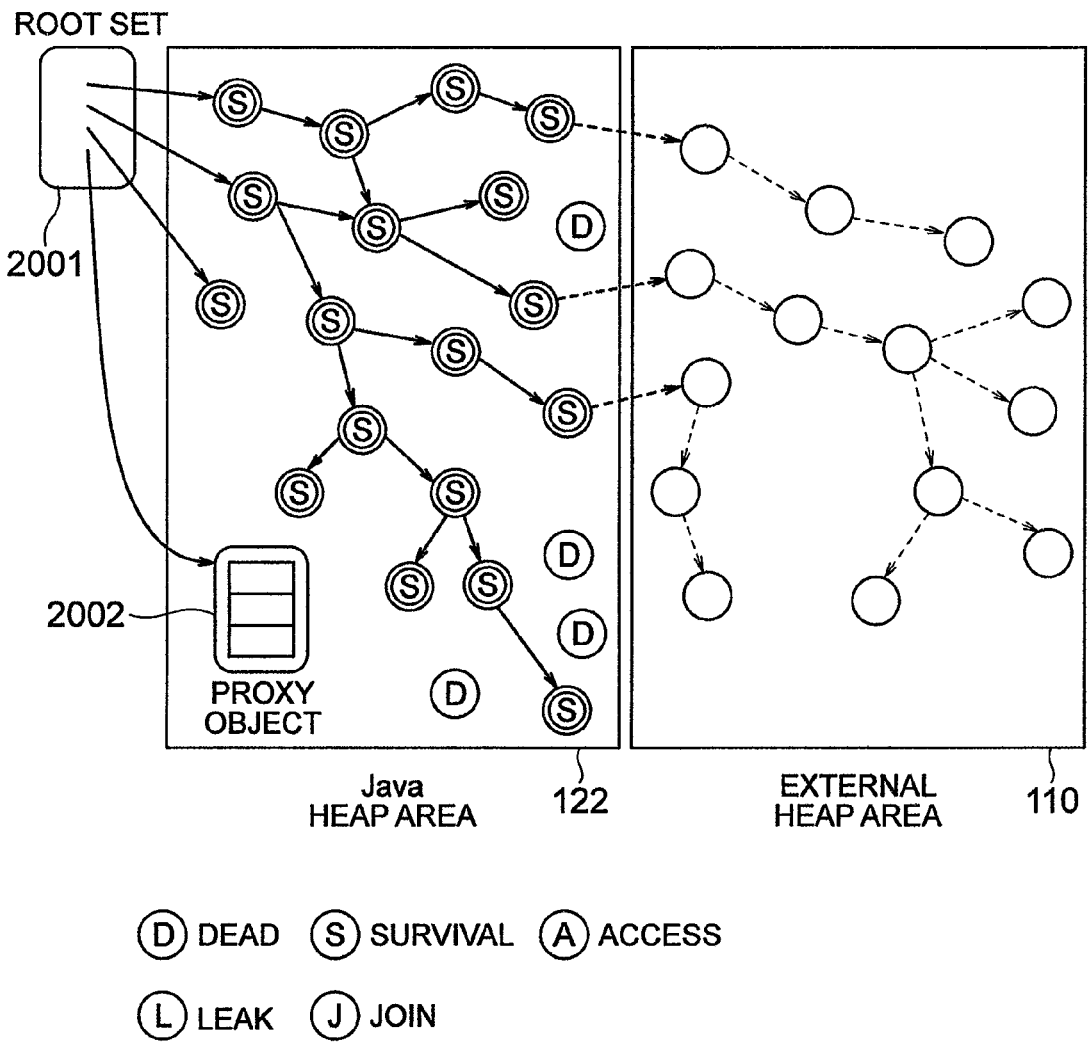
FIG. 22 is a diagram showing states of objects previously stored in a Java heap area and an external heap area, observed at an end time point of survival object marking processing in the object classification decision processing in an embodiment of the present invention.

FIG. 22 is a diagram showing states of objects previously stored in the Java heap area 122 and the external heap area 110, observed at an end time point of the survival object marking processing 1402 in the object classification decision processing in the embodiment of the present invention.

Each node represents an object. An object with a double circle is an object updated in object header 3401 by the survival object marking processing. As for a character in each node, "S" stands for a survival object and "D" stands for a dead object.

An arrow connecting objects represents a reference relation between objects. A solid line arrow represents reference to an object stored in the Java heap area 122. A dotted line arrow represents reference to an object stored in the external heap area 110.

A root set 2001 is an area of registers, stacks or static variables directly referred to by the program execution environment during execution of an application. If survival object marking processing is executed by taking an object reference retained in the root set 2001 as a start point, all objects that can be reached by following object references from the root set 2001 are judged to be survival objects.

As shown in FIG. 22, therefore, a proxy object 2002 and all objects provided with "S" are survival objects. The survival object marking processing will be described with reference to FIG. 26 and the proxy object 2002 will be described with reference to FIG. 29A later.

Referring back to FIG. 21, description of the flow chart of the object classification decision processing will now be continued.

Figure 23:
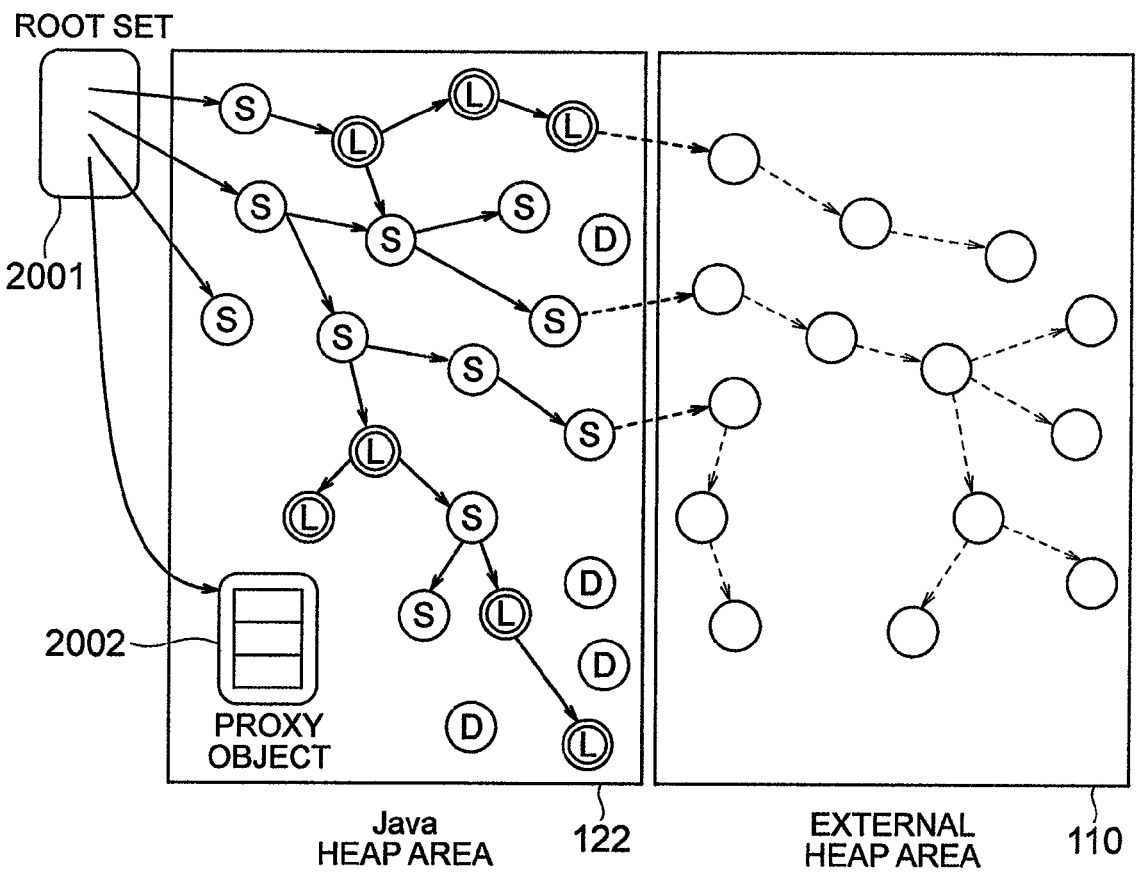
FIG. 23 is a diagram showing states of objects previously stored in a Java heap area and an external heap area, observed at an end time point of leak object decision processing in object classification decision processing in an embodiment of the present invention.

The processor 131 executes the leak object decision processing on a non-access object specified by the non-access object address 503 registered in the non-access object address table 205. And the processor 131 sets the object classification "leak" in the object header 3401 of the non-access object 502 judged to be a leak object on the basis of the leak object decision processing (step 1403). FIG. 23 shows states of the Java heap area 122 and the external heap area 110 at an end time point of the processing at the step 1403. Details of the leak object decision processing will be described with reference to FIG. 27 later.

FIG. 23 is a diagram showing states of objects previously stored in the Java heap area 122 and the external heap area 110, observed at an end time point of leak object decision processing 1403 in the object classification decision processing in the embodiment of the present invention.

An object with a double circle is an object updated in object classification by the leak object decision processing 1403. Specifically, such an object is provided with "L" and judged to be a leak object.

Referring back to FIG. 21, description of the flow chart of the object classification decision processing will now be continued.

The processor 131 executes proxy object registration processing on a leak object having an object classification set to "leak" by the processing at the step 1403 (step 1404).

When a leak object refers to a survival object, the processor 131 registers an address of the survival object of reference destination in the proxy object 2002 so as to make it possible to refer to the survival object of reference destination from the proxy object 2002.

Figure 24:
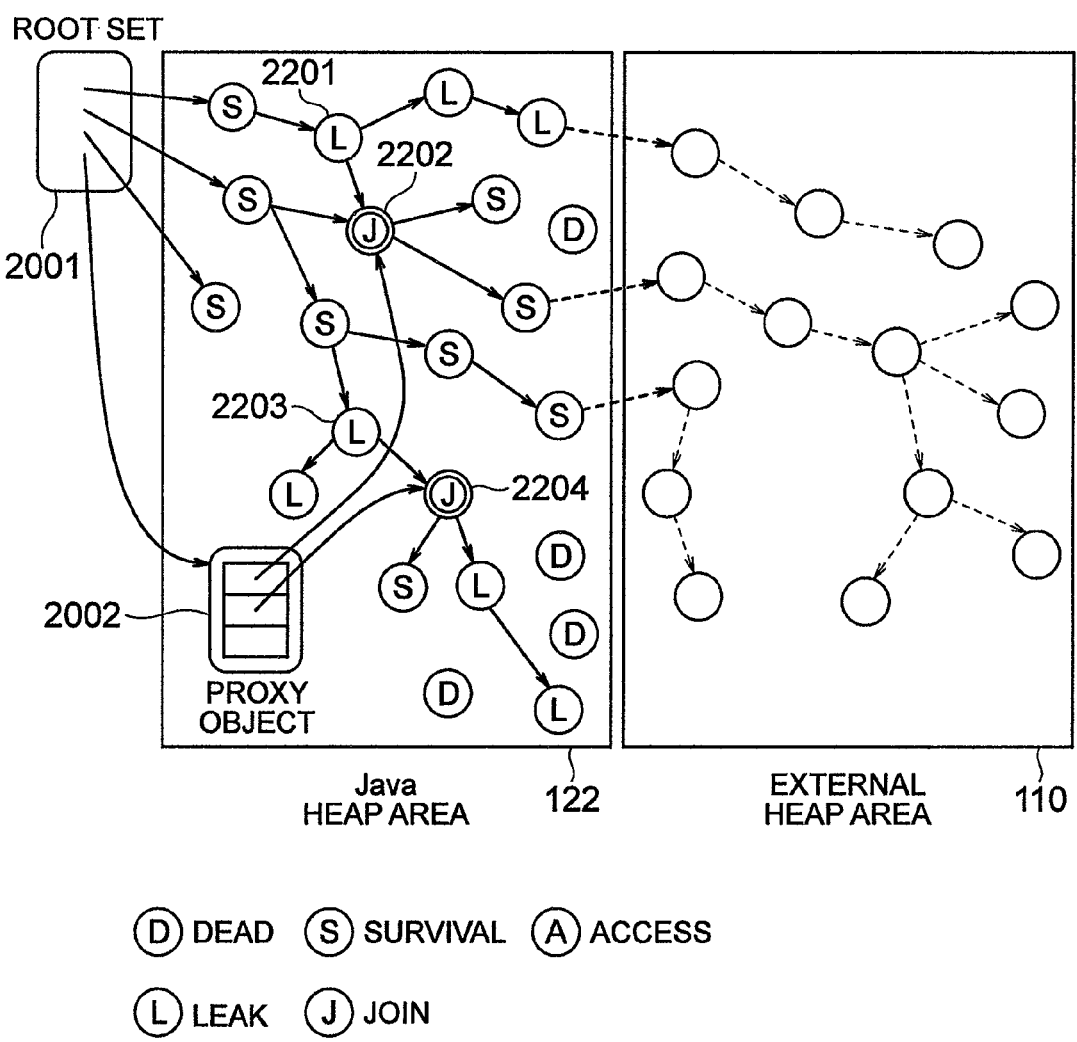
FIG. 24 is a diagram showing states of objects previously stored in a Java heap area and an external heap area, observed at an end time point of proxy object registration processing in object classification decision processing in an embodiment of the present invention.

A survival object referred to by a leak object is referred to as join object, for convenience. Since the entity of the join object is a survival object, an object classification "survival" is set in the object header 3401 of the join object. FIG. 24 shows states of the Java heap area 122 and the external heap area 110 at an end time point of the processing at the step 1404.

FIG. 24 is a diagram showing states of objects previously stored in the Java heap area 122 and the external heap area 110, observed at an end time point of the proxy object registration processing 1404 in the object classification decision processing in the embodiment of the present invention. An object provided with a double circle and "J" is a join object.

In the state shown in FIG. 24, a join object 2202 and a join object 2204 are included. An object 2201 and an object 2203 are leak objects that refer to the join object 2202 and the join object 2204, respectively. The leak object 2201 and the leak object 2203 are relocated in the external heap area 110 by the relocation execution processing 1307 described later.

After completion of the GC processing, the join object 2202 and the join object 2204 become join points of reference from the external heap area 110 to the Java heap area 122. Leak objects relocated in the external heap area 110 are excluded from subjects of the GC processing. In the survival object marking processing 1402, therefore, reference is not followed from the external heap area 110 to the Java heap area 122. When the GC processing is executed the next time, therefore, there is a possibility that survival objects that can be reached by following reference from the join object 2202 and the join object 2204 will be erroneously judged to be "dead" in object classification and collected.

Since the proxy object 2002 refers to the join object 2202 and the join object 2204, it is possible to prevent objects from being erroneously collected by the GC processing. By preparing the proxy object 2002, objects that are in the reference relation can be located in both an area that is the subject of the GC processing and an area that is not the subject of the GC processing. Details of the proxy object registration processing 1404 will be described with reference to FIG. 28 later.

Referring back to FIG. 21, description of the flow chart of the object classification decision processing will now be continued.

Figure 25:
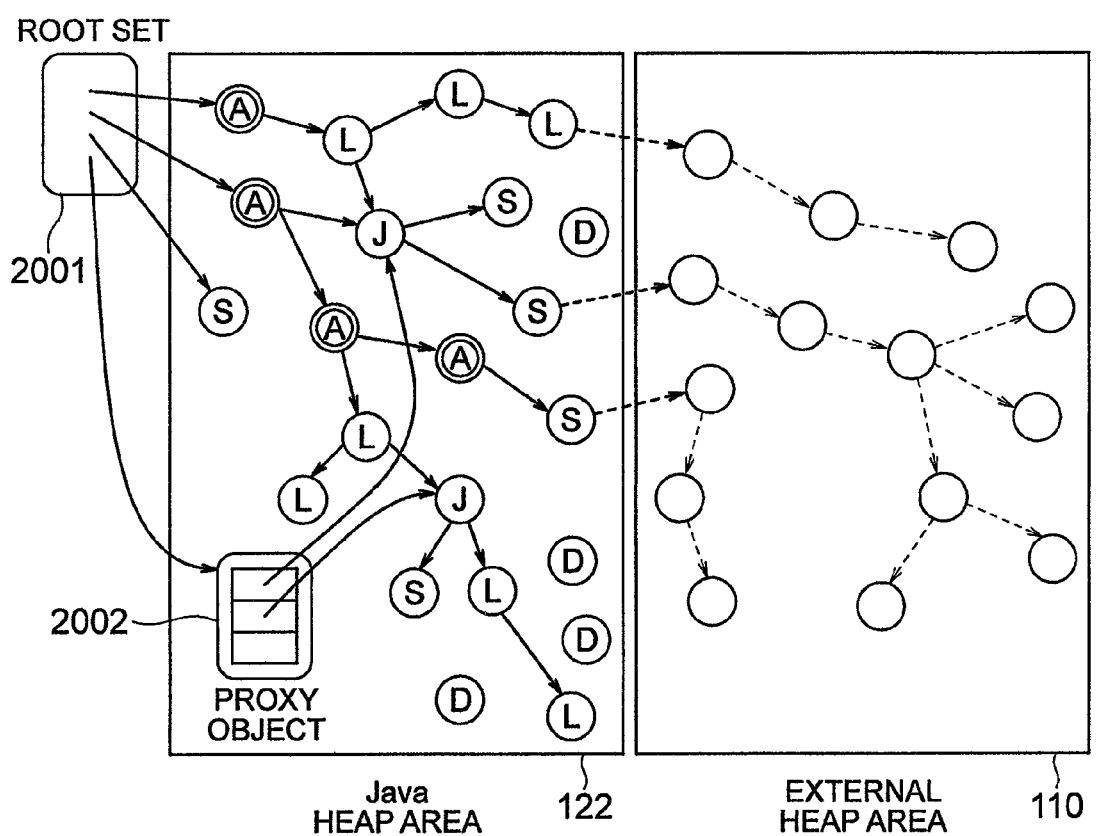
FIG. 25 is a diagram showing states of objects previously stored in a Java heap area and an external heap area, observed at an end time point of object classification decision processing in an embodiment of the present invention.

Finally, the processor 131 sets the object classification "access" in the object header 3401 of the access object 404 specified by the access object address 403 registered in the access address table 202 (step 1405). If the processing at the step 1405 is finished, the present processing is terminated. FIG. 25 shows states of the Java heap area 122 and the external heap area 110 at an end time point of the processing at the step 1405.

FIG. 25 is a diagram showing states of objects previously stored in the Java heap area 122 and the external heap area 110, observed at an end time point of the object classification decision processing in the embodiment of the present invention.

An object with a double circle is an object updated in object classification by the processing at the step 1405. Specifically, such an object is an access object provided with "A." A decision whether an object is an access object is made on the basis of information registered in the access address table 202 as described earlier.

If the object classification decision processing is finished, it becomes possible to discriminate an object classification of an object stored in the Java heap area 122 as shown in the top part of FIG. 20. Whether objects are located leaving no space between them as shown in the top part of FIG. 20 depends upon the memory management principle of the memory management part 124. In the embodiment of the present invention, objects are located leaving no space between them as shown in the top part of FIG. 20.

Figure 26:
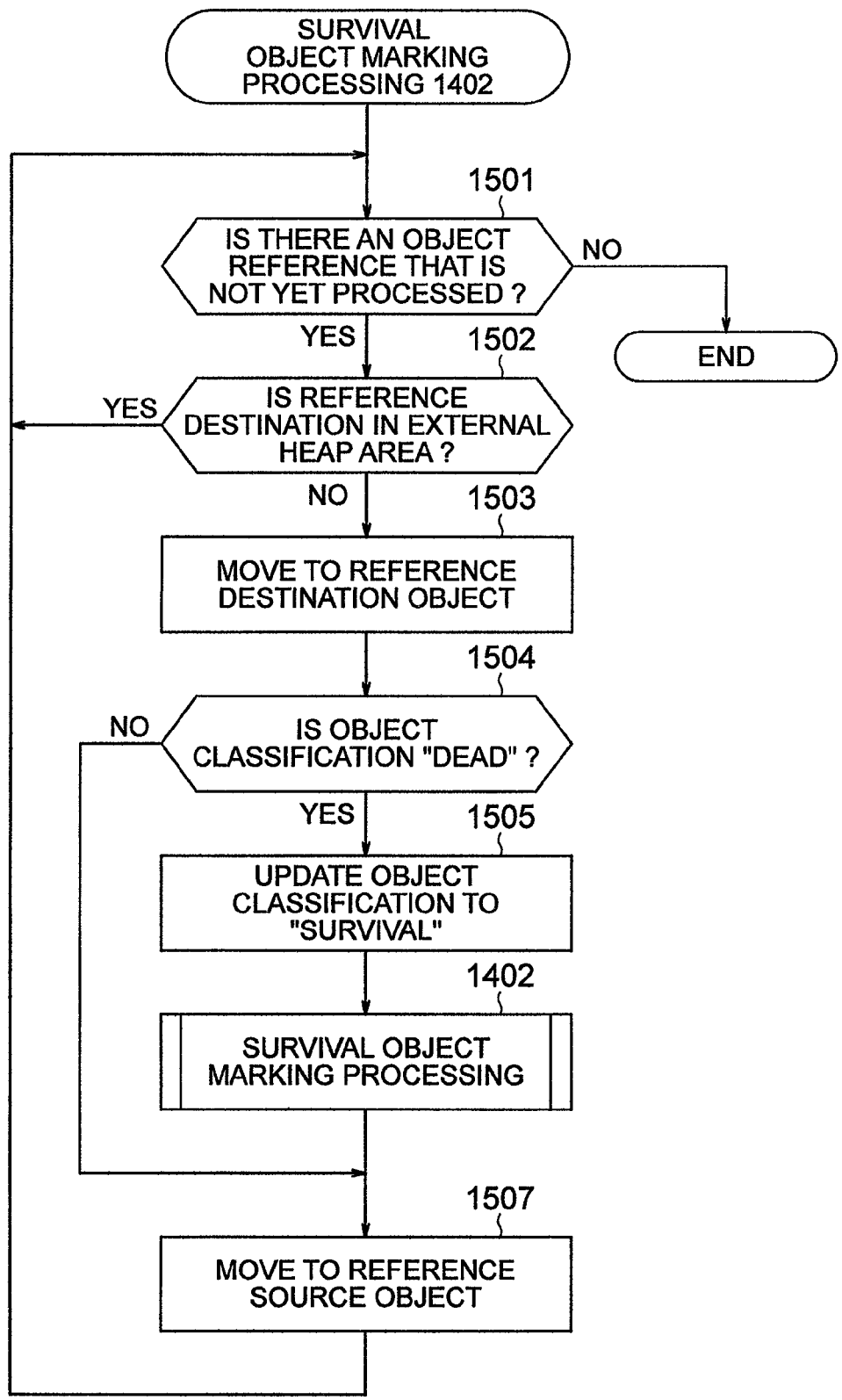
FIG. 26 is a flow chart showing a procedure of survival object marking processing in object classification decision processing in an embodiment of the present invention.

FIG. 26 is a flow chart showing a procedure of the survival object marking processing in the object classification decision processing in the embodiment of the present invention. In the present processing, the object classification "survival" is set in the object headers 3401 of survival objects stored in the Java heap area 122. Subjects of the present processing are objects stored in the Java heap area 122 that can be reached from the root set 2001.

The processor 131 first makes a decision whether there is an object reference that is not yet processed in object references of objects to be processed (step 1501).

If there is an object reference that is not yet processed (a result at the step 1501 is "YES"), the processor 131 makes a decision whether an object of reference destination is stored in the external heap area 110 (step 1502). Specifically, the processor 131 refers to the area head 3106 and the area end 3108 in the external heap area management table 214, and compares them with an address of reference destination of the object reference. Since objects stored in the external heap area 110 are leak objects, they are not objects that become subjects of the present processing. In the processing at the step 1502, the processor 131 makes a decision whether the object of reference destination is the subject of the present processing.

If the object of reference destination is not stored in the external heap area 110 (a result at the step 1502 is "NO"), the processor 131 causes the object of reference destination to become a new subject of the processing (step 1503).

Subsequently, the processor 131 refers to the object header 3401 of the object that has become a new subject of the processing, and makes a decision whether the object classification is "dead" (step 1504). By the way, all object classifications of objects stored in the Java heap area 122 are initialized to "dead" before start of the present processing (step 1401 in FIG. 21).

If the object classification is "dead" (a result at the step 1504 is "YES"), the processor 131 sets the object classification "survival" in the object header 3401 (step 1505).

The processor 131 recursively executes the survival object marking processing on a reference destination object of an object to be processed (step 1402).

If the object classification is not "dead" (the result at the step 1504 is "NO") or after the processing at the step 1402 is finished, the processor 131 causes the reference source object of the object to be processed to become a new object to be processed (step 1507).

If the object of reference destination is stored in the external heap area 110 (the result at the step 1502 is "YES") or after the processing at the step 1507 has finished, the processor 131 returns to the processing at the step 1501. And the processor 131 continues execution of the survival object marking processing 1402 on objects that are not yet processed.

If there is not an object reference that is not yet processed (the result at the step 1501 is "NO"), the survival object marking processing on all objects to be processed is completed and the processor 131 terminates the present processing.

Figure 27:
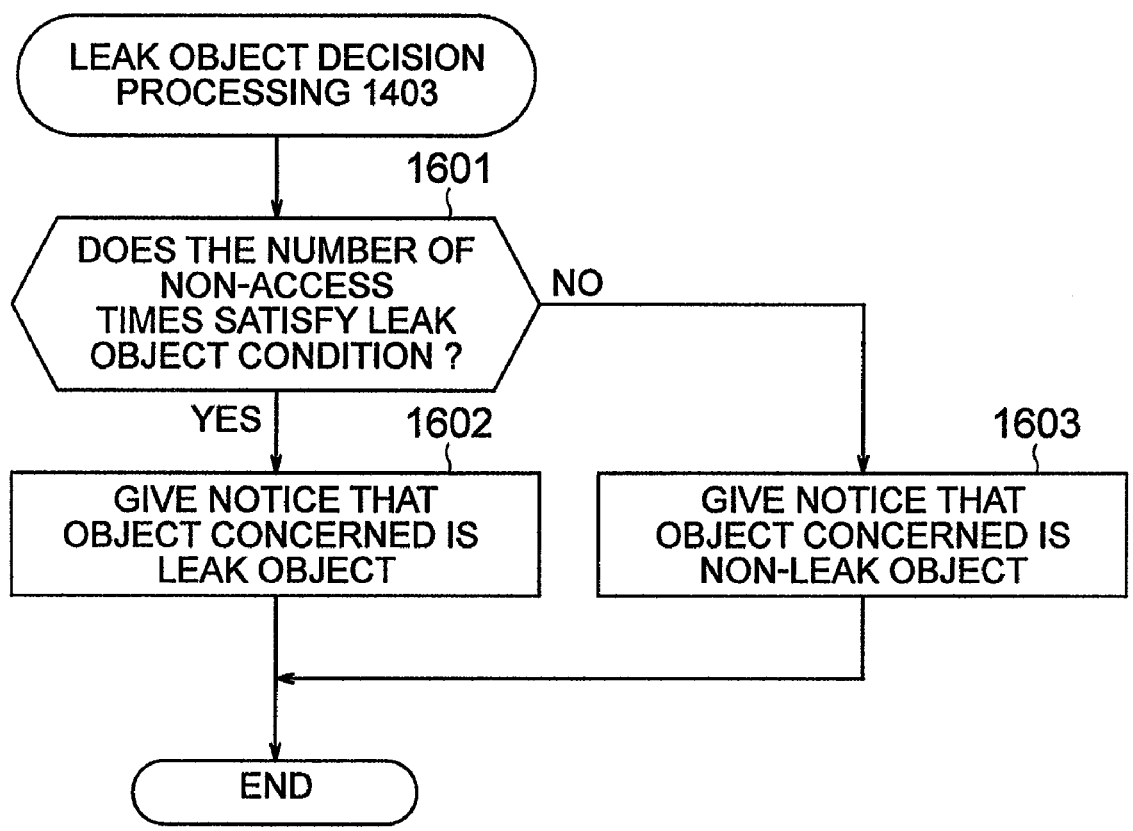
FIG. 27 is a flow chart showing a procedure of leak object decision processing in an embodiment of the present invention.

FIG. 27 is a flow chart showing a procedure of the leak object decision processing in the embodiment of the present invention. In the leak object decision processing, a decision whether an object to be processed is a leak object is made. The present processing is executed by processing conducted on the leak object decision part 207 by the processor 131.

The processor 131 first makes a decision whether the object to be processed conforms to a leak object (step 1601). Specifically, the processor 131 refers to the non-access object address table 205, and compares the number of non-access times 3302 of the object to be processed with the leak object condition 3005 in the leak object detection management information 208.

If the object to be processed satisfies the condition of the leak object (a result at the step 1601 is "YES"), the processor 131 notifies an execution source of the present processing that the object is a leak object (step 1602). In the processing of the execution source, the processor 131 updates the object classification of the object to be processed to "leak" (step 1403 in FIG. 21).

If the object to be processed does not satisfy the condition of the leak object (the result at the step 1601 is "NO"), the processor 131 notifies the execution source of the present processing that the object is a non-leak object (step 1603).

After the processing at the step 1602 or the processing at the step 1603 is finished, the present processing is terminated.

Figure 28:
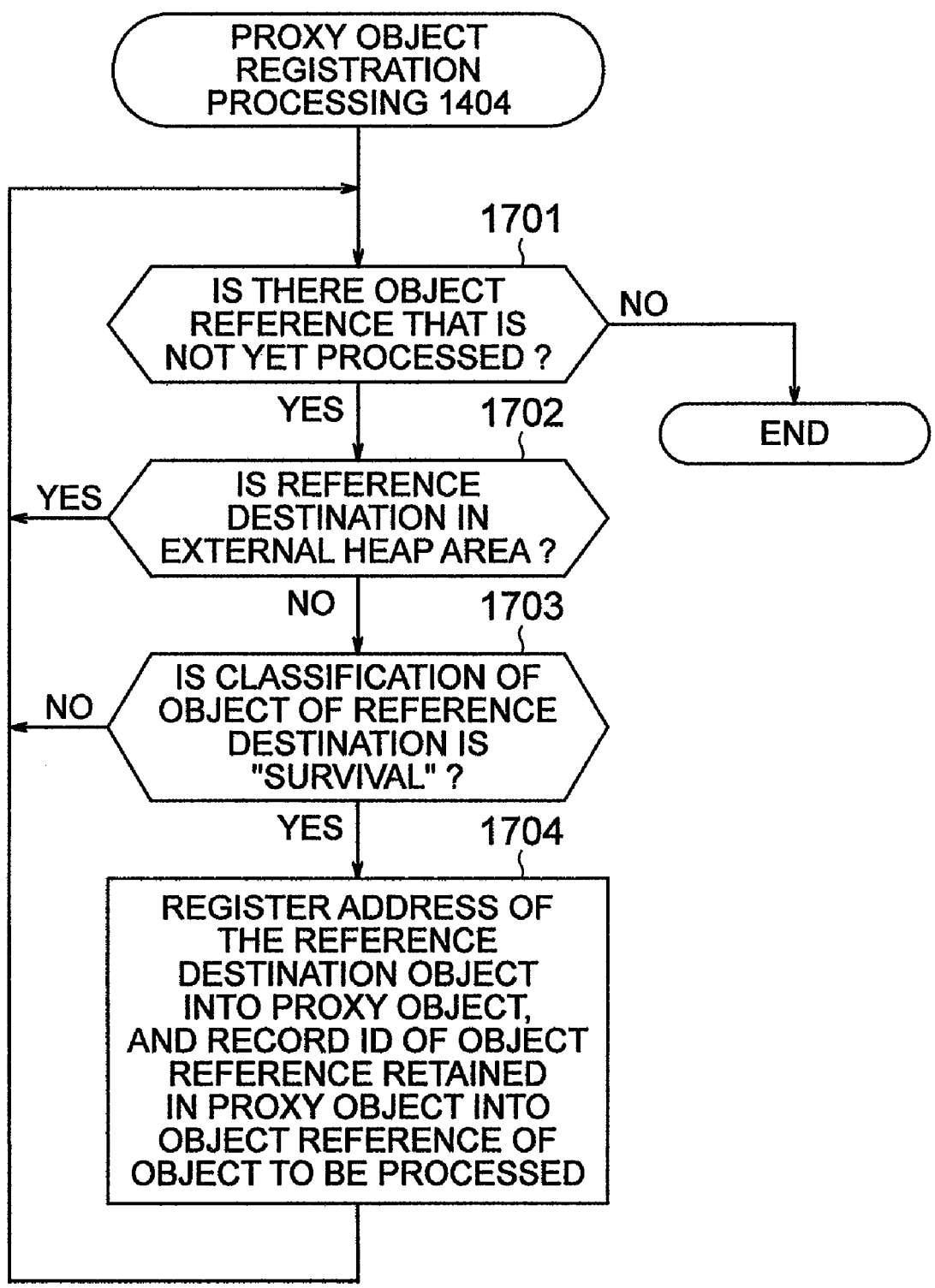
FIG. 28 is a flow chart showing a procedure of proxy object registration processing in an embodiment of the present invention.

FIG. 28 is a flow chart showing a procedure of proxy object registration processing in the embodiment of the present invention. The proxy object registration processing is processing for registering a survival object referred to by a leak object in the proxy object. The present processing is executed on the leak object.

The processor 131 first makes a decision whether an object reference that is not yet processed is present in object references of the object to be processed (step 1701).

If an object reference that is not yet processed is present (a result at the step 1701 is "YES"), the processor 131 makes a decision whether reference destination of the object reference is the external heap area 110 (step 1702). Specifically, in the same way as the processing at the step 1502 in FIG. 26, the processor 131 refers to the area head 3106 and the area end 3108 in the external heap area management table 214, and compares them with an address of reference destination of the object reference. Since objects stored in the external heap area 110 are leak objects, they are not objects that become subjects of the present processing. In the processing at the step 1702, the processor 131 makes a decision whether the object of reference destination is the subject of the present processing.

If the object of reference destination is not stored in the external heap area 110 (a result at the step 1702 is "NO"), the processor 131 makes a decision whether the object of reference destination is a survival object (step 1703). Specifically, the processor 131 refers to the object classification stored in the object header 3401 of the object of reference destination and makes a decision whether the object classification is "survival."

If the object of reference destination is a survival object (a result at the step 1703 is "YES"), the processor 131 registers the address of the reference destination object in an unregistered object reference retained in the proxy object 2002. In addition, the processor 131 acquires an identifier of a registered object reference retained in the proxy object 2002. And the processor 131 records the identifier in the object reference of the object to be processed (step 1704). The structure of the proxy object 2002 will now be described with reference to FIG. 29A. In addition, the processing at the step 1704 will be described with reference to a specific example.

Figure 29A:
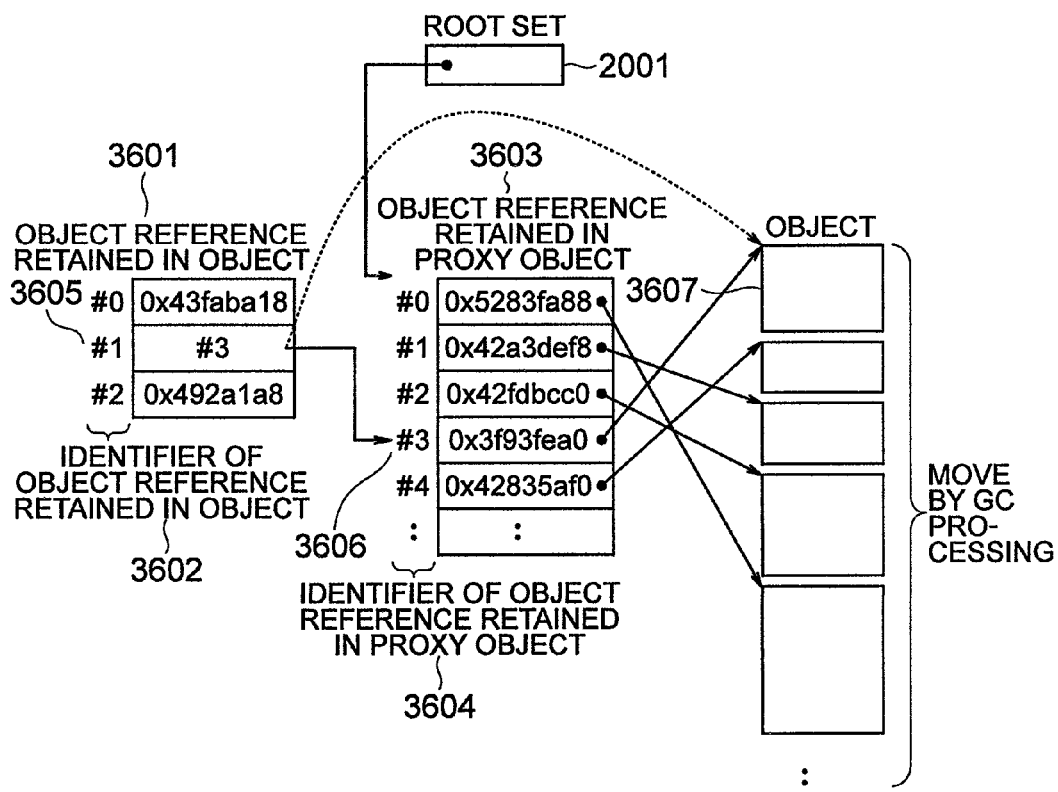
FIG. 29A is a diagram showing a structure of a proxy object in an embodiment of the present invention.

FIG. 29A is a diagram showing the structure of the proxy object 2002 in the embodiment of the present invention.

The proxy object 2002 can store a plurality of object references. Addresses of join objects are stored in object references stored in the proxy object 2002.

An object reference 3601 retained in an object is stored in the object data 3402. Each of fields in the object reference 3601 retained in the object is identified by an identifier 3602. In the embodiment of the present invention, an object reference is managed as an array. Therefore, the identifier 3602 becomes an index in the object reference array.

In the embodiment of the present invention, the proxy object 2002 is an object used to manage object reference relations by the language processing system. Basically, the proxy object 2002 has only object reference fields.

Each of fields in an object reference 3603 retained in the proxy object is identified by an identifier 3604 of the object reference retained in the proxy object. Furthermore, each of the fields in the object reference 3603 retained in the proxy object is a subject of the object reference update processing conducted by the object reference update part 211. If an object specified by the object reference 3603 retained in the proxy object is relocated by the GC processing 702, the address retained in the object reference 3603 which is retained in the proxy object is also updated.

If the proxy object 2002 is referred to by the root set 2001, the proxy object 2002 may be located in an area other than the Java heap area 122. In the embodiment of the present invention, the proxy object 2002 is located in the Java heap area 122.

Since the proxy object 2002 is referred to by the root set 2001, the proxy object 2002 is not collected until the Java VM 109 is finished. On the other hand, if the proxy object 2002 is located in the Java heap area 122 in the state where an empty area is not present in the Java heap area 122 and the external heap area 110, the proxy object 2002 may be collected in order to increase the empty area in the Java heap area 122. If the proxy object 2002 is collected, it becomes impossible to execute the object import processing. Before collecting the proxy object 2002, therefore, it is necessary to prohibit execution of the import processing.

Subsequently, the processing at the step 1704 will now be described. Three object references are included in an object to be processed. The object references are provided with identifiers 3602 of #0, #1 and #2, respectively. An object reference 3605 having the identifier 3602 of "#1" refers to an object 3607. The state heretofore described is regarded as the initial state.

If the processing at the step 1704 is executed on the initial state heretofore described, an object reference 3606 having an object reference identifier 3604 of "#3" retained in the proxy object is updated to refer to the object 3607. In addition, the object reference 3605 having the object reference identifier 3602 of "#1" retained in the object to be processed is updated so as to refer to the object reference 3606 having the object reference identifier 3604 of "#3" retained in the proxy object. The object reference 3601 retained in the object directly retains an object address in some cases or retains an object reference identifier 3604 retained in the proxy object in some cases.

Figure 29B:
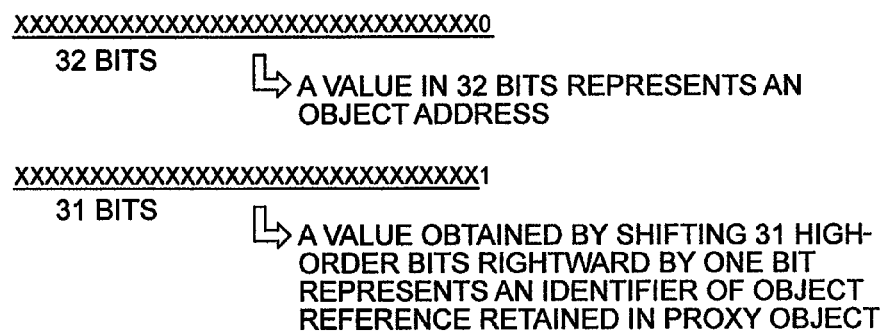
FIG. 29B is a diagram showing an example of a value retained in an object reference in a 32-bit environment in an embodiment of the present invention.

On the other hand, several low-order bits of a pointer to an object become 0 as described with reference to FIG. 7 earlier. In the embodiment of the present invention, therefore, a decision can be made on the basis of a state of the least significant bit whether the object reference retains an object address or the identifier 3604 of an object reference retained in the proxy object. FIG. 29B shows examples of a value retained in the object reference in a 32-bit environment.

FIG. 29B is a diagram showing an example of a value retained in an object reference in a 32-bit environment in the embodiment of the present invention.

If the least significant bit of a value retained in an object reference is "0" as shown in an upper part of FIG. 29B, the object address itself is retained in the object reference.

On the other hand, if the least significant bit of the value retained in an object reference is "1" as shown in a lower part of FIG. 29B, the identifier 3604 of the object reference retained in the proxy object is retained in the object reference. Specifically, the identifier 3604 is retained in 31 high-order bits in a field of the object reference. When taking out the identifier 3604 of the object reference retained in the proxy object from a field of the object reference, a value obtained by logical-shifting the value in the field of the object reference rightward by one bit is taken out as the identifier 3604 of the object reference retained in the proxy object. When recording the identifier 3604 of the object reference retained in the proxy object in the field of the object reference, a value obtained by logical-shifting the value of the identifier 3604 of the object reference retained in the proxy object leftward by one bit and setting the least significant bit to "1" is recorded.

If the proxy object 2002 is located so as to be fixed relative to the address space, the address of the field of the object reference retained in the proxy object may be recorded in the object reference 3601 retained in the object, instead of the identifier 3604 of the object reference retained in the proxy object. It is possible to make a decision on the basis of a range of an area where the proxy object 2002 is located whether the object reference retains an object address or the identifier 3604 of an object reference retained in the proxy object.

Referring back to FIG. 28, description of the flow chart of the proxy object registration processing 1404 will now be continued.

If the reference destination is the external heap area 110 (the result at the step 1702 is "YES"), if the object classification is not "survival," or after the processing at the step 1704 has finished, the processor 131 returns to the processing at the step 1701 and continues the proxy object registration processing.

If an object reference that is not yet processed is not present (the result at the step 1701 is "NO"), the present processing is terminated.

Figure 30:
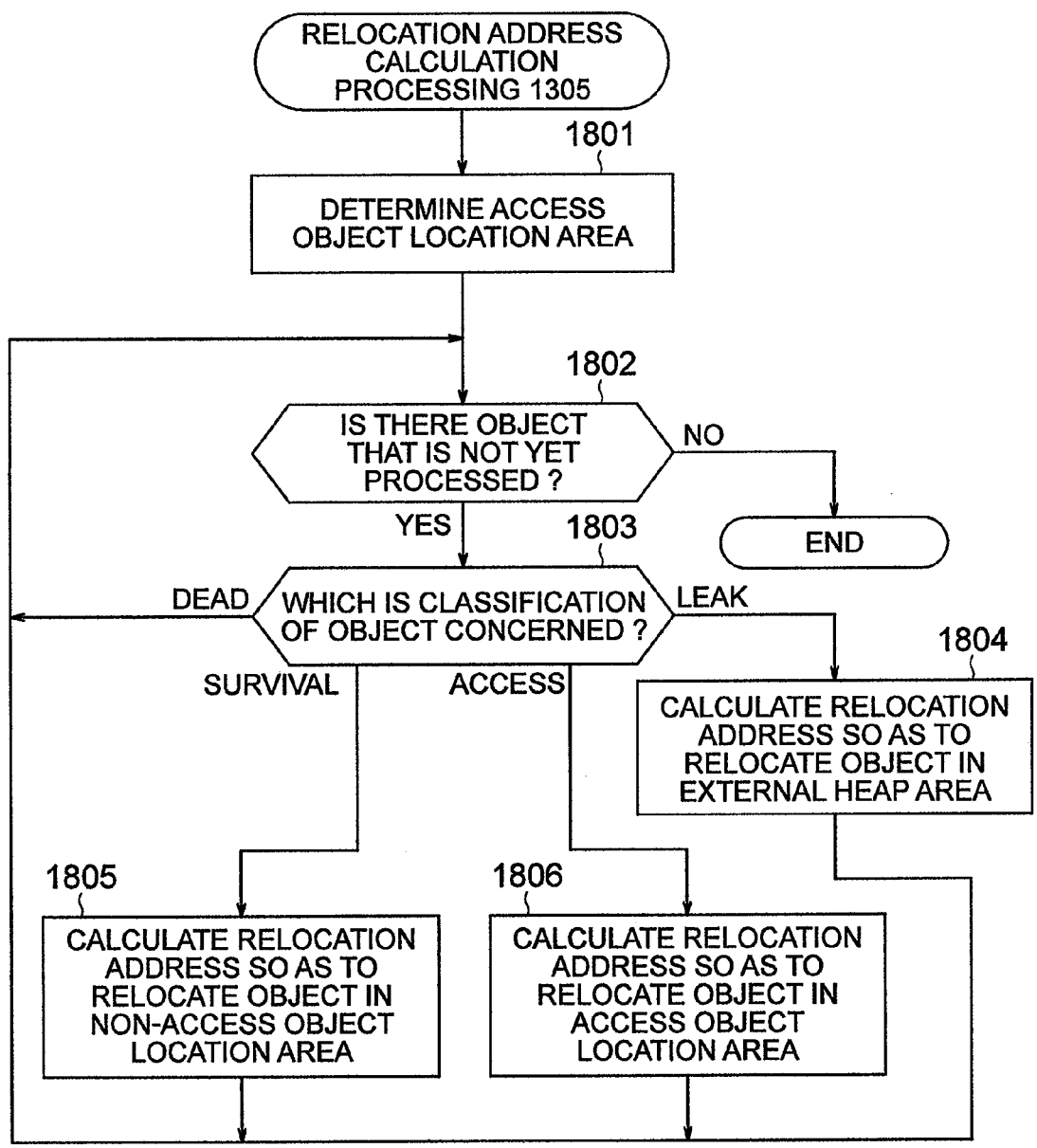
FIG. 30 is a flow chart showing a procedure of relocation address calculation processing in an embodiment of the present invention.

FIG. 30 is a flow chart showing a procedure of the relocation address calculation processing in the embodiment of the present invention. The present processing is executed by processing conducted on the relocation address calculation part 210 by the processor 131.

The processor 131 determines an access object location area (step 1801). Specifically, the processor 131 sets an address of the area head 3101 in the survival area end 3102 of the Java heap area management table 213. In addition, the processor 131 finds a total size of access objects stored in the Java heap area 122, and sets an address obtained by adding the found total size to the pointer in the area head 3101, in the unused area head 3104.

The processor 131 successively scans objects located in the Java heap area 122, and makes a decision whether an object that is not yet processed is present (step 1802).

If an unprocessed project is present (a result at the step 1802 is "YES"), the processor 131 refers to the object header 3401 of an object to be processed and judges an object classification (step 1803). In the embodiment of the present invention, a location area is determined on the basis of the object classification. Specifically, the processor 131 locates survival objects in the survival object location area 1201 and access objects in the access object location area 1202 as shown in the middle part of FIG. 20.

If the object classification of the object to be processed is judged to be "survival" (the result at the step 1803 is "survival"), the processor 131 calculates the relocation address so as to locate the object in the survival object location area 1201 in the Java heap area 122 as shown in the middle part of FIG. 20.

The relocation address of the survival object is an address specified by the pointer of the survival area end 3102 in the Java heap area management table 213. After calculation of the relocation address, the processor 131 continues the calculation of the relocation address while increasing the pointer of the survival area end 3102 by the size of the survival object by addition.

If the object classification of the object to be processed is judged to be "access" (the result at the step 1803 is "access"), the processor 131 calculates the relocation address so as to locate the object in the access object location area 1202 in the Java heap area 122 as shown in the middle part of FIG. 20 (step 1806).

The relocation address of the access object is an address specified by the pointer of the unused area head 3104 in the Java heap area management table 213. After calculation of the relocation address, the processor 131 continues the calculation of the relocation address while increasing the pointer of the unused area head 3104 by the size of the access object by addition.

If the object classification of the object to be processed is judged to be "leak" (the result at the step 1803 is "leak"), the processor 131 calculates the relocation address so as to relocate the object in the external heap area 110 as shown in the middle part of FIG. 20 (step 1804).

The relocation address of the leak object is an address specified by the pointer of the unused area head 3107 in the external heap area management table 214. After calculation of the relocation address, the processor 131 continues the calculation of the relocation address while increasing the pointer of the unused area head 3107 by the size of the leak object by addition.

If the object classification of the object to be processed is judged to be "dead" (the result at the step 1803 is "dead") or the processing at the steps 1804 to 1806 is finished, the processor 131 returns to the step 1802 and continues the relocation address calculation processing. If an object that is not yet processed is not present (the result at the step 1802 is "NO"), the present processing is terminated.

The size of an object is typically smaller than the page size. A plurality of objects are located in one page. Typically, the page trap can be set and released only by taking a page as the unit. If an object that is frequently accessed during the method execution and an object that is low in access frequency are located on the same page, therefore, page trap set on the page is released when the frequently accessed object is accessed. As a result, it becomes difficult to detect the object that is low in access frequency.

In the processing at the step 1805 and the step 1806, therefore, the relocation addresses are calculated so as to locate the survival object and the access object in different areas in the Java heap area 122 and so as not to locate them on the same page to the utmost in order to avoid the problem described heretofore. By thus repeating the relocation, objects in the Java heap area 122 are gradually aligned according to the access tendency. Therefore, detection of an object that is low in access frequency during the method execution is facilitated and the detection precision of a leak object can be improved.

Figure 31:
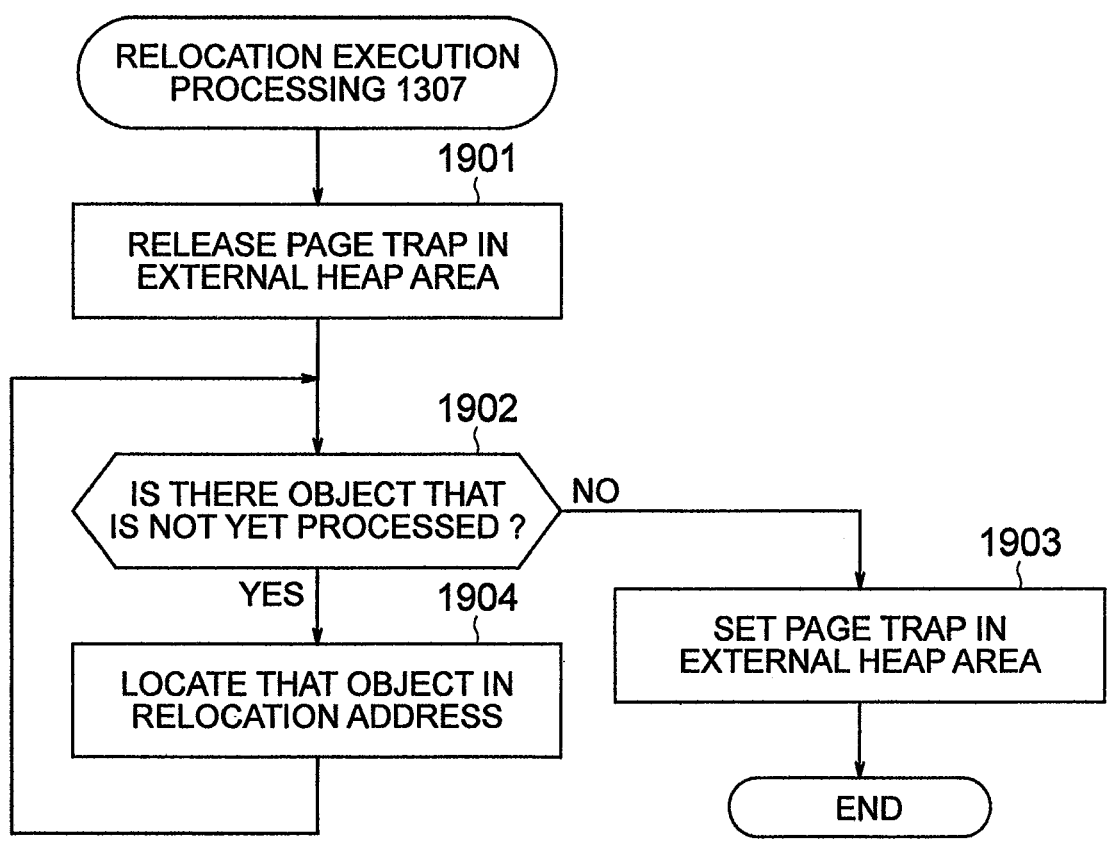
FIG. 31 is a flow chart showing a procedure of relocation execution processing in an embodiment of the present invention.

FIG. 31 is a flow chart showing a procedure of the relocation execution processing in the embodiment of the present invention. The present processing is executed by processing conducted on the relocation execution part 212 by the processor 131.

The processor 131 first releases the page trap set in the external heap area 110, and brings about a state in which a leak object can be located in the external heap area 110 (step 1901).

The processor 131 successively scans objects located in the Java heap area 122, and makes a decision whether an object that is not yet processed is present (step 1902).

If an unprocessed project is present (a result at the step 1902 is "YES"), the processor 131 locates the object in a relocation address calculated by the relocation address calculation processing (step 1904). If the processing at the step 1904 is finished, the processor 131 executes the processing at the step 1902 and continues the relocation execution processing.

If the file 105 is used as the external heap area 110 and the external heap area 110 is managed separately from the main storage by using the file offset map 217, a leak object is relocated from the Java heap area 122 to the external heap area 110 as described with reference to FIG. 9.

If an object that is not yet processed is not present (the result at the step 1902 is "NO"), the processor 131 sets page trap in the external heap area 110 and brings about a state in which access to a leak object at the time of method execution can be detected (step 1903). After the processing at the step 1903 is finished, the present processing is terminated.

Figure 32:
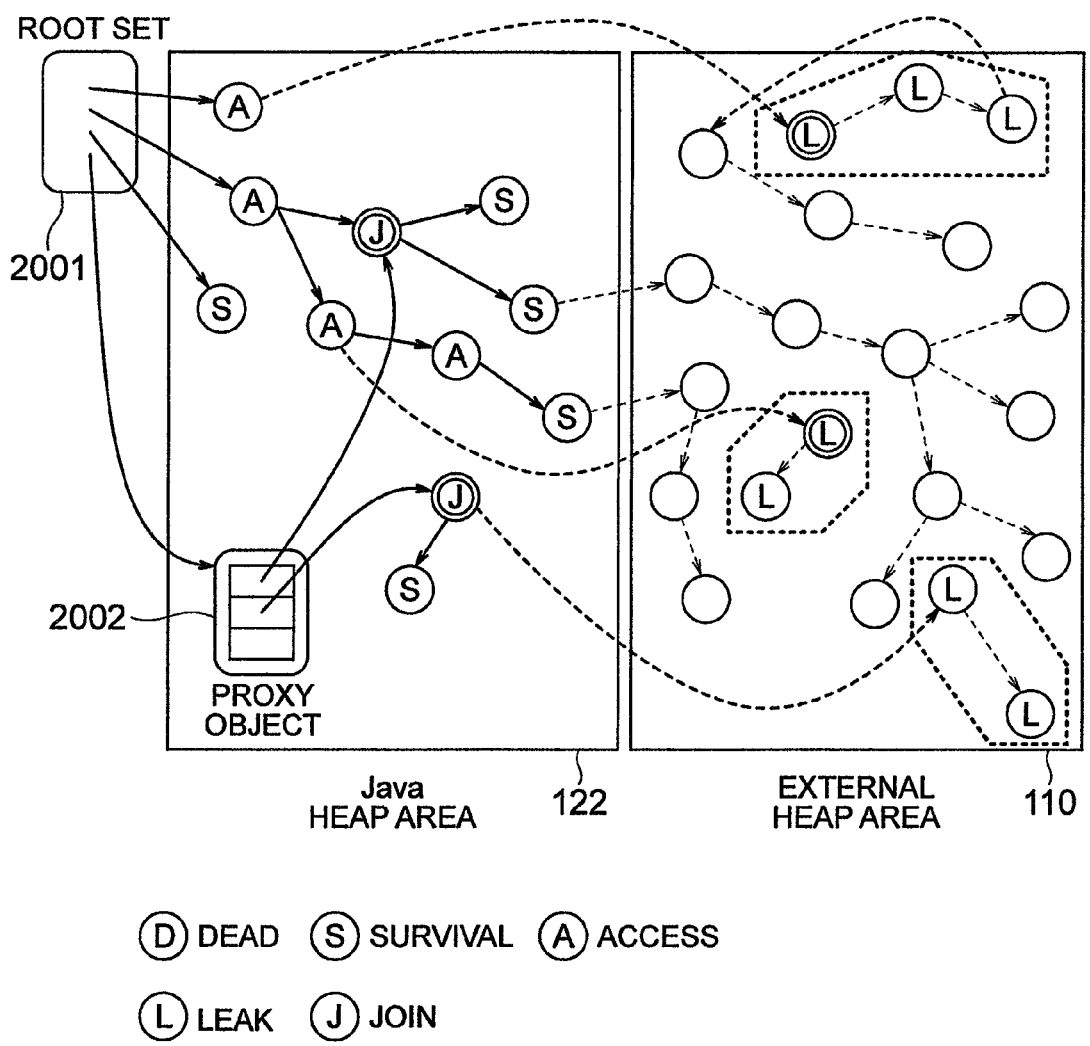
FIG. 32 is a diagram showing states of objects previously stored in a Java heap area and an external heap area, observed after relocation execution processing has been terminated in an embodiment of the present invention.

Reference relations between objects 119 stored in the Java heap area 122 and leak objects 112 stored in the external heap area 110 at an end time point of the processing at the step 1903 are shown in FIG. 32.

FIG. 32 is a diagram showing states of objects previously stored in the Java heap area 122 and the external heap area 110, observed after relocation execution processing has been terminated in the embodiment of the present invention.

FIG. 32 shows a state in which dead objects are collected by the ordinary GC processing and in addition leak objects having the object classification of "leak" are relocated from the Java heap area 122 to the external heap area 110. The empty area in the Java heap area 122 can be increased by thus moving the leak objects from the Java heap area 122 to the external heap area 110.

Location of objects after the relocation becomes the location shown in the bottom part of FIG. 20. The objects located in the Java heap area 122 as shown in the upper part of FIG. 20 are relocated as shown in the bottom part of FIG. 20 after the calculation of the relocation addresses and unnecessary objects (dead objects) are collected.

Figure 33:
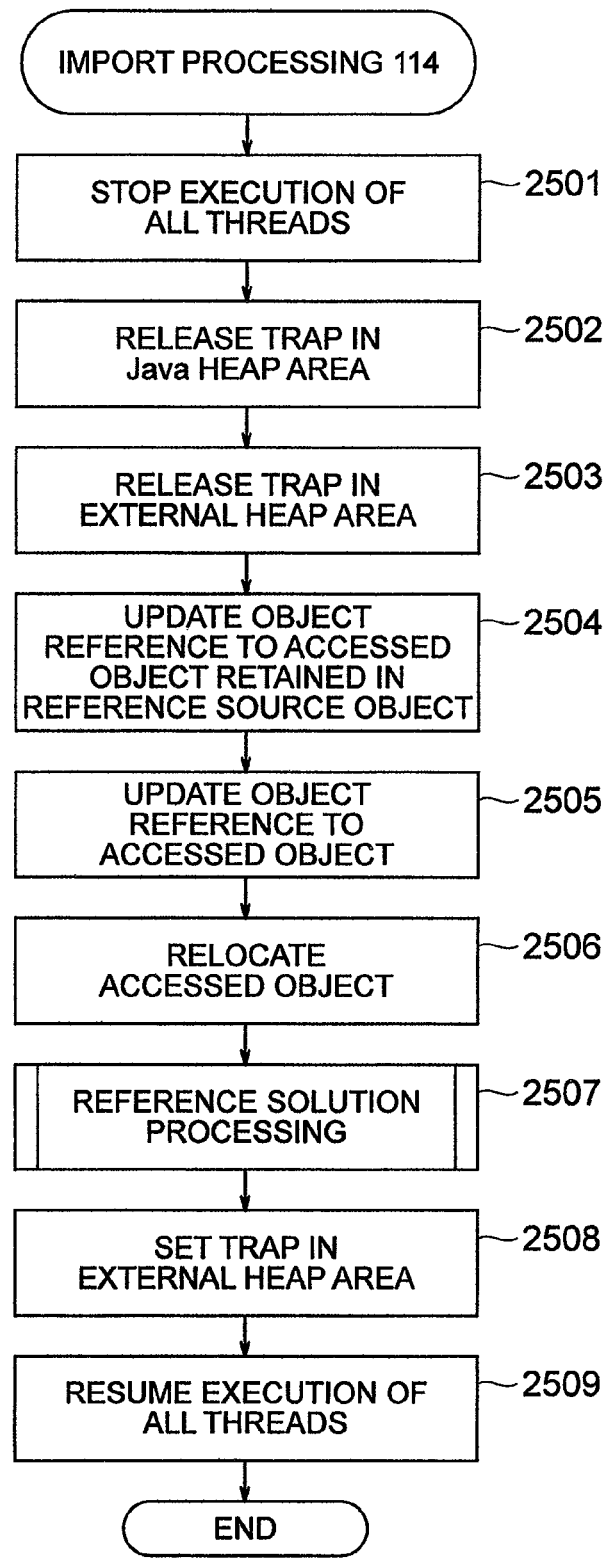
FIG. 33 is a flow chart showing a procedure of import processing in an embodiment of the present invention.

FIG. 33 is a flow chart showing a procedure of the import processing in the embodiment of the present invention. The present processing is executed by processing conducted on the import execution part 114 by the processor 131.

The processor 131 first stops all threads other than the thread for executing the import processing, in order to prevent objects stored in the Java heap area 122 or the external heap area 110 from being moved (step 2501).

The processor 131 releases the page trap set in the Java heap area 122 and brings objects 119 in the Java heap area 122 into an accessible state (step 2502).

The processor 131 releases the page trap set in the external heap area 110 and brings leak objects 112 in the external heap area 110 into an accessible state (step 2503).

The processor 131 successively scans objects 119 stored in the Java heap area 122, and searches for a reference source object which refers to an object accessed at the time of method execution. If a reference source object is found, the processor 131 acquires the unused area head 3104 in the Java heap area management table 213 and determines it to be a relocation address of the object. And the processor 131 updates the object reference to the object retained in the reference source object to the acquired relocation address (step 2504).

The processor 131 successively scans leak objects 112 in the external heap area 110, and searches for a reference source leak object which refers to an accessed object. If a reference source object is found, the processor 131 registers the relocation address acquired by the processing at the step 2504 in an unregistered object reference retained in the proxy object 2002 and acquires the identifier 3604 of the object reference retained in the proxy object. And the processor 131 records the identifier 3604 in the object reference to the object retained in the reference source leak object (step 2505).

The processor 131 relocates the accessed object in the relocation address, and increases the pointer of the unused area head 3104 in the Java heap area management table 213 by the size of the object by addition (step 2506). If the file 105 is used as the external heap area 110 and the external heap area 110 is managed separately from the main storage by using the file offset map 217, objects are relocated from the external heap area 110 to the Java heap area 122 as described with reference to FIG. 9.

Subsequently, the processor 131 executes reference solution processing and solves the object reference of the object (step 2507). The reference solution processing is processing for updating an object reference of an accessed object so as to cause the accessed object to correctly refer to an object referred to before the accessed object is relocated from the Java heap area 122 to the external heap area 110, even after the accessed object is relocated from the external heap area 110 to the Java heap area 122.

Upon execution of the GC processing, objects stored in the Java heap area 122 are relocated. On the other hand, if the external heap area 110 is excluded from the subjects of the GC processing as in the embodiment of the present invention, object references of leak objects stored in the external heap area 110 are not updated and an object to be originally referred to is not referred to in some cases. Owing to the reference solution processing, consistency of object references of objects that are not subjects of the GC processing can be allocated and consequently the external heap area 110 can be excluded from the subjects of the GC processing. Details of the reference solution processing will be described with reference to FIG. 34.

Figure 34:
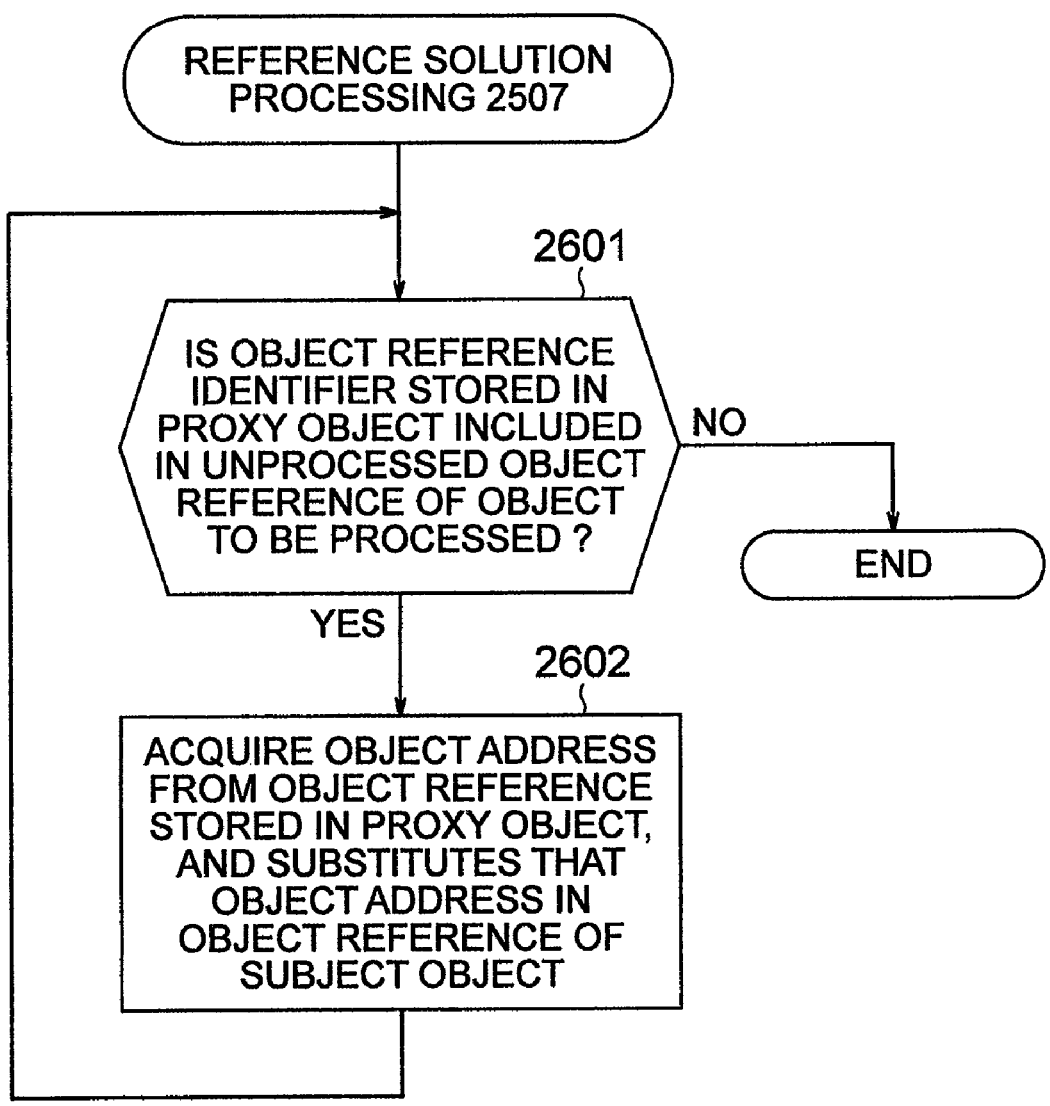
FIG. 34 is a flow chart showing a procedure of reference solution processing in import processing in an embodiment of the present invention.

FIG. 34 is a flow chart showing a procedure of the reference solution processing in the import processing in the embodiment of the present invention.

The processor 131 makes a decision whether an object reference retained in an object to be processed stores the object reference identifier 3604 retained in the proxy object 2002 (step 2601). A decision can be made whether an object reference retained in an object to be processed stores the object reference identifier 3604 retained in the proxy object 2002, by checking the value of the least significant bit of the object reference as shown in FIG. 29B.

If the identifier 3604 of the object reference stored in the proxy object 2002 is included in unprocessed object references of the object to be processed (a result at the step 2601 is "YES"), the processor 131 acquires an object address from a corresponding object reference in the proxy object 2002 and substitutes the object address in an object reference of an unprocessed subject object. In addition, the processor 131 substitutes a null value in the value of the corresponding object reference in the proxy object 2002 and brings about an unregistered state (step 2602). By the way, the processing at the step 2602 becomes processing opposite to the processing at the step 1704 in the proxy object registration processing shown in FIG. 28.

After the processing at the step 2602 has finished, the processor 131 returns to the step 2601 and continues the reference solution processing. If the object reference retained in the object to be processed does not store the identifier 3604 of the object reference retained in the proxy object 2002 (the result at the step 2601 is "NO"), the processor 131 terminates the reference solution processing.

Figure 35:
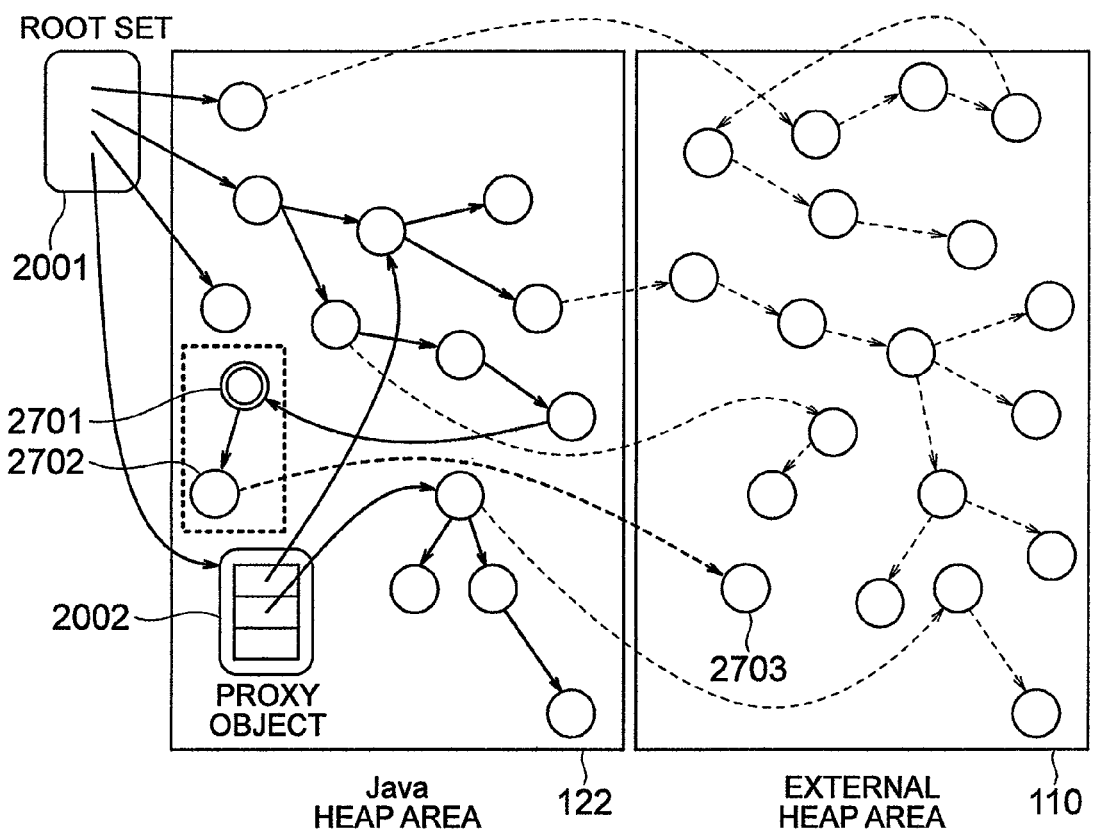
FIG. 35 is a diagram showing states of objects previously stored in a Java heap area and an external heap area, observed after reference solution processing has been terminated in an embodiment of the present invention.

Reference relations between objects 119 stored in the Java heap area 122 and leak objects 112 stored in the external heap area 110 at an end time point of the reference solution processing are shown in FIG. 35.

FIG. 35 is a diagram showing states of objects previously stored in the Java heap area 122 and the external heap area 110, observed after the reference solution processing has been terminated in the embodiment of the present invention.

FIG. 35 shows a case where an object 2701 stored in the external heap area 110 is accessed in the state shown in FIG. 32. At this time, the import range 3008 in the import execution management information 218 has a value of "1" set therein. Therefore, the directly accessed object 2701 and an object 2702 that can be reached by following one stage of an object reference of the directly accessed object 2701 are relocated from the external heap area 110 to the Java heap area 122 by the import processing. An object 2703 that cannot be reached unless two stages of object reference of the directly accessed object 2701 are followed is not the subject of the import processing. Therefore, the object 2703 continues to be stored in the external heap area 110.

Referring back to FIG. 33, description of the flow chart of the import processing will now be continued.

The processor 131 sets page trap in the external heap area 110 and brings about a state in which access to an object at the time of method execution can be detected (step 2508). Finally, the processor 131 resumes the execution of the stopped threads (step 2509) and the present processing is terminated.

If objects are relocated from the external heap area 110 to the Java heap area 122 by the import processing, an area where the relocated objects were located becomes an empty area that cannot be reutilized. Since objects relocated from the external heap area 110 to the Java heap area 122 are typically few, a drop caused in use efficiency of the external heap area 110 by the above-described empty area does not pose a great problem.

As in the case where the Java VM 109 is executed continuously for a long time, there is a possibility that it will become impossible to disregard the drop in use efficiency of the external heap area 110 as a result of accumulation of empty areas in the external heap area 110. Especially when an empty area has vanished in the external heap area 110, it is necessary to improve the use efficiency of the external heap area 110 by executing the GC processing intended for the external heap area 110.

When GC processing intended for the external heap area 110 is needed, GC processing intended for the Java heap area 122 is executed and GC processing intended for the external heap area 110 is executed as an extension of the GC processing intended for the Java heap area 122, in the embodiment of the present invention. Hereafter, the GC processing intended for the external heap area 110 will be described with reference to FIG. 36, while quoting the GC processing intended for the Java heap area 122 shown in FIG. 19.

Figure 36:
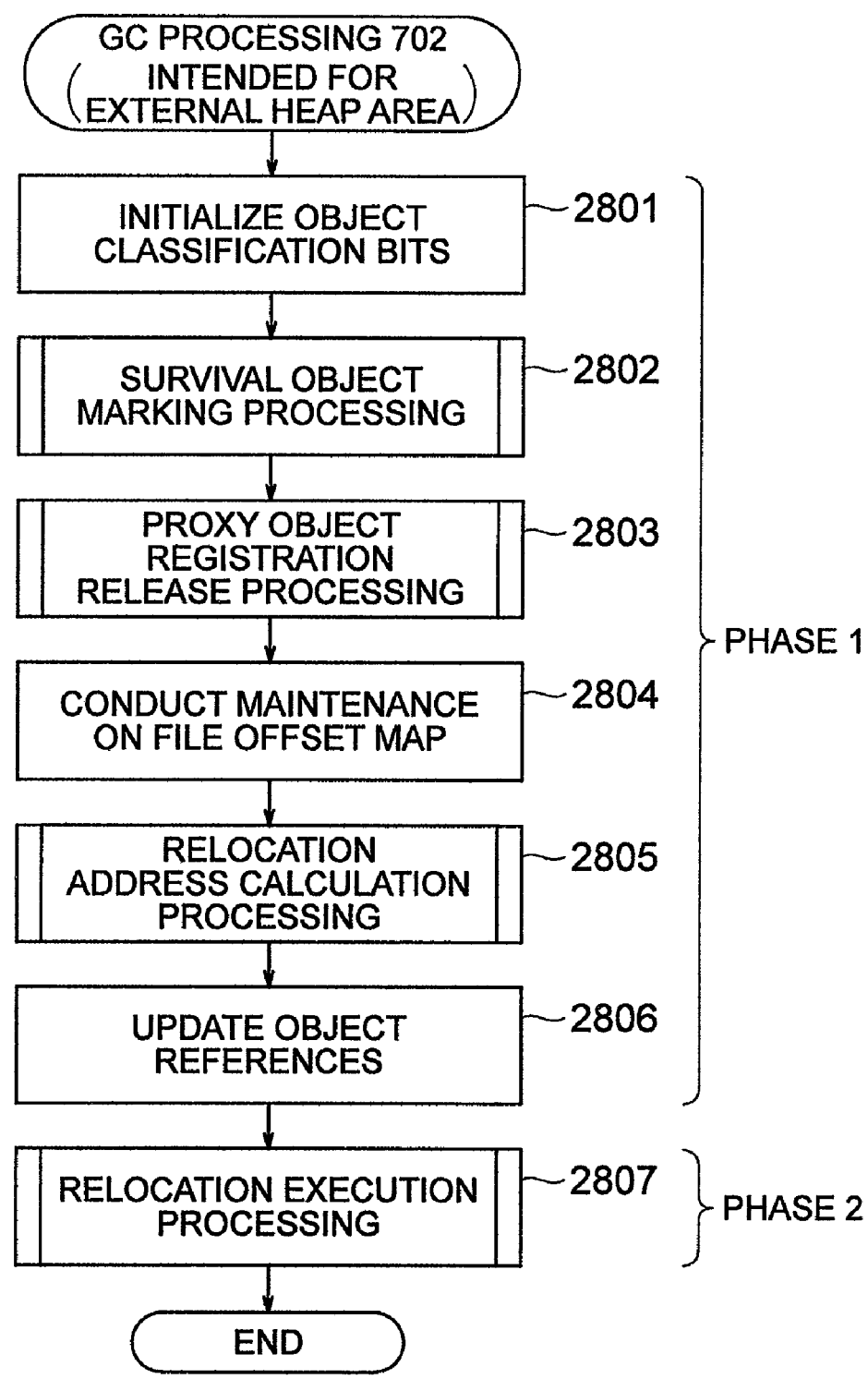
FIG. 36 is a flow chart showing a procedure of GC processing intended for an external heap area in an embodiment of the present invention.

FIG. 36 is a flow chart showing a procedure of the GC processing intended for the external heap area 110 in the embodiment of the present invention.

The processor 131 initializes objects stored in the external heap area 110 with object classification bits in the object header 3401 set to "dead" (step 2801). The processing at the step 2801 is executed at the time of processing at the step 1401 shown in FIG. 21.

Subsequently, the processor 131 executes the survival object marking processing on the leak objects 112 stored in the external heap area 110 as well (step 2802). Specifically, as for the leak objects 112 stored in the external heap area 110, the processor 131 makes a decision whether the reference destination of the object reference is in the Java heap area 122 instead of the decision processing at the step 1502 in FIG. 26. The processing at the step 2802 is executed at the time of processing at the step 1402 in FIG. 21.

In the embodiment of the present invention, the processing at the step 1704 is executed in the proxy object processing. Therefore, the decision whether the reference destination of the object reference is in the Java heap area 122 is the same as the decision whether the identifier 3604 of the object reference in the proxy object is retained.

The processor 131 executes proxy object registration release processing on a dead object included in the external heap area 110 that is not judged to be a survival object in the processing at the step 2802 (step 2803). By executing the proxy object registration release processing, reference from only the dead object to be processed via the proxy object 2002 is conducted and survival objects that are not in the reference relation with other objects can be collected by the GC processing. Details of the proxy object registration release processing will be described with reference to FIG. 37 later. Furthermore, the processor 131 updates the object address 3701 in the file offset map 217 indicating the dead object to the null value.

Figure 37:
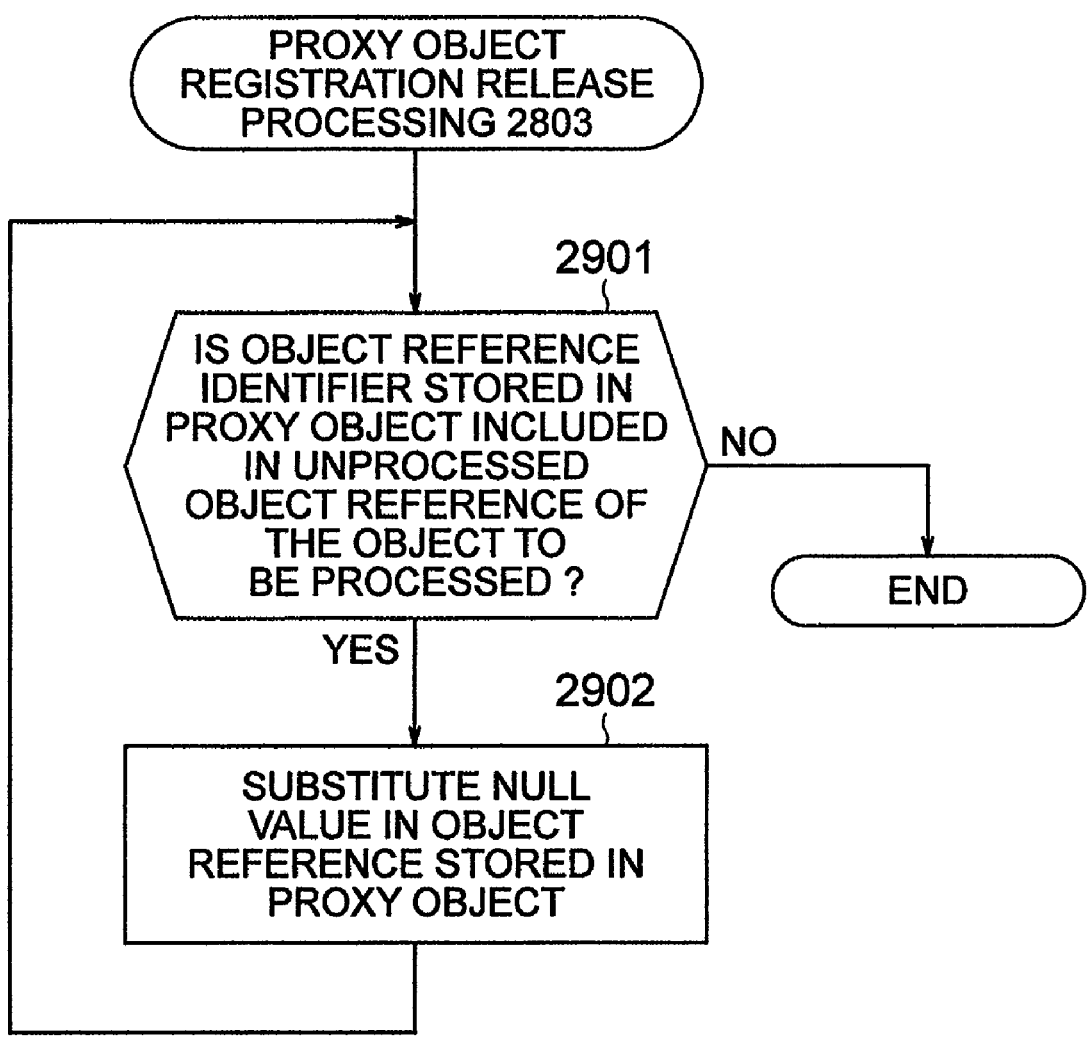
FIG. 37 is a flow chart showing a procedure of proxy object registration release processing in GC processing intended for an external heap area in an embodiment of the present invention.

FIG. 37 is a flow chart showing a procedure of the proxy object registration release processing in the GC processing intended for the external heap area 110 in the embodiment of the present invention. The present processing is executed on objects included in the external heap area 110 and judged to be dead objects in the processing at the step 2802 in FIG. 36.

The processor 131 makes a decision whether the identifier of the object reference stored in the proxy object 2002 is included in an unprocessed object reference of the object to be processed (step 2901).

If the identifier of the object reference stored in the proxy object 2002 is included in unprocessed object references of the object to be processed (a result at the step 2901 is "YES"), the processor 131 substitutes the null value in the value of the corresponding object reference in the proxy object 2002 and brings about an unregistered state (step 2902). Unless referred to by other objects, objects released from reference can be collected by the GC processing, by releasing reference from the proxy object 2002.

After the processing at the step 2902 has finished, the processor 131 returns to the step 2901 and continues the reference solution processing. If the identifier of the object reference stored in the proxy object 2002 is not included in unprocessed object references of the object to be processed (the result at the step 2901 is "NO"), the present processing is terminated.

Referring back to FIG. 36, description of the flow chart of the GC processing intended for the external heap area 110 will now be continued.

The processor 131 deletes records that are included in the file offset map 217 and that are the null value in the object address 3701, and conducts maintenance on the file offset map 217 (step 2804).

The processor 131 executes the relocation address calculation processing on the leak objects 112 included in the external heap area 110, and calculates relocation addresses so as to relocate objects that are "survival" in object classification in areas in the external heap area 110 without waste (step 2805). The processing at the step 2805 is executed at the time of processing at the step 1305 shown in FIG. 19.

The processor 131 updates values of object references of respective objects on the basis of relocation addresses of reference destination objects calculated in the processing at the step 2805. The processing at the step 2806 is executed at the time of the processing at the step 1306 shown in FIG. 19. The processing at the step 2806 will now be described with reference to FIGS. 38A to 38C.

Figure 38A:
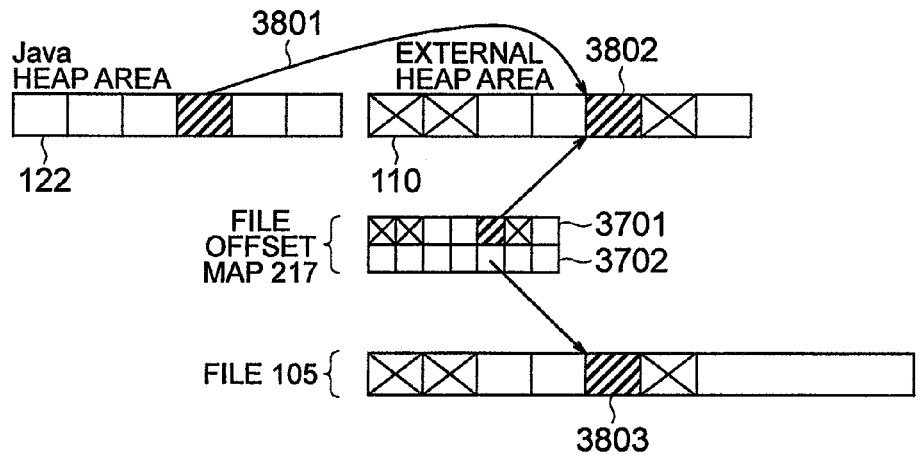
FIG. 38A is a diagram for explaining an object reference utilizing a file offset map in an embodiment of the present invention.

FIG. 38A is a diagram for explaining the object reference utilizing the file offset map 217 in the embodiment of the present invention.

With reference to FIG. 38A, an object reference 3801 of an object stored in the Java heap area 122 refers to a virtual object 3802 in the Java heap area 122. In other words, a logical address of the virtual object 3802 is stored in the object reference 3801.

As shown in FIG. 9, the file offset map 217 stores the logical address of the virtual object 3802 in the object address 3701 and stores the file offset of the file 105 in the file offset 3702.

An entity 3803 of the virtual object 3802 is recorded in the file 105, and located in a position of the file offset 3702 corresponding to the logical address of the virtual object 3802.

Figure 38B:
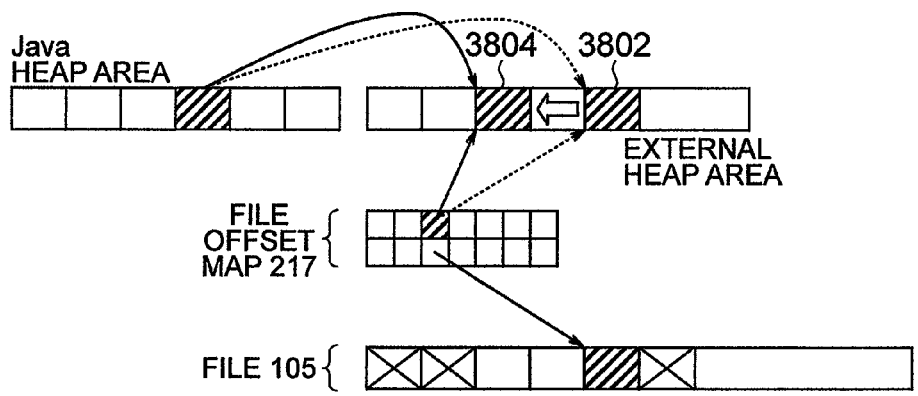
FIG. 38B is a diagram for explaining an object reference utilizing a file offset map in an embodiment of the present invention.

FIG. 38B is a diagram for explaining an object reference utilizing the file offset map 217 in the embodiment of the present invention. FIG. 38B shows a state in which the object reference value has been updated.

FIG. 38B shows a state in which the virtual object stored in the external heap area 110 is relocated and the logical address is changed by the processing at the step 2806 in FIG. 36. At this time, the object reference 3801 stored in the object that is included in the Java heap area 122 has been updated.

Specifically, the virtual object 3802 is relocated as a virtual object 3804 and the object reference 3801 and the object address 3804 also point to the virtual object 3804. At this stage, the entity of the object stored in the file 105 remains intact.

Referring back to FIG. 36, description of the flow chart of the GC processing intended for the external heap area 110 will now be continued.

The processor 131 relocates entities of objects corresponding to the file offset 3702 in the file offset map 217 in order beginning with the head of the file 105 (step 2807). The processing at the step 2807 will now be described with reference to FIG. 38C. If the processing at the step 2807 is finished, the GC processing intended for the external heap area 110 is terminated.

Figure 38C:
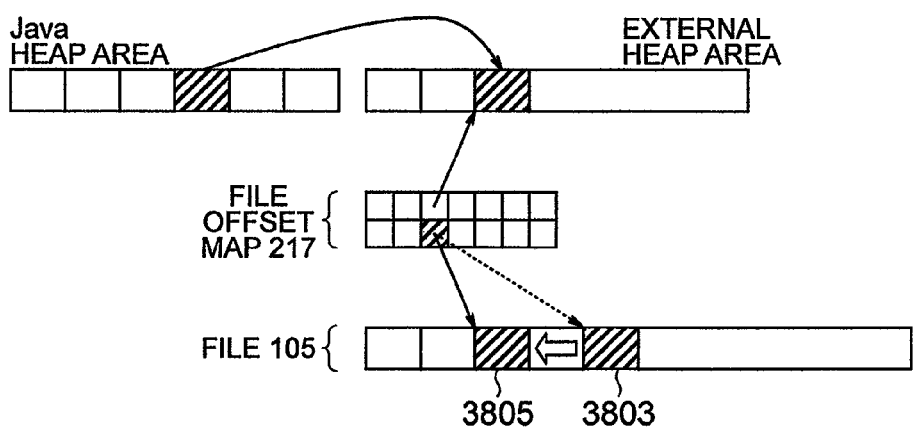
FIG. 38C is a diagram for explaining an object reference utilizing a file offset map in an embodiment of the present invention.

FIG. 38C is a diagram for explaining an object reference utilizing the file offset map 217 in the embodiment of the present invention, and FIG. 38C is a diagram showing a state in which objects are relocated. The entity 3803 of the virtual object 3804 is relocated in a position of an entity 3805 by the processing at the step 2807.

By the way, location of the entity of the object can be changed without changing the value of the object reference included in the object, by utilizing the file offset map 217. Therefore, the processing at the step 2807 can be executed in parallel to the method execution. As for the processing in phase 2 at the step 2807, therefore, execution of all threads may be resumed before the GC processing is completed, although the processing in phase 1 ranging from the step 2801 to the step 2806 needs to be executed together with the GC processing intended for the Java heap area 122.

Figure 39:
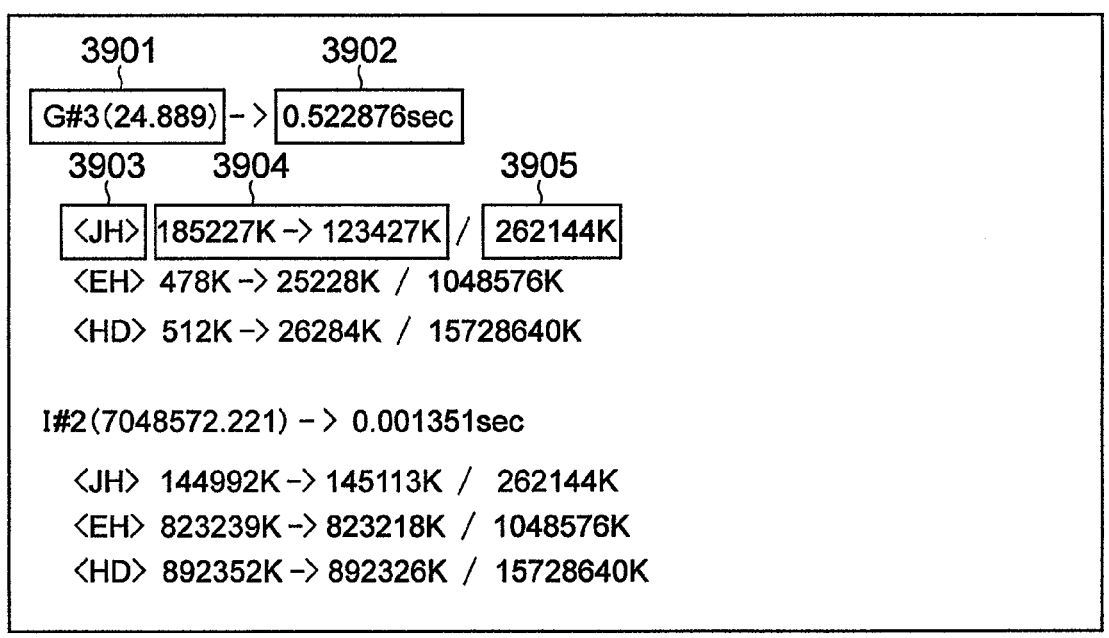
FIG. 39 is a diagram showing an example of a log of GC processing and import processing output to an output device by a Java VM in an embodiment of the present invention.

FIG. 39 is a diagram showing an example of a log of the GC processing and the import processing output to the output device 130 by the Java VM 109 in the embodiment of the present invention. Hereafter, fields in the output log will be described.

A field 3901 is a field that indicates information concerning the log. "G" indicates that the log is a log concerning the GC processing. "I" indicates that a log is a log concerning the import processing. In the example shown in FIG. 39, the log is represented by "G" to be a log concerning the GC processing, represented by "#3" to be a log concerning GC processing at the third time in all since the Java VM 109 is started, and represented by "(24.889)" to be a log concerning GC processing executed 24.889 seconds after the Java VM 109 is started.

A field 3902 indicates time taken to conduct processing indicated in the field 3901. In the example shown in FIG. 39, it is indicated that 0.522876 second was taken to conduct the GC processing.

A field 3903 indicates an area the information indicated in the line concerns. Specifically, "<JH>" indicates that the information indicated in the line is information concerning the Java heap information 122. "<EH>" indicates that the information indicated in the line is information concerning the external heap information 110. "<HD>" indicates that the information indicated in the line is information concerning the auxiliary storage 102.

A field 3904 shows a change caused in the amount used in the area indicated in the field 3903 by the processing indicated in the field 3901. In the example shown in FIG. 39, it is indicated that the amount used in the Java heap area 122 is changed from "185227K" to "123427K" by the GC processing.

A field 3905 indicates a size of the area indicated in the field 3903. In the example shown in FIG. 39, the size of the Java heap area 122 is represented to be "262144K."

The user can grasp the execution time of each of the GC processing and the import processing and the utilization situation of the Java heap area 122 by referring to the logs of the GC processing and the import processing.

Figure 40:
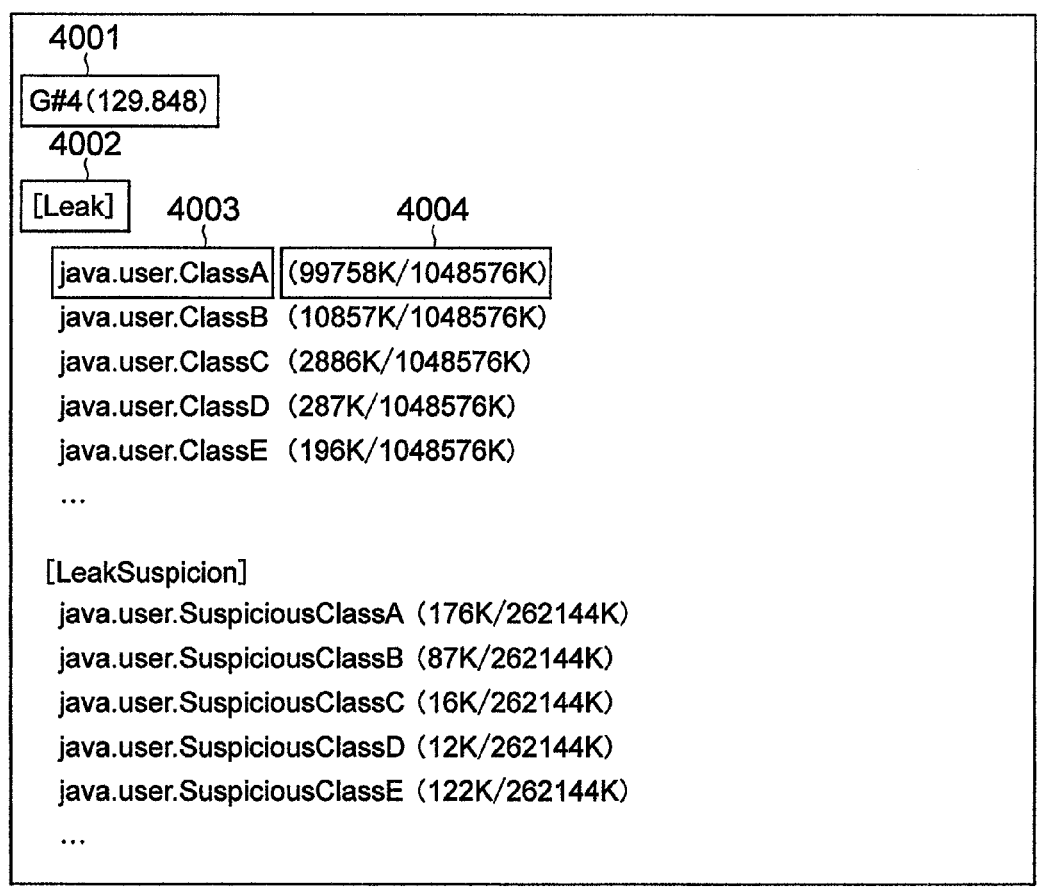
FIG. 40 is a diagram showing an example of object statistics information output to an output device by a Java VM in an embodiment of the present invention.

FIG. 40 is a diagram showing an example of object statistics information output to the output device 130 by the Java VM 109 in the embodiment of the present invention. Hereafter, fields of the output object statistics information will be described.

A field 4001 indicates information concerning the statistics information. "G" indicates that the information is statistics information acquired at the time of execution of the GC processing. "I" indicates that the information is statistics information acquired at the time of execution of the import processing. In the example shown in FIG. 40, the information is represented by "G" to be statistics information acquired at the time of execution of the import processing, represented by "#4" to be statistics information acquired at the fourth time of the GC processing in all since the Java VM 109 is started, and represented by "(129.848)" to be statistics information acquired at the time of the GC processing executed 129.848 seconds after the Java VM 109 is started. By the way, if statistic information is acquired at timing other than the time of execution of the GC processing and the time of execution of the import processing, only information representing how many seconds after the start of the Java VM 109 the statistics information is acquired is output.

A field 4002 indicates the kind of the output statistics information. "[Leak]" indicates that the statistics information is statistics information concerning leak objects. "[Leak Suspicion]" indicates that the statistics information is statistics information concerning non-access objects registered in the non-access object address table 205.

A field 4003 indicates information that identifies objects the statistics information concerns. Specifically, the field 4003 indicates a class name. In the example shown in FIG. 40, it is indicated that there are leak objects having a class name "java.user.ClassA".

A field 4004 is a field that indicates a total size of objects having the class name indicated in the field 4003 and a size of an area where the objects are located, in the cited order. In the example shown in FIG. 40, it is indicated that the total size of leak objects having the class name "java.user.ClassA" is 99,758 KB and the leak objects are stored in the external heap area 110 having a size of 1,048,576 KB.

The user can grasp objects in which a memory leak has occurred, every class by referring to the object statistics information and make use of them to pursue causes of the memory leak. Furthermore, the user can analyze the memory use situation in more detail by referring to object detailed information shown in FIG. 41.

Figure 41:
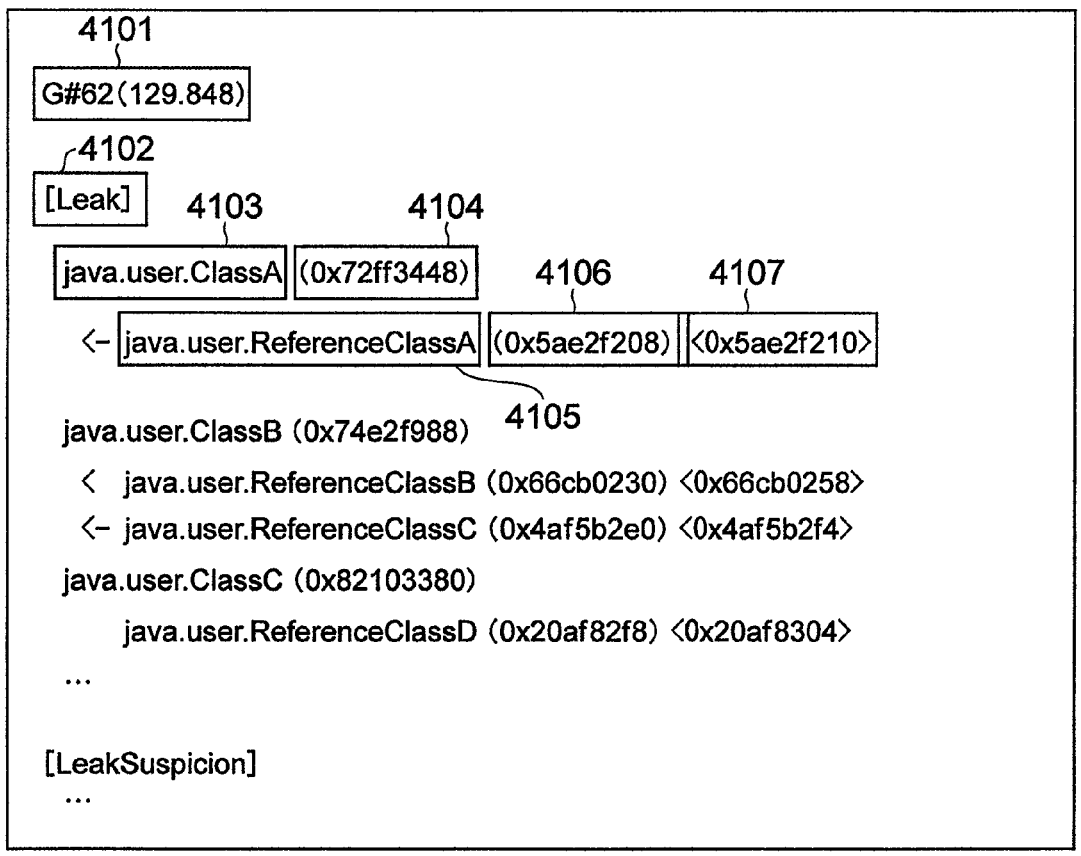
FIG. 41 is a diagram showing an example of object detail information output to an output device by a Java VM in an embodiment of the present invention.

FIG. 41 is a diagram showing an example of object detail information output to the output device 130 by the Java VM 109 in the embodiment of the present invention. Hereafter, fields in the output object detailed information will be described.

Fields 4101 and 4102 have the same contents as the fields 4001 and 4002 in the object statistics information shown in FIG. 40.

A field 4103 indicates a class name of an object the output object detailed information concerns. A field 4104 indicates a location address of an object the output object detailed information concerns. In the example shown in FIG. 41, it is indicated that an object that is located in an address "0x72ff3448" and that has a class name "java.user.ClassA" is a leak object.

A field 4105 indicates a class name of an object that refers to the object indicated in the field 4104. A field 4106 indicates a location address of the object that refers to the object indicated in the field 4104. A field 4107 indicates an address of an object reference field used to refer to the object indicated in the field 4104. In the example shown in FIG. 41, it is indicated that an object that is located in an address "0x5ae2f208" and that has a class name "java.user.ReferenceClassA" refers to a leak object located in the address "0x72ff3448" by using an object reference field having an address "0x5ae2f210".

Figure 42:
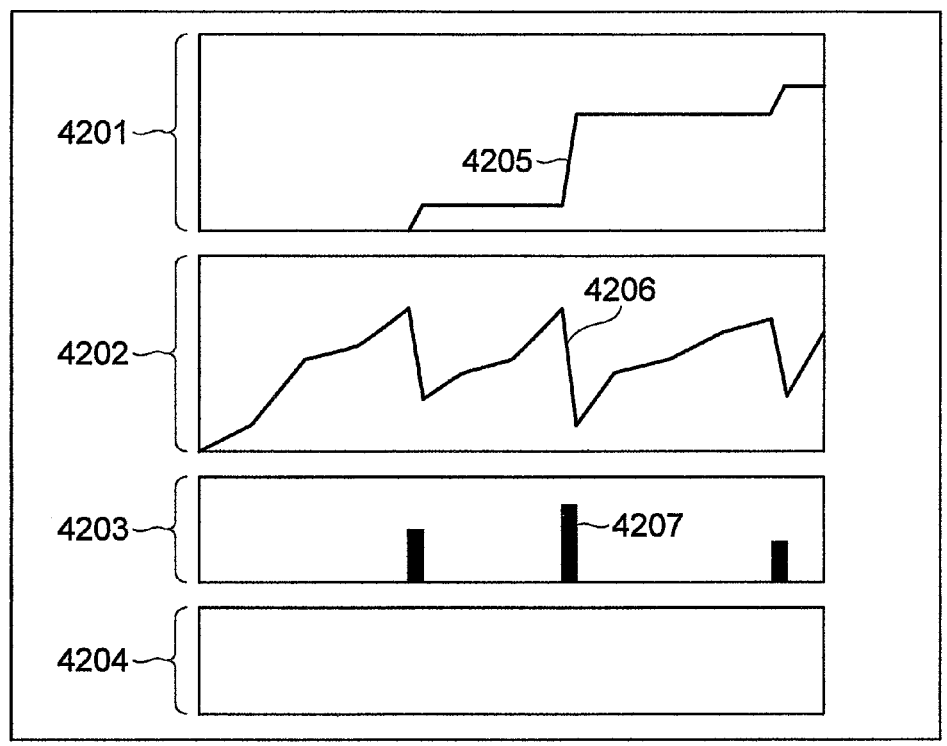
FIG. 42 is a diagram showing an example of a screen for displaying execution information of GC processing output to an output device by a Java VM in an embodiment of the present invention.

FIG. 42 is a diagram showing an example of a screen for displaying execution information of the GC processing output to the output device 130 by the Java VM 109 in the embodiment of the present invention.

In the screen display example shown in FIG. 42, an area 4201, an area 4202, an area 4203 and an area 4204 are included. A coordinate axis of the area 4201 indicates the amount used 4205 in the external heap area 110. A coordinate axis of the area 4202 indicates the amount used 4206 in the Java heap area 122. A coordinate axis of the area 4203 indicates execution time 4207 of the GC processing. The area 4204 is an area for displaying details of information displayed in the areas 4201 to 4203.

An abscissa axis of the area 4201, the area 4202 and the area 4203 indicate time elapsed since the Java VM 109 is started, and the same time axis is indicated for all areas. It is possible to easily grasp a change of the amount used in the external heap area 110 caused by the GC processing, a change of the amount used in the Java heap area 122 caused by the GC processing, and time that has been taken for the GC processing, by thus displaying the execution information of the GC processing with the common time axis.

By specifying a position in the area 4201, the area 4202 and the area 4203 from the input device 132, details concerning time of the specified position, the amount used 4205 at that time, the amount used 4206 at that time, or the execution time 4207 can also be displayed in the area 4204.

Figure 43:
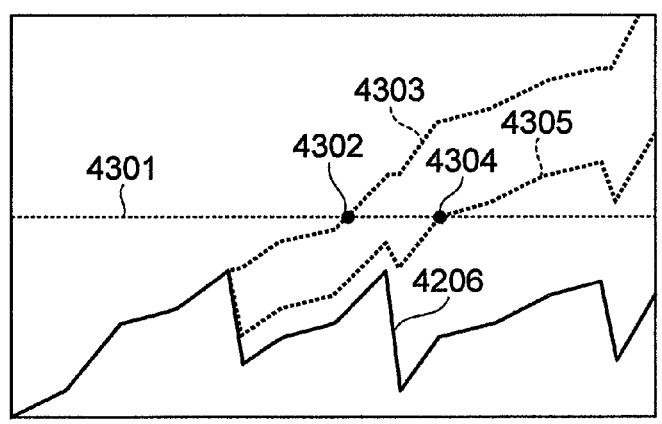
FIG. 43 is a diagram showing an example of a screen for displaying changes of area use quantities caused by GC processing output to an output device by a Java VM in an embodiment of the present invention.

FIG. 43 is a diagram showing an example of a screen for displaying changes of area use quantities caused by the GC processing output to the output device 130 by the Java VM 109 in the embodiment of the present invention.

FIG. 43 shows the area 4201 or the area 4202 shown in FIG. 42 or an area obtained by joining the area 4201 and the area 4202. Furthermore, the amount used in the case where the GC processing according to the embodiment of the present invention is executed and the amount used in the case where the GC processing is not executed may be displayed as shown in FIG. 43.

In FIG. 43, the amount used 4206 in the Java heap area 122 in the case where the leak objects 112 are relocated in the external heap area 110 by executing the GC processing in the embodiment of the present invention, the amount used 4305 in the Java heap area 122 in the case where the leak objects 112 are not relocated in the external heap area 110, and the amount used 4303 in the Java heap area 122 in the case where the GC processing is not executed are shown. It is also possible to grasp the remaining amount in the Java heap area 122 by displaying a size 4301 of the Java heap area 122 in superposition.

The user can predict or confirm a spot where a memory shortage error of the Java heap area 122 occurs by referring to the screen shown in FIG. 43. Specifically, it is possible to grasp that a memory shortage error occurs at an intersection 4302 of the size 4301 and the amount used 4303 in the case where the GC processing is not executed at all. Furthermore, it can be grasped that a memory shortage error occurs at an intersection 4304 of the size 4301 and the amount used 4305 in the case where the leak objects 112 are not relocated in the external heap area 110.

According to the embodiment of the present invention, empty areas in the Java heap area 122 can be expanded by relocating detected leak objects in the external heap area 110.

According to the embodiment of the present invention, even an object judged to have a high possibility of memory leak can be accessed again and consequently high solidity can be implemented.

Furthermore, according to the embodiment of the present invention, the occurrence frequency of the GC processing can be lowered and consequently lowering of the processing speed of application program execution caused by the execution of the GC processing can be suppressed.

According to an embodiment of the present invention, the use efficiency of a storage area (for example, a heap area) can be improved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A memory management method in an information processing system executed in a computer,
wherein
the computer comprises a processor for executing a program and a storage accessed by the processor,
the storage stores a memory management part for managing a storage area used by a program which is executed by the processor, and stores access information for objects generated by executing the program, and
the storage comprises a first storage area and a second storage area for storing the generated objects, and
the processor stores the generated objects in the first storage area,
if an object stored in the first storage area is accessed, the processor records information of the accessed object in the access information,
the processor extracts a leak object having a high possibility of memory leak on the basis of the access information, and
the processor moves the extracted leak object to the second storage area.

2. The memory management method according to claim 1, wherein
the memory management part comprises a garbage collection execution part for executing garbage collection to release the generated objects finished in use by the program, and
the processor executes the garbage collection at predetermined timing, and
if the garbage collection is executed, the processor moves the extracted leak object to the second storage area.

3. The memory management method according to claim 2, wherein the processor excludes objects stored in the second storage area from subjects of the garbage collection.

4. The memory management method according to claim 2, wherein when executing the garbage collection, the processor aligns objects stored in the first storage area on the basis of the access information.

5. The memory management method according to claim 1, wherein
the processor periodically judges objects that are stored in the first storage area and that are not accessed by execution of the program, and
the processor judges an object that is judged to have not been accessed consecutively a predetermined number of times to be the leak object.

6. The memory management method according to claim 1, wherein
the storage comprises a main storage accessed by the processor, and an auxiliary storage from which stored data is read out into the main storage to be then accessed by the processor,
the first storage area is generated in the main storage, and the second storage area is generated in the auxiliary storage.

7. The memory management method according to claim 1, wherein if an object stored in the second storage area is accessed, the processor moves the accessed object to the first storage area.

8. The memory management method according to claim 1, wherein the processor outputs information concerning objects stored in the first storage area and the second storage area.

9. The memory management method according to claim 1, wherein the processor outputs a size of a storage area used by the leak object together with an identifier of the leak object.

10. The memory management method according to claim 1, wherein
the processor calculates a storage capacity required for the first storage area when the leak object is not moved from the first storage area to the second storage area, and
the processor outputs the calculated storage capacity required for the first storage area.

11. An information processing apparatus for managing a storage area used by a program,
wherein
the information processing apparatus comprises a processor for executing the program and a storage accessed by the processor,
the storage stores a memory management part for managing a storage area used by a program which is executed by the processor, and stores access information for objects generated by executing the program, and
the storage comprises a first storage area and a second storage area for storing the generated objects, and
the processor stores the generated objects in the first storage area,
if an object stored in the first storage area is accessed, the processor records information of the accessed object in the access information,
the processor extracts a leak object having a high possibility of memory leak on the basis of the access information, and
the processor moves the extracted leak object to the second storage area.

12. A memory management program for managing a storage area used by execution of a program, in a computer in which the program is executed,
wherein
the computer comprises a processor for executing the program and a storage comprising a first storage area and a second storage area for storing objects generated by executing the program,
the memory management program causes the computer to execute:
a procedure for storing the generated objects in the first storage area;
a procedure responsive to an object stored in the first storage area being accessed, for recording information concerning the accessed object in the storage as access information;
a procedure for extracting a leak object having a high possibility of memory leak on the basis of the access information, and
a procedure for moving the extracted leak object to the second storage area.

* * * * *